(12) United States Patent
Arai

(10) Patent No.: US 8,774,539 B2
(45) Date of Patent: Jul. 8, 2014

(54) ENCODER, DECODER, ENCODER SYSTEM, DECODER SYSTEM, TRANSMISSION ADAPTER, ENCODING METHOD, DECODING METHOD, AND IMAGING APPARATUS

(75) Inventor: Hiroshi Arai, Kanagawa (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 13/456,664

(22) Filed: Apr. 26, 2012

(65) Prior Publication Data

US 2012/0281927 A1     Nov. 8, 2012

(30) Foreign Application Priority Data

May 6, 2011    (JP) .................................. 2011-103579

(51) Int. Cl.
 *G06K 9/36* (2006.01)
(52) U.S. Cl.
 USPC ....................................................... 382/233
(58) Field of Classification Search
 CPC ..... G06K 9/4609; G06K 9/522; G06K 9/741; H04N 1/4172; H04N 5/92; H04N 5/9204; H04N 7/26; H04N 7/32; H04N 7/26351; H04N 7/26361; H04N 7/26388; H04N 7/26398; H04N 7/26489; H04N 19/00; H04N 19/00145; H04N 19/00321; H04N 19/00424; H04N 19/00569; H04N 19/006; H04N 19/00769; H04N 21/23418; H04N 21/2343; H04N 21/23427; H04N 21/4402; H04N 21/440227; H04H 60/59; H04H 60/65
See application file for complete search history.

(56) References Cited

U.S. PATENT DOCUMENTS

| | | | | | |
|---|---|---|---|---|---|
| 5,235,420 | A | * | 8/1993 | Gharavi | 375/240.11 |
| 5,253,058 | A | * | 10/1993 | Gharavi | 375/240.12 |
| 6,091,777 | A | * | 7/2000 | Guetz et al. | 375/240.11 |
| 8,249,142 | B2 | * | 8/2012 | Shanableh et al. | 375/240.01 |
| 8,451,374 | B2 | * | 5/2013 | Ohki | 348/459 |
| 8,477,853 | B2 | * | 7/2013 | Wu et al. | 375/240.26 |
| 8,488,680 | B2 | * | 7/2013 | Alfonso | 375/240.21 |
| 8,533,752 | B2 | * | 9/2013 | Lee et al. | 725/31 |

FOREIGN PATENT DOCUMENTS

JP          2004-266497          9/2004

* cited by examiner

*Primary Examiner* — Jose Couso
(74) *Attorney, Agent, or Firm* — Frommer Lawrence & Haug LLP; William S. Frommer; Ellen Marcie Emas

(57) ABSTRACT

An encoder includes: an image decomposition unit configured to input an image and decompose the input image into a first component capable of being used as a monitoring image and a second component other than the first component by frequency decomposition, the input image being restored by coupling the first component and the second component to each other; a first transmission unit configured to output the decomposed first component as a first-channel transmission image; a compression coding unit configured to compression-code the second component; and a second transmission unit configured to output the compression-coded second component as a second-channel transmission image.

20 Claims, 34 Drawing Sheets

First-channel transmission image
(Low-frequency component, down-converted image)

| frame1 | frame2 |
|--------|--------|
| frame3 | frame4 |

⇩ Divide

| frame 3-1 | frame 3-2 |
|-----------|-----------|
| frame 3-3 | frame 3-4 |

FIG.27

ENCODER, DECODER, ENCODER SYSTEM, DECODER SYSTEM, TRANSMISSION ADAPTER, ENCODING METHOD, DECODING METHOD, AND IMAGING APPARATUS

BACKGROUND

The present disclosure relates to an encoder that compression-codes an image and transmits the compression-coded image, a decoder that decodes the compression-coded image, an encoder system constituted of a plurality of encoders, a decoder system constituted of a plurality of decoders, a transmission adapter connected to an encoder for use, an encoding method, a decoding method, and an imaging apparatus with a built-in encoder.

Along with transition to terrestrial digital broadcast, digital high-definition broadcast is becoming rapidly widespread. In addition, in recent years, the broadcast of a 3D high-definition video has also been common. Transmission of a 3D high-definition video is realized by, for example, synchronizing and transmitting two left and right video streams captured with two synchronous high-definition cameras by using two channels of the digital high-definition broadcast (see Japanese Patent Application Laid-open No. 2004-266497 (paragraph and FIG. 1)).

Although current high-definition data is defined as an image of 1920×1080 pixels, in order to support ultra slow motion and ultra-high-resolution high-definition videos having a further higher resolution, such as a 4K image constituted of about 4000×2000 pixels and an 8K image constituted of about 8000×4000 pixels, there has appeared a technique for next-generation high-definition videos such as an ultra-fast high-definition video at a frame rate of 120 fps or 240 fps and a wide-angle video obtained by stitching high-definition videos captured with a plurality of HDV (High-Definition Video) cameras.

SUMMARY

In a current broadcast site, a system environment for high-definition videos is mainly established. Meanwhile, transition to a system environment for next-generation high-definition videos such as an ultra-high-resolution high-definition video, an ultra-fast high-definition video, and a wide-angle high-definition video will be inevitably studied in the future. However, an enormous cost is predicted for the transition to the system environment for next-generation high-definition videos, and there is a fear that its implementation is postponed.

In view of the circumstances as described above, it is desirable to provide an encoder, a decoder, an encoder system, a decoder system, an encoding method, a decoding method, a transmission adapter, and an imaging apparatus that can contribute to implementation of a system environment for next-generation high-definition videos.

According to an embodiment of the present disclosure, there is provided an encoder including:

an image decomposition unit configured to input an image and decompose the input image into a first component capable of being used as a monitoring image and a second component other than the first component by frequency decomposition, the input image being restored by coupling the first component and the second component to each other;

a first transmission unit configured to output the decomposed first component as a first-channel transmission image;

a compression coding unit configured to compression-code the second component; and a second transmission unit configured to output the compression-coded second component as a second-channel transmission image.

The encoder may further include an auxiliary-image addition unit configured to add an auxiliary image for monitoring to the first component; and an output unit configured to output the first component with the auxiliary image as a monitoring image.

The encoder may further include a compression analysis unit configured to analyzed size of the compression-coded second component and output a result of the analysis as visible information.

According to another embodiment of the present disclosure, there is provided a decoder capable of being used in combination with an encoder including an image decomposition unit configured to input an image and decompose the input image into a first component capable of being used as a monitoring image and a second component other than the first component by frequency decomposition, the input image being restored by coupling the first component and the second component to each other, a first transmission unit configured to output the decomposed first component as a first-channel transmission image, a compression coding unit configured to compression-code the second component, and a second transmission unit configured to output the compression-coded second component as a second-channel transmission image, the decoder comprising:

an image acquisition unit configured to acquire the first component transmitted as the first-channel transmission image and the second component transmitted as the second-channel transmission image;

a decompression decoding unit configured to decompression-decode the acquired second component; and an image restoration unit configured to couple the acquired first component and the decompression-decoded second component to each other to restore the image in an original state.

According to the encoder and the decoder described above, for example, with use of an, infrastructure such as a current 3D-image transmission system as it is, it is possible to transmit next-generation ultra-high-resolution images such as a 4K high-definition image and an 8K high-definition image and also display a monitoring image on a monitor or a viewfinder of a camera.

According to another embodiment of the present disclosure, there is provided an encoder including:

an image decomposition unit configured to input an image and decompose the input image into a first component capable of being used as a monitoring image and a second component other than the first component, the input image being restored by coupling the first component and the second component to each other, the image decomposition unit including a down-conversion unit configured to generate, as the first component, an image having a size capable of being used as the monitoring image from the input image by down conversion, and a difference generation unit configured to generate, as the second component, a difference between the input image and an image obtained by enlarging in pixel the first component to a size of the input image;

a first transmission unit configured to output the decomposed first component as a first-channel transmission image;

a compression coding unit configured to compression-code the second component; and a second transmission unit configured to output the compression-coded second component as a second-channel transmission image.

According to another embodiment of the present disclosure, there is provided a decoder capable of being used in combination with an encoder including an image decomposition unit configured to input an image and decompose the input image into a first component capable of being used as a monitoring image and a second component other than the first component, the input image being restored by coupling the first component and the second component to each other, the image decomposition unit including a down-conversion unit configured to generate, as the first component, an image having a size capable of being used as the monitoring image from the input image by down conversion, and a difference generation unit configured to generate, as the second component, a difference between the input image and an image obtained by enlarging in pixel the first component to a size of the input image, a first transmission unit configured to output the decomposed first component as a first-channel transmission image, a compression coding unit configured to compression-code the second component, and a second transmission unit configured to output the compression-coded second component as a second-channel transmission image, the decoder comprising:

an image acquisition unit configured to acquire the first component transmitted as the first-channel transmission image and the second component transmitted as the second-channel transmission image;

a decompression decoding unit configured to decompression-decode the acquired second component; and an image restoration unit configured to couple the acquired first component and the decompression-decoded second component to each other to restore the image in an original state, the image restoration unit being configured to enlarge in pixel the first component and add an enlarged image thereof and the decompression-decode second component to each other to restore the image in the original state.

According to the encoder and the decoder described above, for example, with use of an infrastructure such as a current 3D-image transmission system as it is, it is possible to successfully transmit next-generation ultra-high-resolution images such as a 4K high-definition image and an 8K high-definition image. Further, since an image including sufficient high-frequency components is obtained as a monitoring image, it is possible to successfully perform camera adjustment that is necessary for high definition of an image, such as focus adjustment.

According to another embodiment of the present disclosure, there is provided an encoder including:

an image decomposition unit configured to input an image constituted of a plurality of frames sequentially captured at a frame rate higher than a monitoring frame rate and decompose the input image into a first component capable of being used as a monitoring image a second component other than the first component, the input image being restored by coupling the first component and the second component to each other, the image decomposition unit including a frame separation unit configured to separate a frame as a monitoring frame from the plurality of frames of the input image at the monitoring frame rate and generate the first component, a frequency decomposition unit configured to decompose each of the plurality of frames of the input image into a low-frequency component and a high-frequency component by frequency decomposition, and a difference generation unit configured to generate, as the second component, differences in the low-frequency component of each of the decomposed frames between the monitoring frame and at least one non-monitoring frame, the at least one non-monitoring frame being located between the monitoring frame and a next monitoring frame;

a first transmission unit configured to output the decomposed first component as a first-channel transmission image;

a compression coding unit configured to compression-code the second component; and a second transmission unit configured to output the compression-coded second component as a second-channel transmission image.

According to another embodiment of the present disclosure, there is provided a decoder capable of being used in combination with an encoder including an image decomposition unit configured to input an image constituted of a plurality of frames sequentially captured at a frame rate higher than a monitoring frame rate and decompose the input image into a first component capable of being used as a monitoring image a second component other than the first component, the input image being restored by coupling the first component and the second component to each other, the image decomposition unit including a frame separation unit configured to separate a frame as a monitoring frame from the plurality of frames of the input image at the monitoring frame rate and generate the first component, a frequency decomposition unit configured to decompose each of the plurality of frames of the input image into a low-frequency component and a high-frequency component by frequency decomposition, and a difference generation unit configured to generate, as the second component, differences in the low-frequency component of each of the decomposed frames between the monitoring frame and at least one non-monitoring frame, the at least one non-monitoring frame being located between the monitoring frame and a next monitoring frame, a first transmission unit configured to output the decomposed first component as a first-channel transmission image, a compression coding unit configured to compression-code the second component, and a second transmission unit configured to output the compression-coded second component as a second-channel transmission image, the decoder comprising:

an image acquisition unit configured to acquire the first component transmitted as the first-channel transmission image and the second component transmitted as the second-channel transmission image;

a decompression decoding unit configured to decompression-decode the acquired second component; and an image restoration unit configured to couple the acquired first component and the decompression-decoded second component to each other to restore the image in an original state, the image restoration unit including a frequency decomposition unit configured to decompose the acquired first component into a low-frequency component and a high-frequency component by frequency decomposition, a difference restoration unit configured to restore a low-frequency component of the at least one non-monitoring frame based on the decomposed low-frequency component and the decompression-decoded second component, an inverse frequency decomposition unit configured to restore the at least one non-monitoring frame by inverse frequency decomposition based on the restored low-frequency component and the high-frequency component included in the second component, and a frame coupling unit configured to couple the monitoring frame as the first component acquired by the image acquisition unit to the at least one non-monitoring frame restored by the inverse frequency decomposition unit.

According to the encoder and the decoder described above, for example, with use of an infrastructure such as a current 3D-image transmission system as it is, it is possible to transmit an ultra-fast high-definition image having a frame rate higher than a monitoring frame rate of the current system. Further, it becomes also possible to display a monitoring image on a monitor or a viewfinder of a camera.

According to another embodiment of the present disclosure, there is provided an encoder including:

an image decomposition unit configured to input an image constituted of a plurality of frames captured at different perspectives to constitute a stereoscopic image and decompose the input image into a first component capable of being used as a monitoring image and a second component other than the first component, the input image being restored by coupling the first component and the second component to each other, the image decomposition unit including a frame separation unit configured to separate the input image into the plurality of frames, a frequency decomposition unit configured to decompose each of the separated frames into a low-frequency component and a high-frequency component by frequency decomposition and generate the high-frequency components as the second component, and a coupling unit configured to couple the decomposed low-frequency components of the plurality of frames to one another to generate the first component;

a first transmission unit configured to output the decomposed first component as a first-channel transmission image;

a compression coding unit configured to compression-code the second component; and a second transmission unit configured to output the compression-coded second component as a second-channel transmission image.

According to another embodiment of the present disclosure, there is provided a decoder capable of being used in combination with an encoder including an image decomposition unit configured to input an image constituted of a plurality of frames captured at different perspectives to constitute a stereoscopic image and decompose the input image into a first component capable of being used as a monitoring image and a second component other than the first component, the input image being restored by coupling the first component and the second component to each other, the image decomposition unit including a frame separation unit configured to separate the input image into the plurality of frames, a frequency decomposition unit configured to decompose each of the separated frames into a low-frequency component and a high-frequency component by frequency decomposition and generate the high-frequency components as the second component, and a coupling unit configured to couple the decomposed low-frequency components of the plurality of frames to one another to generate the first component, a first transmission unit configured to output the decomposed first component as a first-channel transmission image, a compression coding unit configured to compression-code the second component, and a second transmission unit configured to output the compression-coded second component as a second-channel transmission image, the decoder comprising:

an image acquisition unit configured to acquire the first component transmitted as the first-channel transmission image and the second component transmitted as the second-channel transmission image;

a decompression decoding unit configured to decompression-decode the acquired second component; and an image restoration unit configured to couple the acquired first component and the decompression-decoded second component to each other to restore the image in an original state, the image restoration unit including a frame separation unit configured to separate the acquired first component for each frame, a coupling unit configured to couple the first component separated for each frame and the decompression-decoded second component, and an inverse frequency decomposition unit configured to restore the stereoscopic image by inverse frequency decomposition based on the coupled first component and second component.

According to the encoder and the decoder described above, for example, with use of an infrastructure such as a current 3D-image transmission system as it is, it is possible to successfully transmit an ultra-stereoscopic image. Further, it becomes also possible to display a monitoring image on a monitor or a viewfinder of a camera.

According to another embodiment of the present disclosure, there is provided an encoder, including:

a size adjustment unit configured to input an image having an aspect ratio different from that of a screen for monitoring and perform at least one of separation and coupling of the input image to have the aspect ratio of the screen for monitoring;

an image decomposition unit configured to decompose the image output by the size adjustment unit into a first component capable of being used as a monitoring image and a second component other than the first component, the image being restored by coupling the first component and the second component to each other;

a first transmission unit configured to output the decomposed first component as a first-channel transmission image;

a compression coding unit configured to compression-code the second component; and a second transmission unit configured to output the compression-coded second component as a second-channel transmission image.

According to another embodiment of the present disclosure, there is provided a decoder capable of being used in combination with an encoder including a size adjustment unit configured to input an image having an aspect ratio different from that of a screen for monitoring and perform at least one of separation and coupling of the input image to have the aspect ratio of the screen for monitoring, an image decomposition unit configured to decompose the image output by the size adjustment unit into a first component capable of being used as a monitoring image and a second component other than the first component, the image being restored by coupling the first component and the second component to each other, a first transmission unit configured to output the decomposed first component as a first-channel transmission image, a compression coding unit configured to compression-code the second component, and a second transmission unit configured to output the compression-coded second component as a second-channel transmission image, the decoder including:

an image acquisition unit configured to acquire the first component transmitted as the first-channel transmission image and the second component transmitted as the second-channel transmission image;

a decompression decoding unit configured to decompression-decode the acquired second component; and an image restoration unit configured to couple the acquired first component and the decompression-decoded second component to each other to restore the image in an original state.

According to the encoder and the decoder described above, for example, with use of an infrastructure such as a current 3D-image transmission system as it is, it is possible to transmit an image having an aspect ratio different from that of a screen for monitoring, such as an ultra-wide-angle image and a plurality of stitching images. Further, it becomes also possible to display a monitoring image on a monitor or a viewfinder of a camera.

According to another embodiment of the present disclosure, there is provided an encoder system including:

a plurality of encoders each including an image decomposition unit configured to decompose an input image into a first component capable of being used as a monitoring image and a second component other than the first component, the input image being restored by coupling the first component and the second component to each other, and a compression coding unit configured to compression-code the second component, the plurality of encoders being each configured to output the decomposed first component and the compression-coded second component and each having a different image decomposition mode by the image decomposition unit;

an encoder selection unit configured, to select the plurality of encoders, to be used for encoding of the input image;

a first transmission-image configuration unit configured to allocate a plurality of first components output by the selected encoders to a plurality of sections that divide a space of a first-channel transmission image, and generate first header information including at least information on the allocation, to add the first header information to the first-channel transmission image;

a first transmission unit configured to transmit the first-channel transmission image provided with the first header information;

a second transmission-image configuration unit configured to allocate a plurality of second components output by the selected encoders to a plurality of sections that divide a space of a second-channel transmission image, and generate second header information including at least information on the allocation, to add the second header information to the second-channel transmission image; and a second transmission unit configured to transmit the second-channel transmission image provided with the second header information.

In the encoder system, at least one of the first transmission-image configuration unit and the second transmission-image configuration unit may generate association information that associates each of the first components allocated to each of the plurality of sections of the first-channel transmission image with each of the second components allocated to each of the plurality of sections of the second-channel transmission image and add the association information to at least one of the first header information and the second header information.

According to another embodiment of the present disclosure, there is provided a decoder system capable of being used in combination with an encoder system including a plurality of encoders each including an image decomposition unit configured to decompose an input image into a first component capable of being used as a monitoring image and a second component other than the first component, the input image being restored by coupling the first component and the second component to each other, and a compression coding unit configured to compression-code the second component, the plurality of encoders being each configured to output the decomposed first component and the compression-coded second component and each having a different image decomposition mode by the image decomposition unit, an encoder selection unit configured to select the plurality of encoders to be used for encoding of the input image, a first transmission-image configuration unit configured to allocate a plurality of first components output by the selected encoders to a plurality of sections that divide a space of a first-channel transmission image, and generate first header information including at least information on the allocation, to add the first header information to the first-channel transmission image, a first transmission unit configured to transmit the first-channel transmission image provided with the first header information, a second transmission-image configuration unit configured to allocate a plurality of second components output by the selected encoders to a plurality of sections that divide a space of a second-channel transmission image, and generate second header information including at least information on the allocation, to add the second header information to the second-channel transmission image, and a second transmission unit configured to transmit the second-channel transmission image provided with the second header information, the decoder system including:

a plurality of decoders each corresponding to each of the plurality of encoders;

an image acquisition unit configured to acquire the first-channel transmission image and the second-channel transmission image that are transmitted by the encoder system;

a first header analysis unit configured to selectively supply, based on the first header information provided to the acquired first-channel transmission image, the plurality of first components allocated to the respective plurality of sections of the first-channel transmission image to the plurality of decoders; and a second header analysis unit configured to selectively supply, based on the second header information provided to the acquired second-channel transmission image, the plurality of second components allocated to the respective plurality of sections of the second-channel transmission image to the plurality of decoders.

According to the encoder system and the decoder system described above, it is possible to mix a two-channel transmission image with a plurality of images compression-coded by various types of encoders to transmit the mixed image and perform decoding processing thereon on a decoder side in accordance with an encoding method for each image.

According to another embodiment of the present disclosure, there is provided a transmission adapter, including:

a first reception unit configured to receive a first-channel transmission image transmitted by an encoder including an image decomposition unit configured to input an image and decompose the input image into a first component capable of being used as a monitoring image and a second component other than the first component, the input image being restored by coupling the first component and the second component to each other, a first transmission unit configured to output the decomposed first component as the first-channel transmission image, a compression coding unit configured to compression-code the second component, and a second transmission unit configured to output the compression-coded second component as a second-channel transmission image;

a second reception unit configured to receive the second-channel transmission image transmitted by the encoder; and a sending unit configured to couple the first-channel transmission image received by the first reception unit and the second-channel transmission image received by the second reception unit to each other and convert a transmission form of the first-channel transmission image and the second-channel transmission image for transmission.

According to another embodiment of the present disclosure, there is provided an encoding method including:

decomposing an input image into a first component capable of being used as a monitoring image and a second component other than the first component, the input image being restored by coupling the first component and the second component to each other;

outputting the decomposed first component as a first-channel transmission image;

compression-coding the second component; and outputting the compression-coded second component as a second-channel transmission image.

According to another embodiment of the present disclosure, there is provided a decoding method including:

acquiring a first component output as a first-channel transmission image and a second component output as a second-channel transmission image by an encoding method including decomposing an input image into a first component capable of being used as a monitoring image and a second component other than the first component, the input image being restored by coupling the first component and the second component to each other, outputting the decomposed first component as the first-channel transmission image, compression-coding the second component, and outputting the compression-coded second component as the second-channel transmission image;

decompression-decoding the acquired second component; and coupling the acquired first component and the decompression-decoded second component to each other to restore the image in an original state.

According to another embodiment of the present disclosure, there is provided an imaging apparatus including an encoder including an image decomposition unit configured to input an image and decompose the input image into a first component capable of being used as a monitoring image and a second component other than the first component by frequency decomposition, the input image being restored by coupling the first component and the second component to each other, a first transmission unit configured to output the decomposed first component as a first-channel transmission image, a compression coding unit configured to compression-code the second component, and a second transmission unit configured to output the compression-coded second component as a second-channel transmission image.

As described above, the present disclosure can contribute to implementation of a system environment for next-generation high-definition videos.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 27 is a diagram showing an example of a data structure of a first transmission image;

DETAILED DESCRIPTION OF EMBODIMENTS

Figure 1:
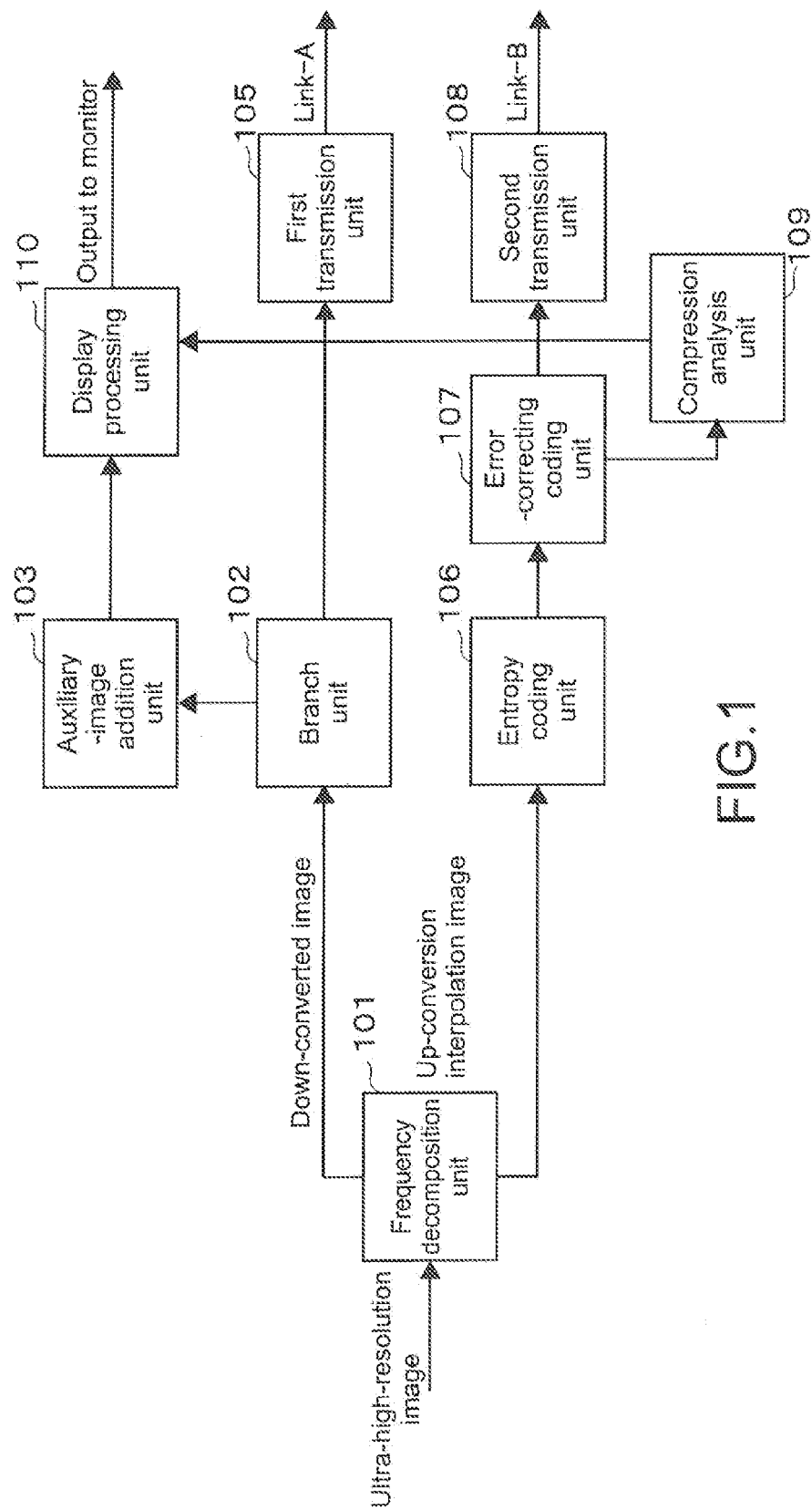
FIG. 1 is a block diagram showing a configuration of an encoder according to a first embodiment of the present disclosure.

Hereinafter, embodiments of the present disclosure will be described with reference to the drawings.

The present disclosure relates to an encoder that compression-codes an image and a decoder that decodes a compression-coded image.

The present disclosure includes the following embodiments, and the embodiments will be sequentially described.

1. Encoder and decoder suitable for ultra-high-resolution image
2. Encoder and decoder suitable for ultra-high-resolution image and focus adjustment
3. Encoder and decoder suitable for ultra-fast image
4. Encoder and decoder suitable for ultra-stereoscopic image
5. Encoder and decoder suitable for ultra-wide-angle image
6. Encoder system and decoder system in hybrid mode First Embodiment 1. Encoder and Decoder Suitable for Ultra-High-Resolution Image This embodiment relates to an encoder and a decoder that are capable of transmitting a next-generation ultra-high-resolution image such as a 4K high-definition image and an 8K high-definition image with use of an infrastructure such as a current, 3D-image transmission system capable of simultaneously transmitting two high-definition images through a two-channel digital signal transmission path.

In the current 3D-image transmission system, it is assumed that an image having a high-definition image size is transmitted for each channel. Therefore, it is difficult to transmit an ultra-high-resolution image such as a 4K high-definition image or an 8K high-definition image in the current 3D-image transmission system. Further, in the current 3D-image transmission system, a high-definition image transmitted through one of the channels is displayed as it is on a monitor or a viewfinder of a camera to perform monitoring of a captured video. This means that an ultra-high-resolution image such as a 4K high-definition image or an 8K high-definition image is difficult to be monitored using the monitor or the viewfinder of the camera and the like. This embodiment can address such a problem.

To transmit a digital signal, i.LINK (registered trademark), optical fiber transmission, 3G-SDI (3G-Single Document Interface), a storage apparatus, and the like are used. In this embodiment, a case of adopting two channels of a Link-A and a Link-B as i.LINK (registered trademark) will be described.

[Configuration of Encoder 100]

FIG. 1 is a block diagram showing a configuration of an encoder 100 suitable for an ultra-high-resolution image according to a first embodiment of the present disclosure.

As shown in FIG. 1, the encoder 100 includes a frequency decomposition unit 101 (image decomposition unit), a branch unit 102, an auxiliary-image addition unit 103, a first transmission unit 105, an entropy coding unit 106 (compression coding unit), an error-correcting coding unit 107, a second transmission unit 108, a compression analysis unit 109, and a display processing unit 110 (output unit).

The frequency decomposition unit 101 separates an input ultra-high-resolution image (hereinafter, referred to simply as "image" in this embodiment) into a low-frequency component (first component) usable as a monitoring image and other high-frequency components (second component) by frequency decomposition: Here, as the method for frequency decomposition, for example, Wavelet transform can be used. In Wavelet transform, an image is separated into a low-frequency component, an X-direction high-frequency component, a Y-direction high-frequency component, and an XY-direction high-frequency component. In the case where an input image is a 4K high-definition image, a low-frequency component is changed to an image that is reduced in size to a high-definition image size by performing Wavelet transform once. Further, in the case where an input image is an 8K high-definition image, by performing two steps of Wavelet transform, a low-frequency component is changed to an image that is reduced in size to a high-definition image size. Here, a resolution of the monitoring image is set to, for example, a high-definition image size.

The branch unit 102 supplies the low-frequency component of the image acquired by the frequency decomposition unit 101 to the auxiliary-image addition unit 103 and the first transmission unit 105.

The auxiliary-image addition unit 103 adds an auxiliary image for assisting a user in monitoring a captured image, such as a marker, a pattern of diagonal lines (hereinafter, referred to as zebra pattern), or a character string, to the low-frequency component of the image supplied from the branch unit 102. The low-frequency component of the image provided with the auxiliary image can be used as a monitoring image, and the monitoring image is supplied to a monitor or a viewfinder of a camera through the display processing unit 110 and then displayed thereon.

The first transmission unit 105 transmits the low-frequency component of the image supplied from the branch unit 102, by using a Link-A of i.LINK (registered trademark).

The entropy coding unit 106 compresses the high-frequency component of the image acquired by the frequency decomposition unit 101 by entropy coding. Examples of the entropy coding method include Huffman coding and arithmetic coding.

The error-correcting coding unit 107 adds an error-correcting code to the entropy-coded high-frequency component of the image.

The second transmission unit 108 transmits the high-frequency component of the image provided with the error-correcting code in the error-correcting coding unit 107, by using a Link-B.

The compression analysis unit 109 analyzes a size of the high-frequency component of the image provided with the error-correcting code and supplies a result of the analysis to the monitor or the viewfinder of the camera and the like through the display processing unit 110.

[Operation of Encoder 100]

Figure 2:
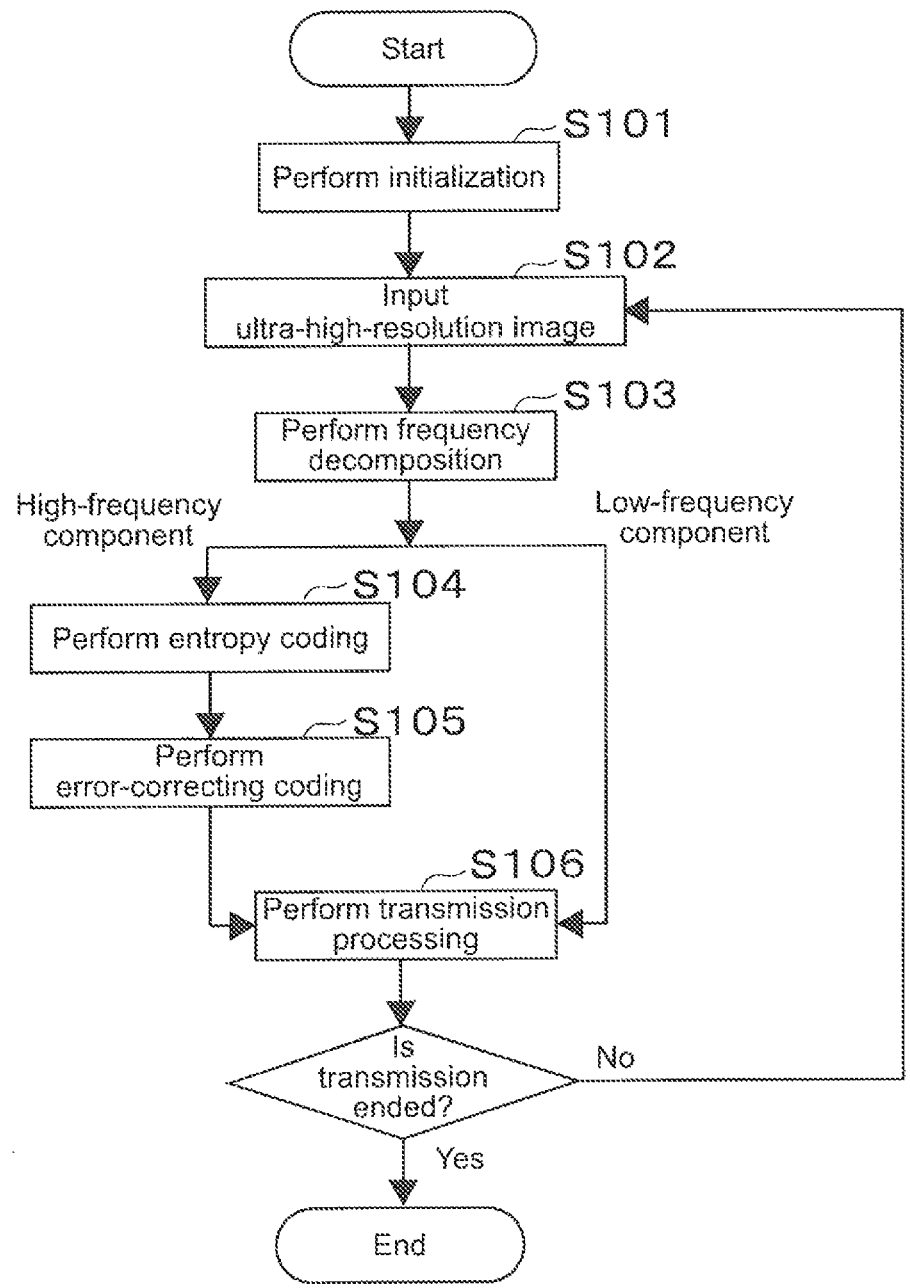
FIG. 2 is a flowchart showing a procedure of an operation of the encoder according to the first embodiment.

FIG. 2 is a flowchart showing a procedure of an operation of the encoder 100 according to the first embodiment.

Firstly, initialization of the encoder 100 that includes initialization of a register, a memory, and the like in the encoder 100 is performed (Step S101). After that, an image is input to the encoder 100 (Step S102). The image input to the encoder 100 is separated into a low-frequency component and a high-frequency component in the frequency decomposition unit 101 (Step S103) as shown in FIG. 3.

Figure 3:
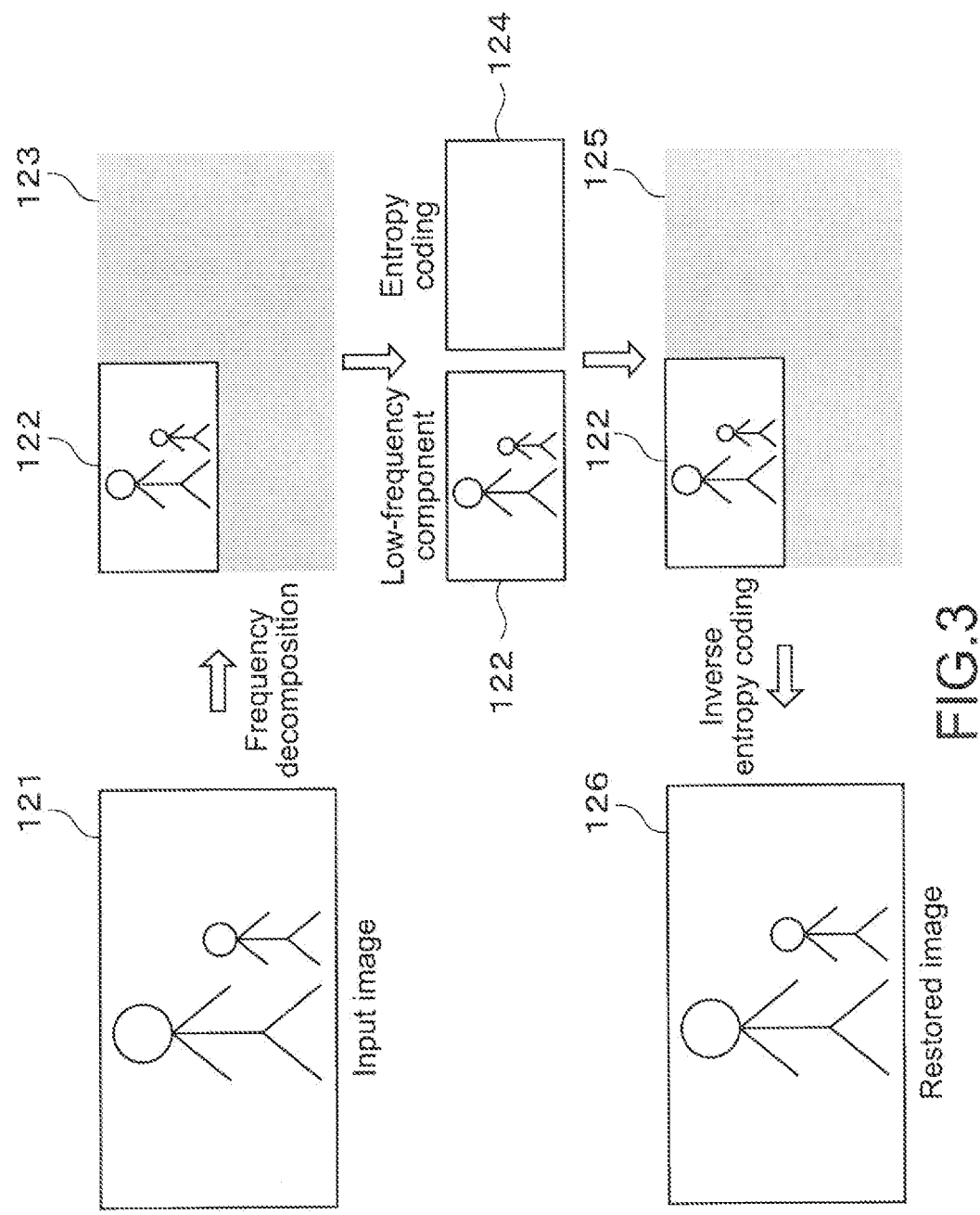
FIG. 3 is a conceptual diagram of encoding processing and decoding processing according to the first embodiment.

FIG. 3 is a conceptual diagram of encoding processing and decoding processing in the case where an input image 121 is a 4K high-definition image and Wavelet transform is used as a method for frequency decomposition. In this way, in the case where an input image is a 4K high-definition image, the low-frequency component separated in the frequency decomposition unit 101 is changed to an image 122 of a high-definition image size and supplied to the branch unit 102.

Referring back to FIG. 2, the low-frequency component of the image is supplied to the first transmission unit 105 and the auxiliary-image addition unit 103 by the branch unit 102. Accordingly, the low-frequency component of the image is transmitted by the first transmission unit 105, by using the Link-A (Step S106). Further, the low-frequency component with the auxiliary image added by the auxiliary-image addition unit 103 is supplied to a monitor or a viewfinder of a camera and the like through the display processing unit 110 and then displayed thereon.

Meanwhile, the high-frequency, component of the image separated in the frequency decomposition unit 101 (denoted by reference numeral 123 in FIG. 3) is subjected to entropy coding (denoted by reference numeral 124 in FIG. 3) in the entropy coding unit 106 (Step S104), and then provided with an error-correcting code in the error-correcting coding unit 107 (Step S105). The high-frequency component of the image provided with the error-correcting code is transmitted by the second transmission unit 108 by using the Link-B (Step S106).

Further, the high-frequency component of the image provided with the error-correcting code is supplied to the compression analysis unit 109. The compression analysis unit 109 analyzes a size of the entropy-coded high-frequency component of the image, and supplies a result of the analysis to the monitor or the viewfinder of the camera and the like through the display processing unit 110 and displays it thereon.

[Configuration of Decoder 150]

Next, description will be given on a configuration of a decoder 150 that decodes an image compression-coded by the encoder 100 described above.

Figure 4:
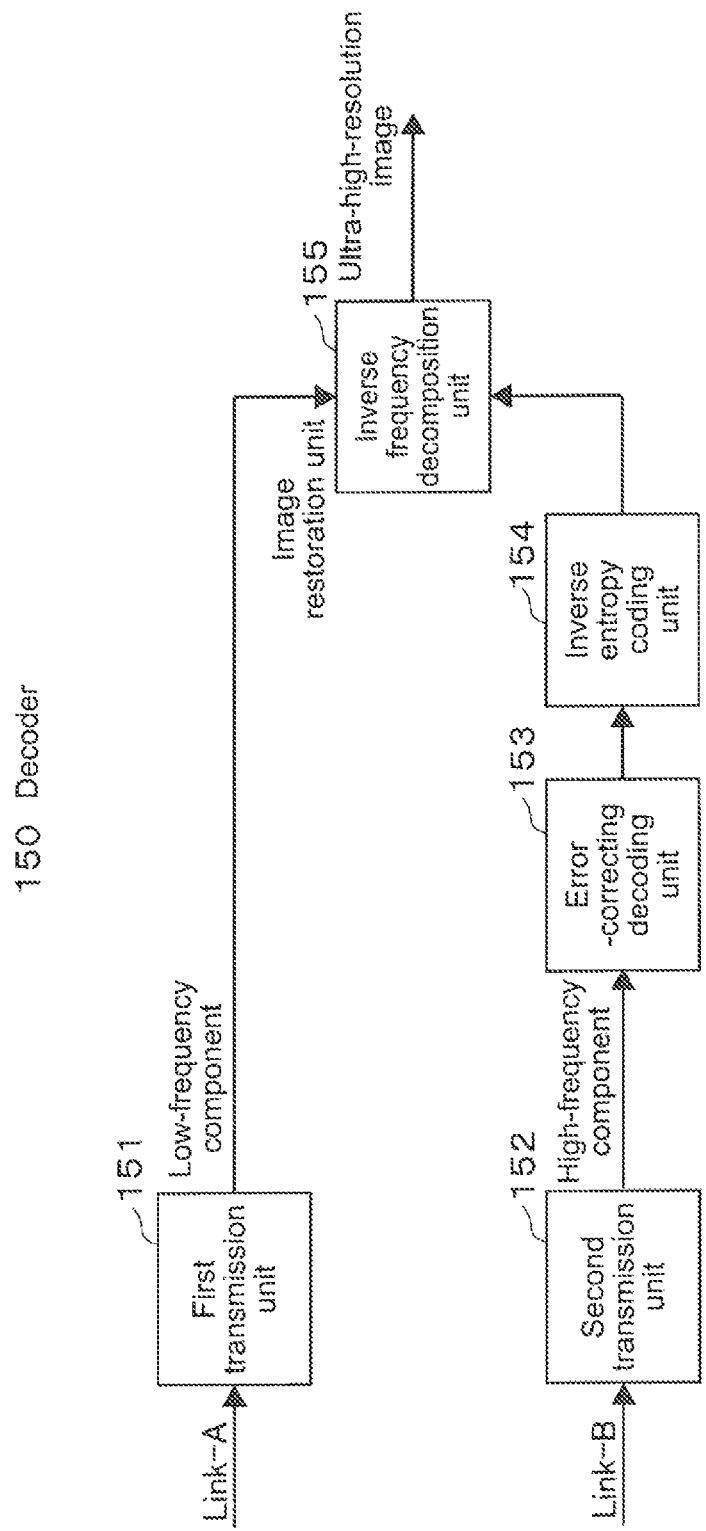
FIG. 4 is a block diagram showing a configuration of a decoder according to the first embodiment.

FIG. 4 is a block diagram showing the configuration of the decoder 150. The decoder 150 includes a first transmission unit 151 (image acquisition unit), a second transmission unit 152 (image acquisition unit), an error-correcting decoding unit 153, an inverse entropy coding unit 154 (decompression decoding unit), and an inverse frequency decomposition unit 155 (image restoration unit).

The first transmission unit 151 receives the low-frequency component of the image transmitted through the Link-A and supplies the low-frequency component to the inverse frequency decomposition unit 155.

The second transmission unit 152 receives the high-frequency component of the image transmitted through the Link-B and supplies the high-frequency component to the error-correcting decoding unit 153.

The error-correcting decoding unit 153 performs error-correcting decoding on the high-frequency component of the image supplied from the second transmission unit 152.

The inverse entropy coding unit 154 performs inverse entropy coding on the high-frequency component of the image decoded in the error-correcting decoding unit 153.

The inverse frequency decomposition unit 155 couples the inverse-entropy-coded high-frequency component of the image (denoted by reference numeral 125 in FIG. 3) and the low-frequency component of the image supplied from the first transmission unit 151 (denoted by reference numeral 122 in FIG. 3) to each other by inverse frequency decomposition to thereby restore the ultra-high-resolution image (denoted by reference numeral 126 in FIG. 3).

[Operation of Decoder 150]

Figure 5:
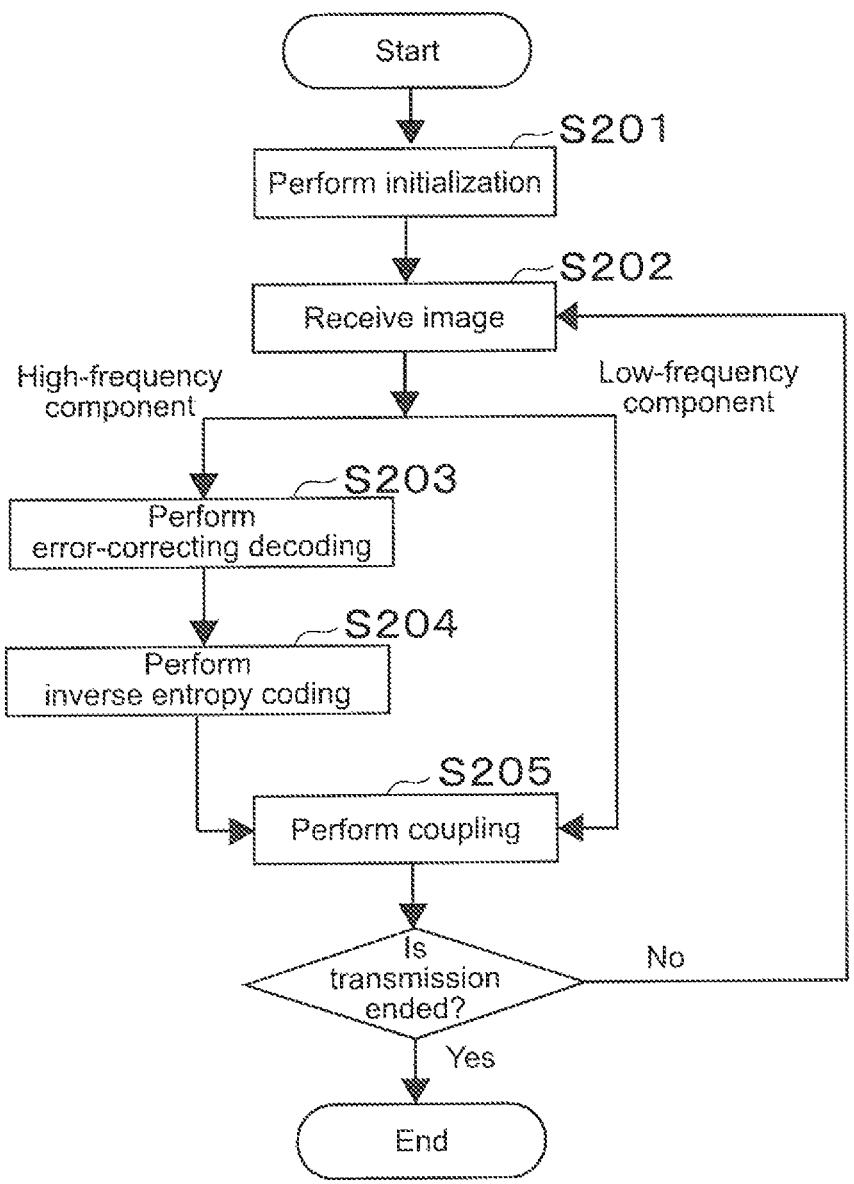
FIG. 5 is a flowchart showing a procedure of an operation of the decoder according to the first embodiment.

FIG. 5 is a flowchart showing a procedure of an operation of the decoder 150 according to the first embodiment.

Firstly, initialization of the decoder 150 is performed (Step S201). After that, the low-frequency component of the image transmitted through the Link-A (denoted by reference numeral 122 in FIG. 3) and the high-frequency component of the image transmitted through the Link-B (denoted by reference numeral 125 in FIG. 3) are received in the first transmission unit 151 and the second transmission unit 152, respectively (Step S202).

The low-frequency component of the image received in the first transmission unit 151 (denoted by reference numeral 122 in FIG. 3) is supplied to the inverse frequency decomposition unit 155. Meanwhile, the high-frequency component of the image received in the second transmission unit 152 (denoted by reference numeral 125 in FIG. 3) is decoded in the error-correcting decoding unit 153 (Step S203), and then inverse-entropy-coded in the inverse entropy coding unit 154 (Step S204), to be supplied to the inverse frequency decomposition unit 155. Then, the low-frequency component of the image (denoted by reference numeral 122 in FIG. 3) and the high-frequency component of the image inverse-entropy-coded in the inverse entropy coding unit 154 (denoted by reference numeral 125 in FIG. 3) are coupled to each other in the inverse frequency decomposition unit 155 by inverse frequency decomposition (Step S205). Accordingly, the original ultra-high-resolution image (denoted by reference numeral 126 in FIG. 3) is restored.

As described above, according to the encoder 100 and the decoder 150 of this embodiment, for example, with use of an infrastructure such as a current 3D-image transmission system as it is, it is possible to transmit next-generation ultra-high-resolution images such as a 4K high-definition image and an 8K high-definition image and also display a monitoring image on a monitor or a viewfinder of a camera.

Second Embodiment

2. Encoder and Decoder Suitable for Ultra-High-Resolution Image, Focus Adjustment, and the Like In the first embodiment, the low-frequency component of the image acquired by frequency decomposition is supplied to the display processing unit 110, the monitor or the viewfinder of the camera, and the like and displayed thereon. Here, in the case where a camera operator adjusts the focus of the camera while viewing the image through the viewfinder of the camera etc. or selects automatic focus adjustment based on the image, it is difficult to perform focus adjustment with high accuracy. The Second embodiment can address such a problem.

[Configuration of Encoder 200 Suitable for Ultra-High-Resolution Image, Focus Adjustment, and the Like]

Figure 6:
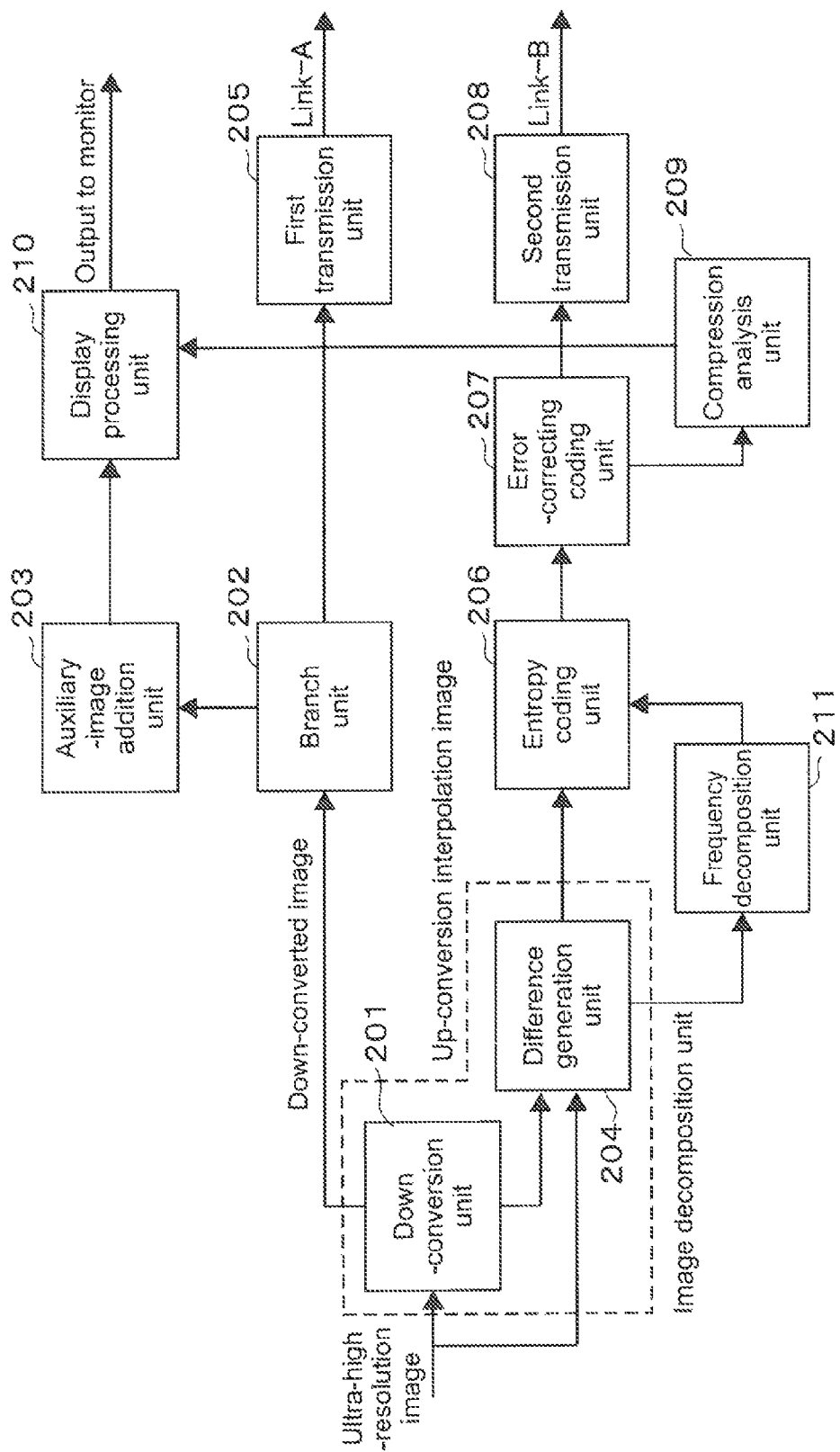
FIG. 6 is a block diagram showing a configuration of an encoder according to a second embodiment of the present disclosure.

FIG. 6 is a block diagram showing a configuration of the encoder 200 suitable for an ultra-high-resolution image, focus adjustment, and the like according to the second embodiment of the present disclosure.

As shown in FIG. 6, the encoder 200 includes a down-conversion unit 201, a branch unit 202, an auxiliary-image addition unit 203, a first transmission unit 205 (first transmission unit), a difference generation unit 204, an entropy coding unit 206 (compression coding unit), an error-correcting coding unit 207, a second transmission unit 208 (second transmission unit), a compression analysis unit 209, a display processing unit 210, and a frequency decomposition unit 211. Here, the down-conversion unit 201 and the difference generation unit 204 constitute an image decomposition unit.

The down-conversion unit 201 generates, by down-converting an input ultra-high-resolution image, a down-converted image (first component) of a high-definition image size that is usable as a monitoring image. To generate a down-converted image including sufficient high-frequency components, for example, a bicubic method capable of reducing an image in size while leaving high-definition details is adopted as the down-conversion method. The bicubic method is a method of calculating a value of a neighboring pixel based on a value of a center pixel using a cubic function. It should be noted that in the present disclosure, the method used here is not limited to the bicubic method as long as a method to be used is capable of reducing an image in size while leaving high-definition details.

The branch unit 202 supplies the down-converted image generated by the down-conversion unit 201 to the auxiliary-image addition unit 203 and the first transmission unit 205.

The first transmission unit 205 transmits the down-converted image supplied from the branch unit 202 by using the Link-A.

The auxiliary-image addition unit 203 adds an auxiliary image for assisting a user in monitoring a captured image, such as a marker, a zebra pattern, or a character string, to the low-frequency component of the image supplied from the branch unit 202. The low-frequency component of the image provided with the auxiliary image can be used as a monitoring image, and the monitoring image is supplied to a monitor or a viewfinder of a camera through the display processing unit 210 and then displayed thereon.

The difference generation unit 204 generates a difference between the input image and an image obtained by enlarging in pixel the down-converted image to a resolution of the input image (for example, 4K high-definition image size), as an up-conversion interpolation image.

The entropy coding unit 206 entropy-codes the up-conversion interpolation image that is generated by the difference generation unit 204. Examples of the entropy coding method include Huffman coding and arithmetic coding.

The error-correcting coding unit 207 adds an error-correcting code to the entropy-coded up-conversion interpolation image.

The second transmission unit 208 transmits the up-conversion interpolation image provided with the error-correcting code, by using the Link-B.

The compression analysis unit 209 analyzes a size of the entropy-coded up-conversion interpolation image and supplies a result of the analysis to the monitor or the viewfinder of the camera and the like through the display processing unit 210 to display the result thereon.

Further, in the encoder 200, the up-conversion interpolation image generated by the difference generation unit 204 may be subjected to frequency decomposition in the frequency decomposition unit 211 and thereafter only the high-frequency component may be supplied to the entropy coding unit 206. Alternatively, a user may switch between on and off of execution of frequency decomposition as necessary. For example, the following case is conceived. In the case where a user confirms the analysis result of the size of the up-conversion interpolation image, which is obtained by the compression analysis unit 209, through the monitor of the camera and the like, when the size exceeds a certain reference value, the user turns on the execution of frequency decomposition.

[Operation of Encoder 200]

Figure 7:
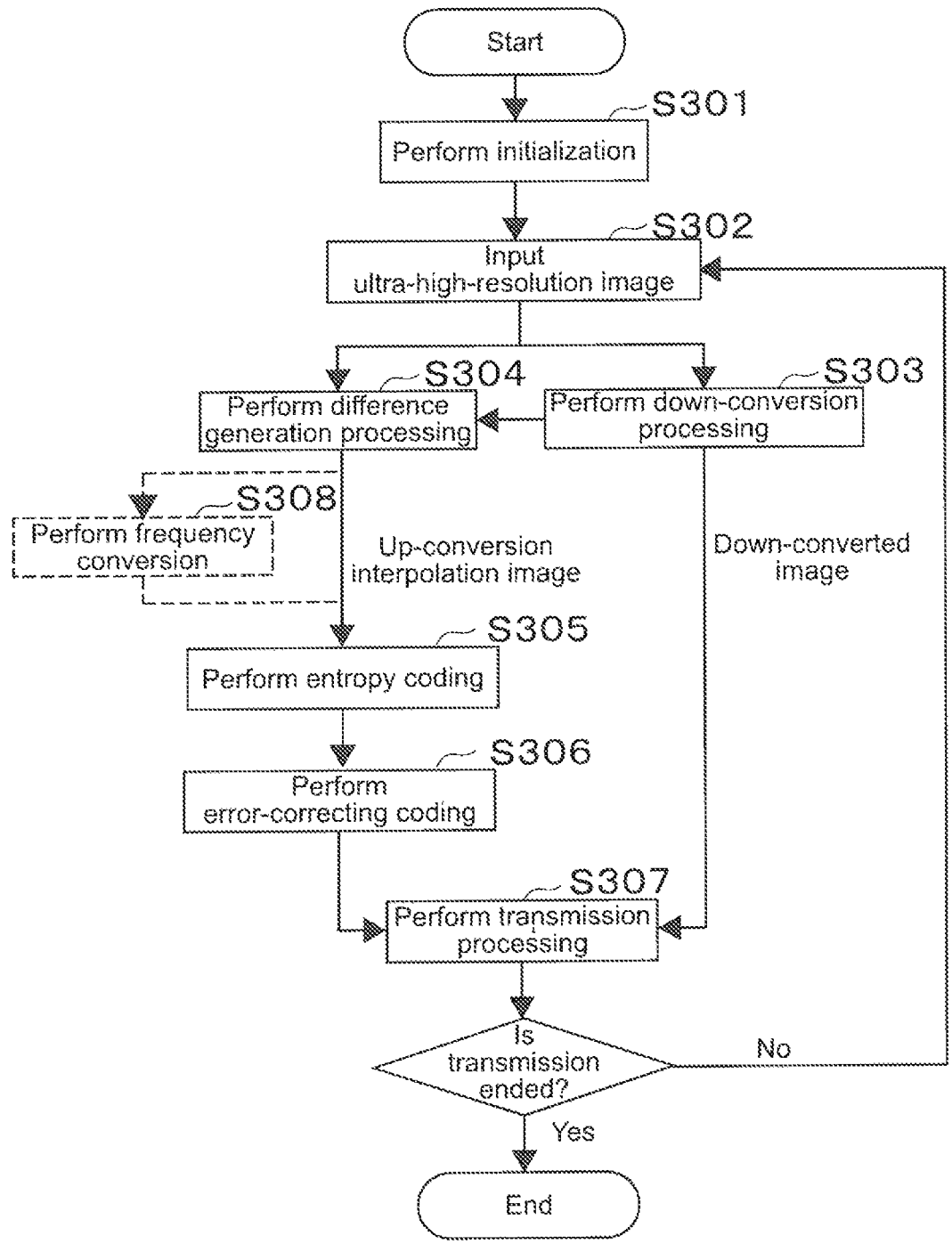
FIG. 7 is a flowchart showing a procedure of an operation of the encoder according to the second embodiment.

FIG. 7 is a flowchart showing a procedure of an operation of the encoder 200 according to the second embodiment.

Firstly, initialization of the encoder 200 that includes initialization of a register, a memory, and the like in the encoder 200 is performed (Step S301). After that, an ultra-high-resolution image such as a 4K high-definition image is input to the encoder 200 (Step S302).

Figure 8:
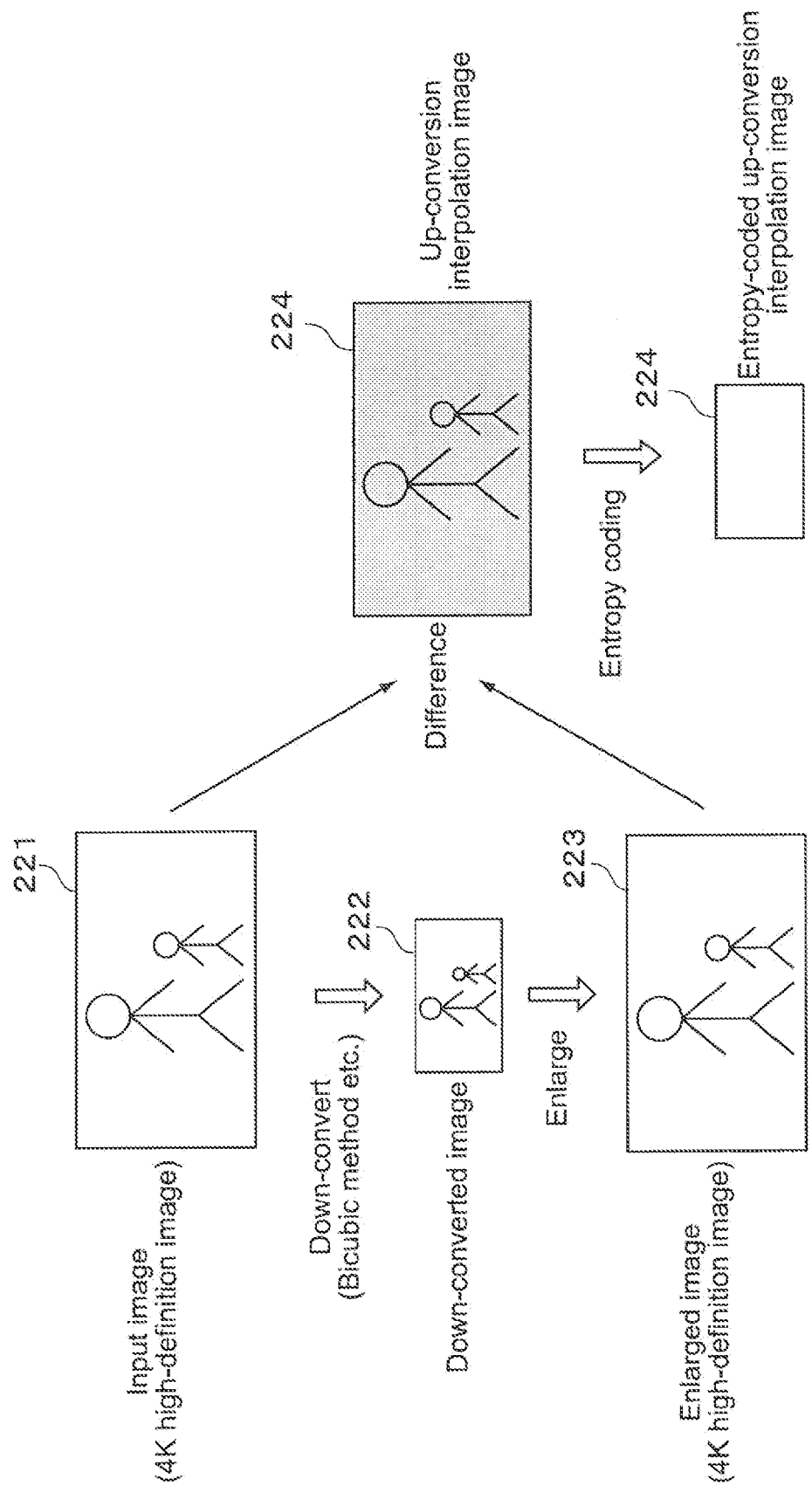
FIG. 8 is a conceptual diagram of encoding processing according to the second embodiment.

FIG. 8 is a conceptual diagram of an encoding operation by the encoder 200 according to this embodiment in the case where an input image 221 is a 4K high-definition image and a bicubic method is used as a down-conversion method, for example. As shown in FIG. 8, the ultra-high-resolution image 221 input to the encoder 200 is down-converted to an image of a high-definition image size in which high-definition details are left by the down-conversion unit 201, with the result that the ultra-high-resolution image 221 becomes a down-converted image 222 that is usable as a monitoring image (Step S303).

The down-converted image 222 is supplied to each of the branch unit 202 and the difference generation unit 204 and then supplied to the first transmission unit 205 and the auxiliary-image addition unit 203 by the branch unit 202. Then, the down-converted image is transmitted by the first transmission unit 205, by using the Link-A (Step S307). Further, the low-frequency component with the auxiliary image added by the auxiliary-image addition unit 203 is usable as a monitoring image. The low-frequency component with the auxiliary image is supplied to the monitor or the viewfinder of the camera and the like through the display processing unit 210 and then displayed thereon. Here, since sufficient high-frequency components are left in the down-converted image, it is possible to successfully perform adjustment processing that is necessary for high definition of an image, such as manual focus adjustment and automatic focus adjustment, with use of the down-converted image.

Meanwhile, the difference generation unit 204 enlarges in pixel the down-converted image input by the down-conversion unit 201 to a resolution of the input image (for example, 4K high-definition image size) to generate an enlarged image 223 shown in FIG. 8. The difference generation unit 204 generates a difference between the enlarged image 223 and the input image 221 as an up-conversion interpolation image 224 (Step S304) and supplies the up-conversion interpolation image 224 to the entropy coding unit 206. The up-conversion interpolation image is entropy-coded in the entropy coding unit 206 (Step S305) and then provided with an error-correcting code in the error-correcting coding unit 207 (Step S306). After that, data of the up-conversion interpolation image provided with the error-correcting code is transmitted by the second transmission unit 208 by using the Link-B (Step S307).

Further, the entropy-coded high-frequency component is supplied to the compression analysis unit 209. The compression analysis unit 209 analyzes a size of the entropy-coded high-frequency component and supplies a result of the analysis to the monitor or the viewfinder of the camera and the like through the display processing unit 210 to display the result thereon. At that time, for example, in the case where a value on the analysis result of the size of the entropy-coded up-conversion interpolation image exceeds a certain reference value, the up-conversion interpolation image generated by the difference generation unit 204 is subjected to frequency decomposition in the frequency decomposition unit 211 and only the high-frequency component is supplied to the entropy coding unit 206 as necessary. Accordingly, it is possible to reduce the size of the entropy-coded up-conversion interpolation image and suppress, as quickly as possible, occurrence of a situation in which the up-conversion interpolation image is not transmitted in time in relation to a transmission band.

[Configuration of Decoder 250]

Next, description will be given on a configuration of a decoder 250 that decodes an image compression-coded by the encoder 200 described above.

Figure 9:
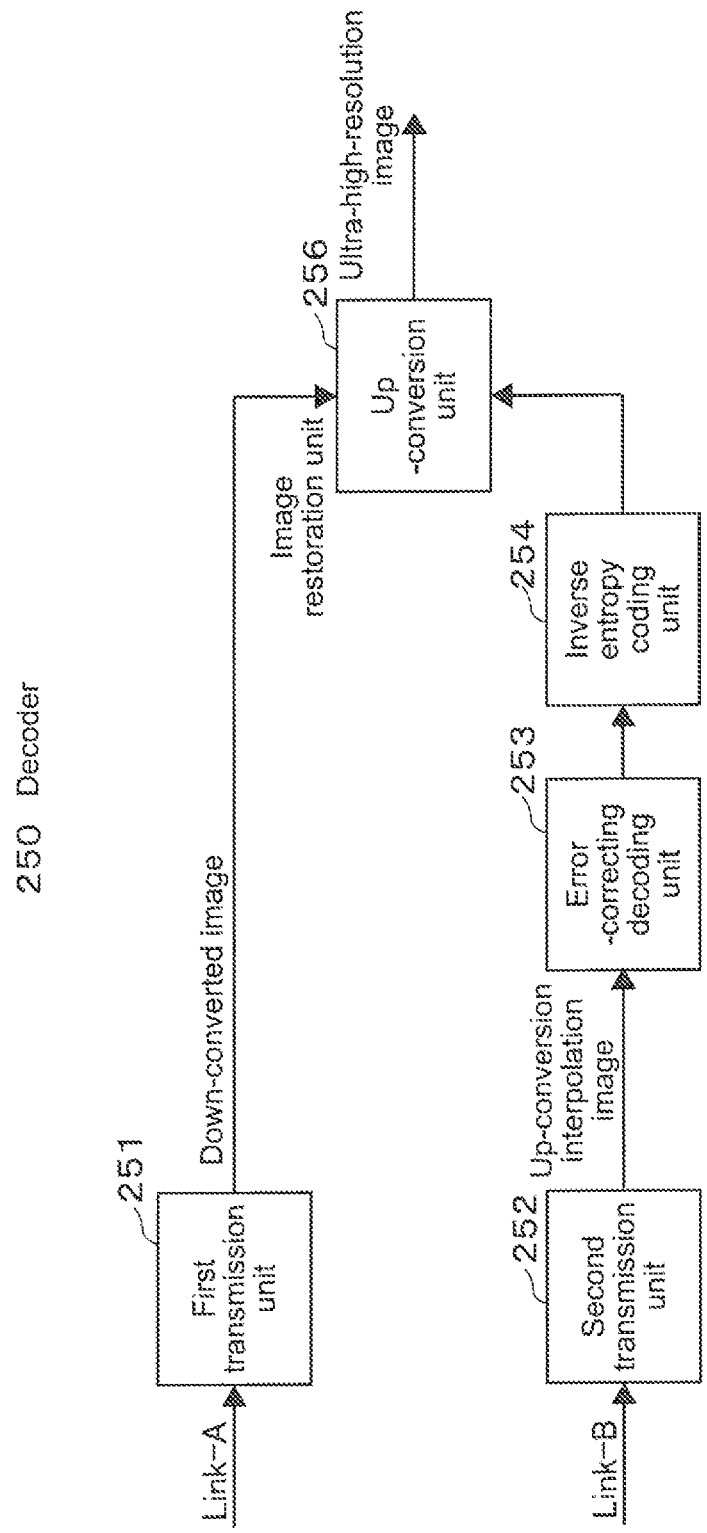
FIG. 9 is a block diagram showing a configuration of a decoder according to the second embodiment.

FIG. 9 is a block diagram showing the configuration of the decoder 250. The decoder 250 includes a first transmission unit 251 (image acquisition unit), a second transmission unit 252 (image acquisition unit), an error-correcting decoding unit 253, an inverse entropy coding unit 254 (decompression decoding unit), and an up-conversion unit 256 (image restoration unit).

The first transmission unit 251 receives the down-converted image transmitted through the Link-A and supplies the down-converted image to the up-conversion unit 256.

The second transmission unit 252 receives the up-conversion interpolation image transmitted through the Link-B and supplies the up-conversion interpolation image to the error-correcting decoding unit 253.

The error-correcting decoding unit 253 performs error-correcting decoding on the up-conversion interpolation image supplied from the second transmission unit 252.

The inverse entropy coding unit 254 inverse-entropy-codes the up-conversion interpolation image that have been subjected to the error-correcting decoding in the error-correcting decoding unit 253 and supplies a result of the inverse entropy coding to the up-conversion unit 256.

The up-conversion unit 256 up-convers the down-converted image supplied from the first transmission unit 251 with use of the up-conversion interpolation image supplied from the inverse entropy coding unit 254 to thereby restore the original ultra-high-resolution image. More specifically, the up-conversion unit 256 can restore the original ultra-high-resolution image by a procedure of enlarging in pixel the down-converted image and adding the enlarged image and the up-conversion interpolation image to each other.

(Operation of Decoder 250)

Figure 10:
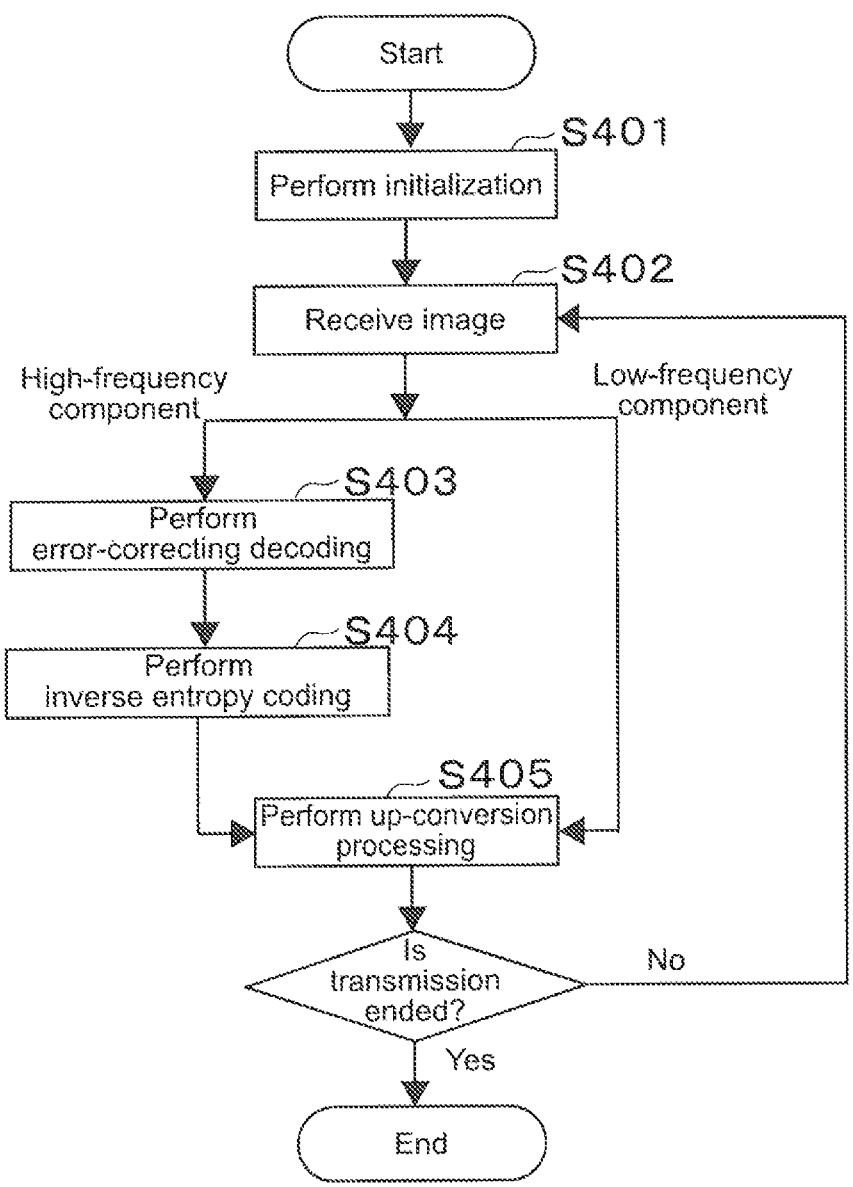
FIG. 10 is a flowchart showing a procedure of an operation of the decoder according to the second embodiment.

FIG. 10 is a flowchart showing a procedure of an operation of the decoder 250 according to the second embodiment.

Firstly, initialization of the decoder 250 that includes initialization of a register, a memory, and the like in the decoder 250 is performed (Step S401). After that, the down-converted image and the up-conversion interpolation image that are transmitted through the Link-A and the Link-B are received by the first transmission unit 251 and the second transmission unit 252, respectively (Step S402).

The down-converted image received by the first transmission unit 251 is supplied to the up-conversion unit 256. Meanwhile, the up-conversion interpolation image received by the second transmission unit 252 is decoded in the error-correcting decoding unit 253 (Step S403), inverse-entropy-coded in the inverse entropy coding unit 254 (Step S404), and then supplied to the up-conversion unit 256. Then, in the up-conversion unit 256, the down-converted image is up-converted using the up-conversion interpolation image that has been inverse-entropy-coded, with the result that the original ultra-high-resolution image is restored (Step S405).

As described above, according to the encoder 200 and the decoder 250 of this embodiment, for example, with use of an infrastructure such as a current 3D-image transmission system as it is, it is possible to successfully transmit next-generation ultra-high-resolution images such as a 4K high-definition image and an 8K high-definition image. Further, since in the encoder 200 of this embodiment, a down-converted image including sufficient high-frequency components is obtained as a monitoring image, it is possible to successfully perform camera adjustment: that is necessary for high definition of an image, such as focus adjustment.

Third Embodiment

3. Encoder and Decoder Suitable for Ultra-Fast Image

This embodiment relates to an encoder and a decoder that are capable of transmitting an ultra-fast high-definition image (hereinafter, referred to as "ultra-fast image") having a frame rate higher than a monitoring frame rate of a current 3D-image transmission system with use of an infrastructure such as the current 3D-image transmission system capable of simultaneously transmitting two high-definition images at 59.94 frame/seconds through, for example, a two-channel digital signal transmission path.

[Configuration of Encoder 300 Suitable for Ultra-Fast Image]

Figure 11:
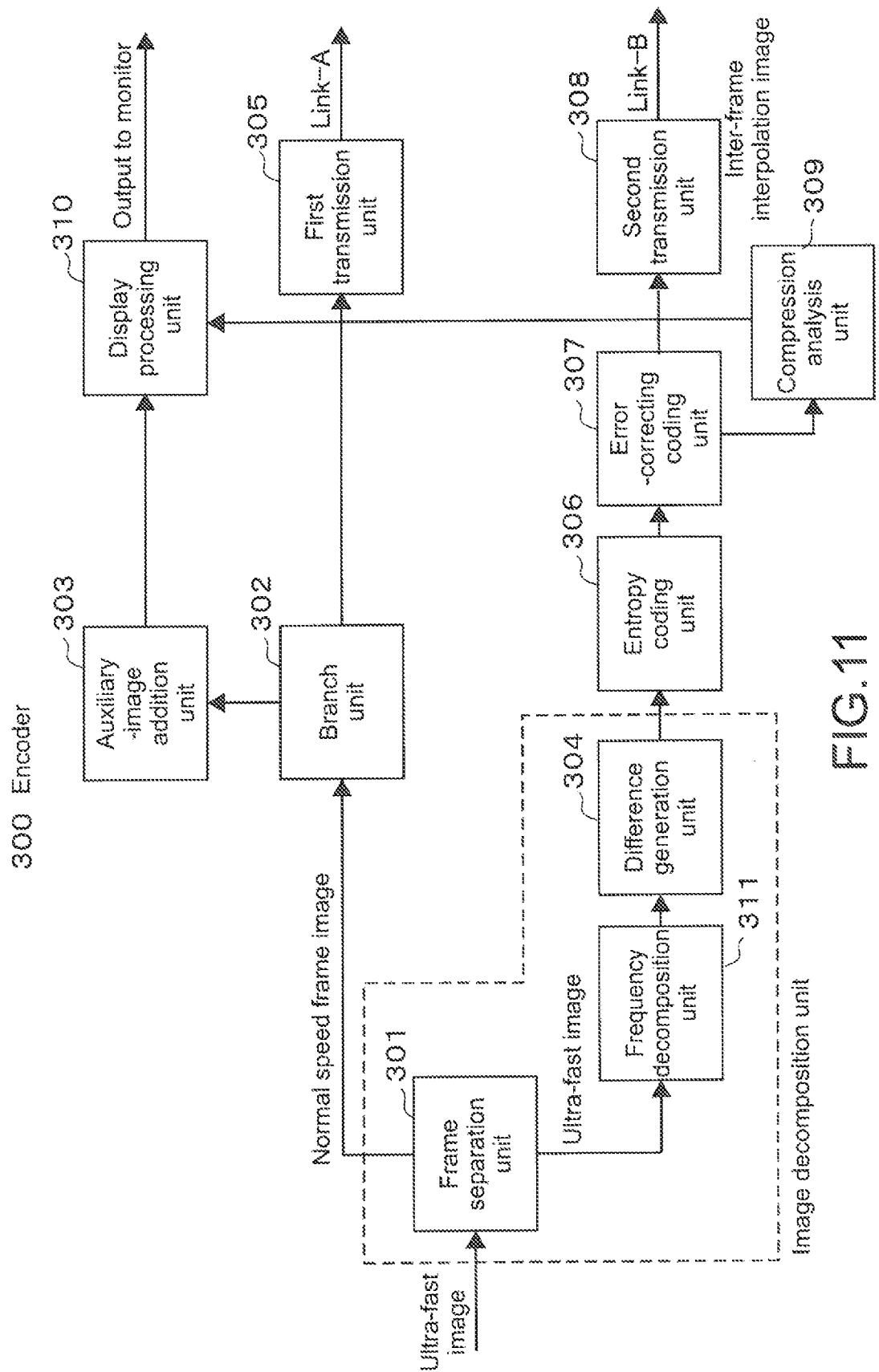
FIG. 11 is a block diagram showing a configuration of an encoder according to a third embodiment of the present disclosure.

FIG. 11 is a block diagram showing a configuration of an encoder 300 according to a third embodiment of the present disclosure.

As shown in FIG. 11, the encoder 300 includes a frame separation unit 301, a branch unit 302, an auxiliary-image addition unit 303, a frequency decomposition unit 311, a first transmission unit 305, a difference generation unit 304, an entropy coding unit 306 (compression coding unit), an error-correcting coding unit 307, a second transmission unit 308, a compression analysis unit 309, and a display processing unit 310. Here, the frame separation unit 301, the frequency decomposition Unit 311, and the difference generation unit 304 constitute an image decomposition unit.

Input to the encoder 300 is an ultra-fast image constituted of a plurality of frames sequentially imaged at a frame rate higher than a frame rate (hereinafter, referred to as "standard frame rate") for each channel in specifications of a current 3D-image transmission system or the like used as an infrastructure. Further, in the current 3D-image transmission system, since a high-definition image transmitted using one of the channels is displayed as it is on a monitor or a viewfinder of a camera and the like to monitor a captured video, a monitoring frame rate in the camera is the same as the standard frame rate.

The frame separation unit 301 supplies the input ultra-fast image to the frequency decomposition unit 311, while the frame separation unit 301 separates a frame from the ultra-fast image at the standard frame rate to supply the frame to the branch unit 302 as a normal speed frame (monitoring frame=first component).

The branch unit 302 supplies the normal speed frame separated by the frame separation unit 301 to the auxiliary-image addition unit 303 and the first transmission unit 305.

The auxiliary-image addition unit 303 adds an auxiliary image for assisting a user in monitoring an image, such as a marker, a zebra pattern, or a character string, to the normal speed frame supplied from the branch unit 302. The normal speed frame provided with the auxiliary image is supplied to the monitor or the viewfinder of the camera and the like through the display processing unit 310 and then displayed thereon as a monitoring image.

The first transmission unit 305 transmits the normal speed frame supplied from the branch unit 302, by using the Link-A.

The frequency decomposition unit 311 separates the input ultra-fast image into a low-frequency component and a high-frequency component. Examples of the frequency decomposition method include Wavelet transform described above.

The difference generation unit 304 obtains differences in low-frequency component of the ultra-fast image separated by the frequency decomposition unit 311 between the normal speed frame and the other frames (non-monitoring frames) to combine the differences with the high-frequency components of the respective non-monitoring frames, and then supplies the resultant to the entropy coding unit 306.

The entropy coding unit 306 compresses data supplied from the difference generation unit 304 by entropy coding. Examples of the entropy coding method include Huffman coding and arithmetic coding.

The error-correcting coding unit 307 adds an error-correcting code to the entropy-coded data and supplies the resultant data to the second transmission unit 308.

The second transmission unit 308 transmits the data with the error-correcting code added in the error-correcting coding unit 307, as an "inter-frame interpolation image" (second component), by using the Link-B.

The compression analysis unit 309 analyzes a size of the inter-frame interpolation image and supplies a result of the analysis as visible information to the monitor or the viewfinder of the camera and the like through the display processing unit 310.

[Operation of Encoder 300]

Figure 12:
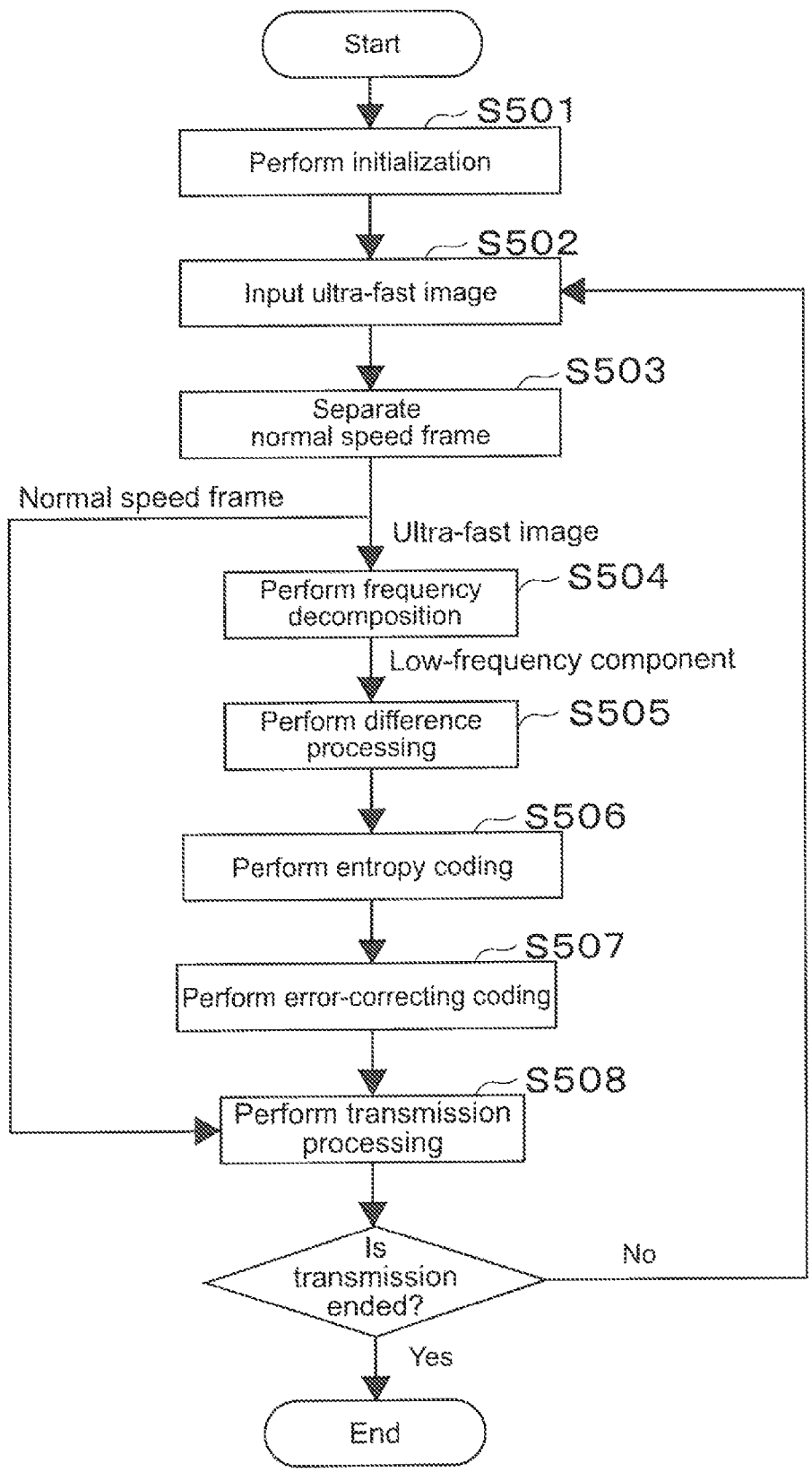
FIG. 12 is a flowchart showing a procedure of an operation of the encoder according to the third embodiment.

FIG. 12 is a flowchart showing a procedure of an operation of the encoder 300.

Firstly, initialization of the encoder 300 that includes initialization of a register, a memory, and the like in the encoder 300 is performed (Step S501). After that, an ultra-fast image is input to the encoder 300 (Step S502). The ultra-fast image input to the encoder 300 is input to the frame separation unit 301. The frame separation unit 301 supplies the input ultra-fast image as it is to the frequency decomposition unit 311, while the frame separation unit 301 separates a frame from the ultra-fast image at a standard frame rate to supply the frame to the branch unit 302 as a normal speed frame (monitoring frame). The normal speed frame is supplied by the branch unit 302 to the first transmission unit 305 and the auxiliary-image addition unit 303. Then, the normal speed frame is transmitted by the first transmission unit 305 through the Link-A (Step S508).

Further, the normal speed frame with an auxiliary image added by the auxiliary-image addition unit 303 is supplied to the monitor or the viewfinder of the camera and the like through the display processing unit 310 and then displayed thereon as a monitoring image.

Meanwhile, the frequency decomposition unit 311 separates low-frequency components from respective frames of the ultra-fast image supplied from the frame separation unit 301 and supplies the low-frequency components to the difference generation unit 304 (Step S504). The difference generation unit 304 obtains one or more data items on difference in low-frequency component of the ultra-fast image supplied from the frequency decomposition unit 311 between the normal speed frame (monitoring frame) and one or more frames (non-monitoring frames), the one or more frames being located between the normal speed frame and the next normal speed frame. The difference generation unit 304 outputs, for each of the non-monitoring frames, a combination of the difference data item and a high-frequency component separated from each non-monitoring frame by the frequency decomposition unit 311, to the entropy, coding unit 306 (Step S505).

Subsequently, after the data output from the difference generation unit 304 is entropy-coded in the entropy coding unit 306 (Step S506), an error-correcting code is added to the data in the error-correcting coding unit 307 (Step S507). The data provided with the error-correcting code is transmitted as an inter-frame interpolation image (second component) by the second transmission unit 308, by using the Link-B (Step S508).

Figure 13:
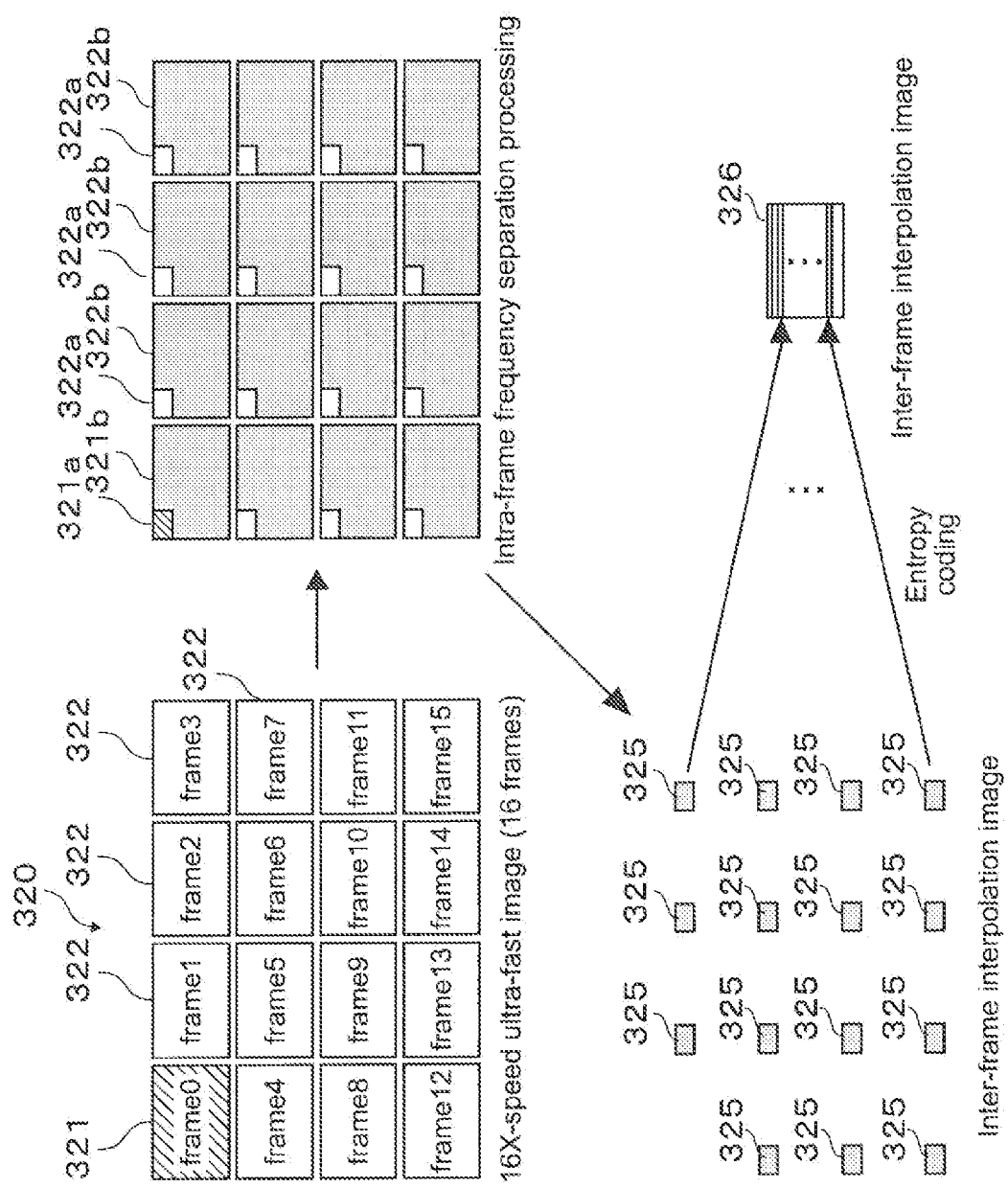
FIG. 13 is a conceptual diagram of encoding processing according to the third embodiment.

FIG. 13 is a conceptual diagram of processing by the encoder 300. This conceptual diagram shows a case where an ultra-fast image 320 at a 16×-speed of the standard frame rate is transmitted. Out of successive 16 frames of frame 0 to frame 15, one frame of frame 0 is separated as a normal speed frame 321 by the frame separation unit 301 to be supplied to the difference generation unit 304. Meanwhile, the frequency decomposition unit 311 separates the frame 0 to frame 15 into low-frequency components 321a and 322a and high-frequency components 321b and 322b. Here, the normal speed frame 321 includes the low-frequency component 321a and the high-frequency component 321b. The non-monitoring frames 322 each include the low-frequency component 322a and the high-frequency component 322b. The frequency decomposition unit 311 supplies the low-frequency components 321a and 322a of the frame 0 to frame 15 to the difference generation unit 304. Here, in the case where Wavelet transform is adopted as the frequency decomposition method, by performing two steps of Wavelet transform on one frame, a size of the low-frequency component of the image (number of pixels) becomes ¹⁄₁₆ of the original size. The difference generation unit 304 obtains a total of 15 difference data items between the low-frequency component 321a of the normal speed frame 321 (frame 0) and the low-frequency components 322a of the non-monitoring frames 322 (frame 1 to frame 15). The difference generation unit 304 combines the difference data items and the respective high-frequency components 322b of the non-monitoring frames 322 with each other and supplies a total of 15 combinations 325 to the entropy coding unit 306. The total of 15 combinations 325 are compression-coded by the entropy coding unit 306 and the error-correcting coding unit 307 and transmitted as an inter-frame interpolation image (second component) 326 by the second transmission unit 308 through the Link-B.

[Configuration of Decoder 350]

Next, description will be given on a configuration of a decoder 350 that decodes an image encoded by the encoder 300 described above.

Figure 14:
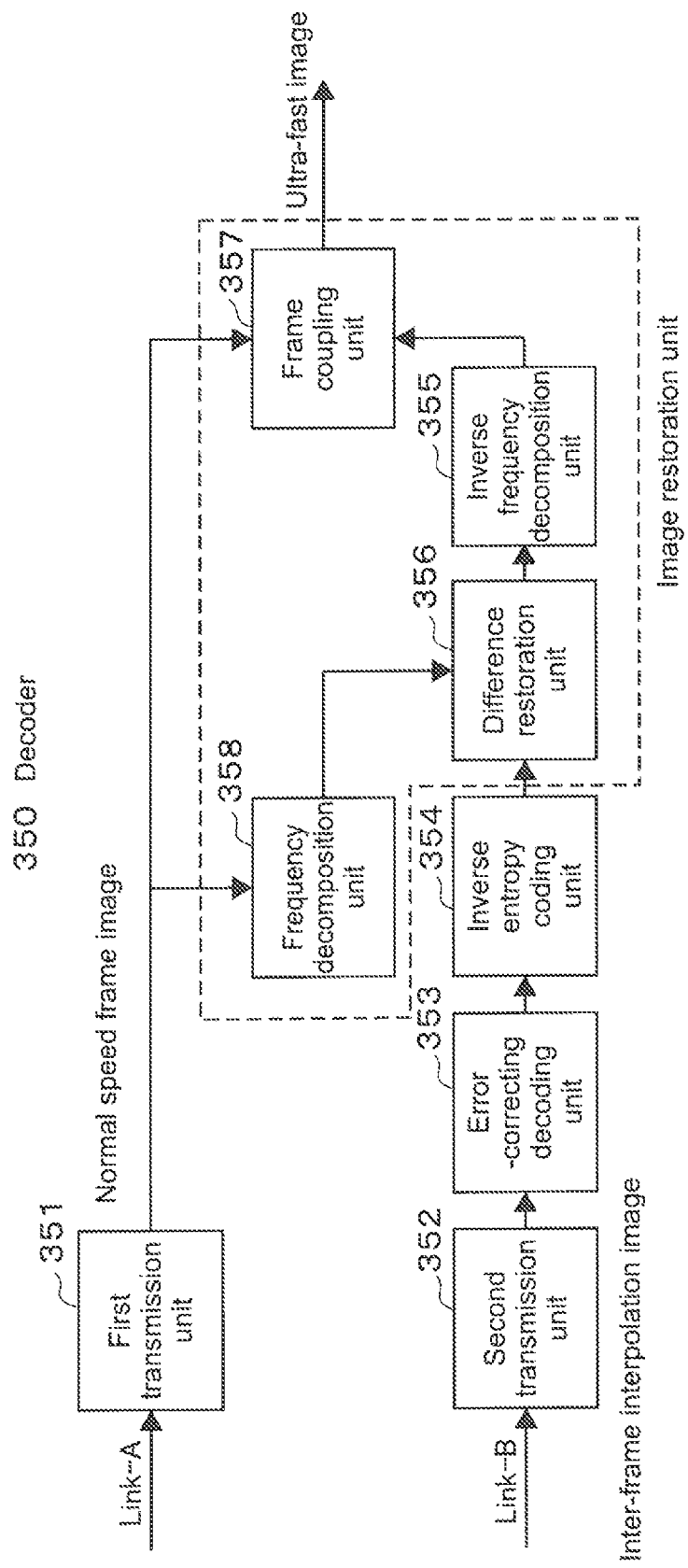
FIG. 14 is a block diagram showing a configuration of a decoder according to the third embodiment.

FIG. 14 is a block diagram showing the configuration of the decoder 350. The decoder 350 includes a first transmission unit 351 (image acquisition unit), a second transmission unit 352 (image acquisition unit), a frequency decomposition unit 358, an error-correcting decoding unit 353, an inverse entropy coding unit 354 (decompression decoding unit), an inverse frequency decomposition unit 355, a difference restoration unit 356, and a frame coupling unit 357. Here, the frequency decomposition unit 358, the inverse frequency decomposition unit 355, the difference restoration unit 356, and the frame coupling unit 357 constitute an image restoration unit.

The first transmission unit 351 receives the normal speed frame transmitted through the Link-A and supplies the normal speed frame to the frequency decomposition unit 358 and the frame coupling unit 357.

The frequency decomposition unit 358 separates the low-frequency component from the normal speed frame and supplies the low-frequency component to the difference restoration unit 356.

The second transmission unit 352 receives the inter-frame interpolation image transmitted through the Link-B and supplies the inter-frame interpolation image to the error-correcting decoding unit 353.

The error-correcting decoding unit 353 performs error-correcting decoding on the inter-frame interpolation image supplied from the second transmission unit 352.

The inverse entropy coding unit 354 inverse-entropy-codes the inter-frame interpolation image that has been decoded in the error-correcting decoding unit 353 and supplies the resultant to the difference restoration unit 356.

The difference restoration unit 356 restores the low-frequency components of the non-monitoring frames based on the low-frequency component of the normal speed frame (monitoring frame) supplied from the frequency decomposition unit 358 and the difference data items included in the inter-frame interpolation image supplied from the inverse entropy coding unit 354.

The inverse frequency decomposition unit 355 restores the non-monitoring frames by inverse frequency decomposition based on the low-frequency components of the non-monitoring frames restored by the difference restoration unit 356 and the high-frequency components of the non-monitoring frames included in the inter-frame interpolation image.

The frame coupling unit 357 couples the normal speed frame supplied from the frequency decomposition unit 358 and the non-monitoring frames restored by the inverse frequency decomposition unit 355 to each other in order of the original fast image and then outputs the resultant.

[Operation of Decoder 350]

Figure 15:
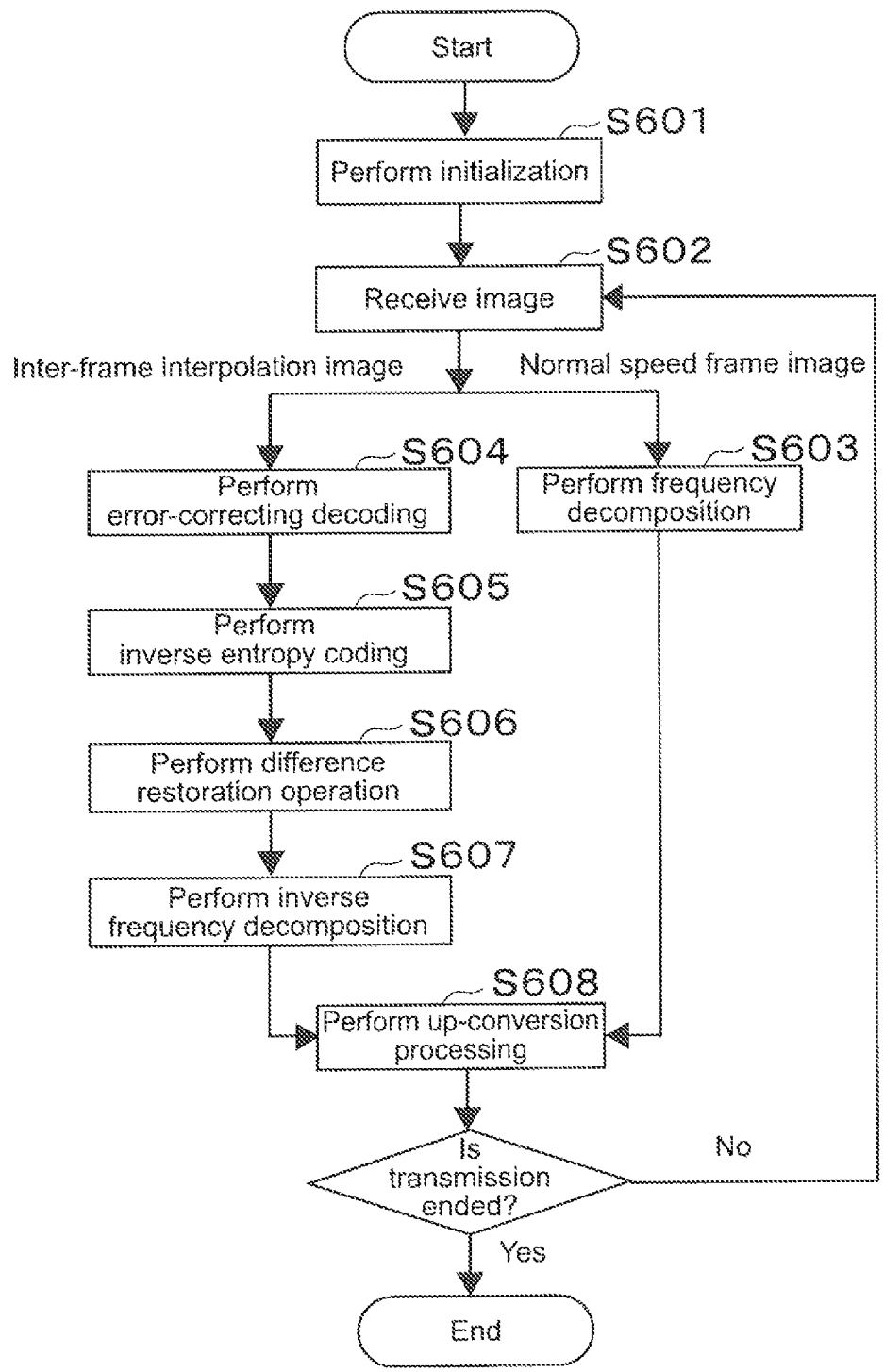
FIG. 15 is a flowchart showing a procedure of an operation of the decoder according to the third embodiment.

FIG. 15 is a flowchart showing a procedure of an operation of the decoder 350.

Firstly, initialization of the decoder 350 is performed (Step S601). After that, the normal speed frame and the inter-frame interpolation image transmitted through the Link-A and the Link-B are received by the first transmission unit 351 and the second transmission unit 352, respectively (Step S602).

The normal speed frame received by the first transmission unit 351 is supplied to the frequency decomposition unit 358 and the frame coupling unit 357. The frequency decomposition unit 358 separates the low-frequency component from the supplied normal speed frame and supplies the low-frequency component to the difference restoration unit 356 (Step S603).

Meanwhile, the inter-frame interpolation image received by the second transmission unit 352 is decoded in the error-correcting decoding unit 353 (Step S604) and inverse-entropy-coded in the inverse entropy coding unit 354, and the resultant is supplied to the difference restoration unit 356 (Step S605).

Upon inputting the low-frequency component of the normal speed frame from the frequency decomposition unit 358 and the inter-frame interpolation image from the inverse entropy coding unit 354, the difference restoration unit 356 restores the low-frequency components of the respective frames other than the normal speed frame based on the above information and supplies the low-frequency components to the inverse frequency decomposition unit 355 (Step S606).

In the inverse frequency decomposition unit 355, the non-monitoring frames are restored by inverse frequency decomposition based on the low-frequency components of the respective frames other than the normal speed frame that are supplied from the difference restoration unit 356 and the high-frequency components of the non-monitoring frames, and the resultant is supplied to the frame coupling unit 357 (Step S607).

Then, in the frame coupling unit 357, the normal speed frame supplied from the frequency decomposition unit 358 and the non-monitoring frames supplied from the inverse frequency decomposition unit 355 are coupled to each other in order of the original fast image and then output (Step S608).

As described above, according to the encoder 300 and the decoder 350 of this embodiment, for example, with use of an infrastructure such as a current 3D-image transmission system as it is, it is possible to transmit an ultra-fast high-definition image having a frame rate higher than a monitoring frame rate of the current system. Further, it becomes also possible to display a monitoring image on a monitor or a viewfinder of a camera and the like.

Fourth Embodiment

4. Encoder and Decoder Suitable for Ultra-Stereoscopic Image

This embodiment relates to an encoder and a decoder that are capable of transmitting an ultra-stereoscopic image with use of an infrastructure such as a current 3D-image transmission system capable of simultaneously transmitting two high-definition images through a two-channel digital signal transmission path, for example.

Figure 16:
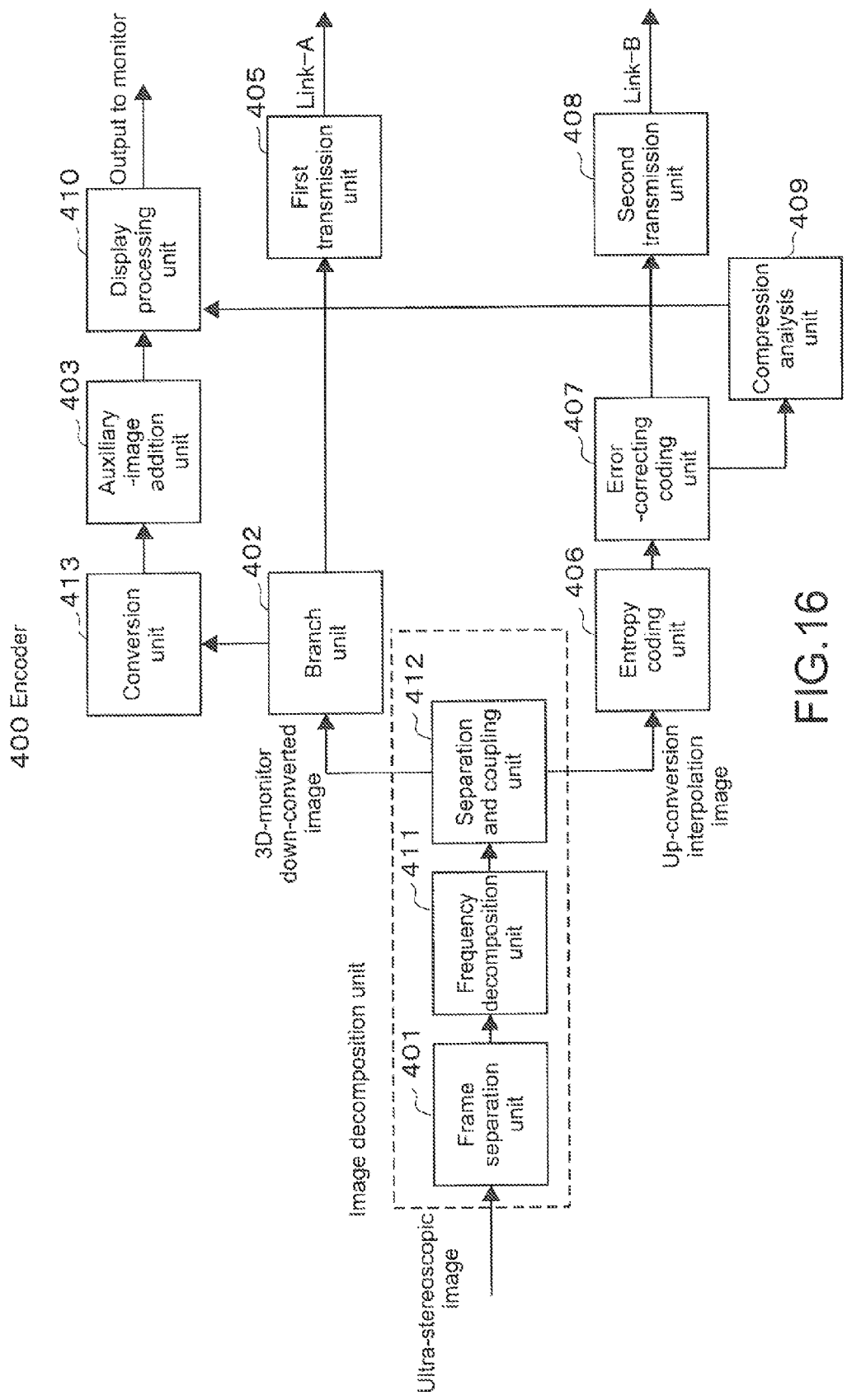
FIG. 16 is a block diagram showing a configuration of an encoder according to a fourth embodiment of the present disclosure.

FIG. 16 is a block diagram showing a configuration of an encoder 400 according to a fourth embodiment of the present disclosure.

As shown in FIG. 16, the encoder 400 includes a frame separation unit 401, a frequency decomposition unit 411, a separation and coupling unit 412, a branch unit 402, a conversion unit 413, an auxiliary-image addition unit 403, a first transmission unit 405, an entropy coding unit 406, an error-correcting coding unit 407, a second transmission unit 408, a compression analysis unit 409, and a display processing unit 410. Here, the frame separation unit 401, the frequency decomposition unit 411, and the separation and coupling unit 412 (coupling unit) constitute an image decomposition unit.

Input to the encoder 400 is an image constituted of a plurality of frames imaged at different perspectives in order to constitute a stereoscopic image.

The frame separation unit 401 separates the input image into images for each perspective, that is, frame-by-frame images to supply the images to the frequency decomposition unit 411.

The frequency, decomposition unit 411 separates the frame-by-frame images into low-frequency components and high-frequency components. Here, frequency decomposition, only needs to be performed on frequencies in a horizontal direction in the case where an ultra-stereoscopic image having parallax in only the horizontal direction is obtained, on frequencies in a vertical direction in the case where an ultra-stereoscopic image having parallax in only the vertical direction is obtained, and on frequencies in both the horizontal direction and vertical direction in the case where an ultra-stereoscopic image having parallax in both the horizontal direction and vertical direction is obtained. It should be noted that in this embodiment, an ultra-stereoscopic image is obtained based on 16 images captured with 16 cameras, for example. In this case, the frequency decomposition unit 411 generates a low-frequency component of a size of 1/16 for each frame by performing two steps of Wavelet transform on one frame.

The separation and coupling unit 412 couples the low-frequency components of the respective frames separated by the frequency decomposition unit 411 to one another to generate a 3D-monitor down-converted image (first component) and supplies the 3D-monitor down-converted image to the branch unit 402. The separation and coupling unit 412 also supplies the high-frequency components of the respective frames separated by the frequency decomposition unit 411, as up-conversion interpolation images (second component), to the entropy coding unit 406.

The branch unit 402 supplies the 3D-monitor down-converted image supplied from the separation and coupling unit 412 to the conversion unit 413 and the first transmission unit 405.

The first transmission unit 405 transmits the 3D-monitor down-converted image supplied from the branch unit 402, by using the Link-A.

The conversion unit 413 shuffles lines of the 3D-monitor down-converted image according to specifications of a lenticular lens of a 3D monitor and supplies the resultant to the auxiliary-image addition unit 403.

The auxiliary-image addition unit 403 adds an auxiliary image for assisting a user in monitoring an image, such as a marker, a zebra pattern, or a character string, to the 3D-monitor down-converted image supplied from the conversion unit 413. The 3D-monitor down-converted image provided with the auxiliary image is supplied to a monitor or a viewfinder of a camera and the like through the display processing unit 410 and then displayed thereon as a monitoring image.

The entropy coding unit 406 entropy-codes the frame-by-frame up-conversion interpolation images supplied from the separation and coupling unit 412 and supplies the resultant images to the error-correcting coding unit 407. Examples of the entropy coding method include Huffman coding and arithmetic coding.

The error-correcting coding unit 407 adds an error-correcting code to each of the frame-by-frame up-conversion interpolation images supplied from the entropy coding unit 406 and then supplies the resultant images to the second transmission unit 408 and the compression analysis unit 409.

The second transmission unit 408 transmits the frame-by-frame up-conversion interpolation images supplied from the error-correcting coding unit 407, by using the Link-B.

The compression analysis unit 409 analyzes a size of the frame-by-frame up-conversion interpolation images that have been entropy-coded and supplies the resultant as visible information to the monitor or the viewfinder of the camera and the like through the display processing unit 410 to be displayed thereon.

[Operation of Encoder 400]

Figure 17:
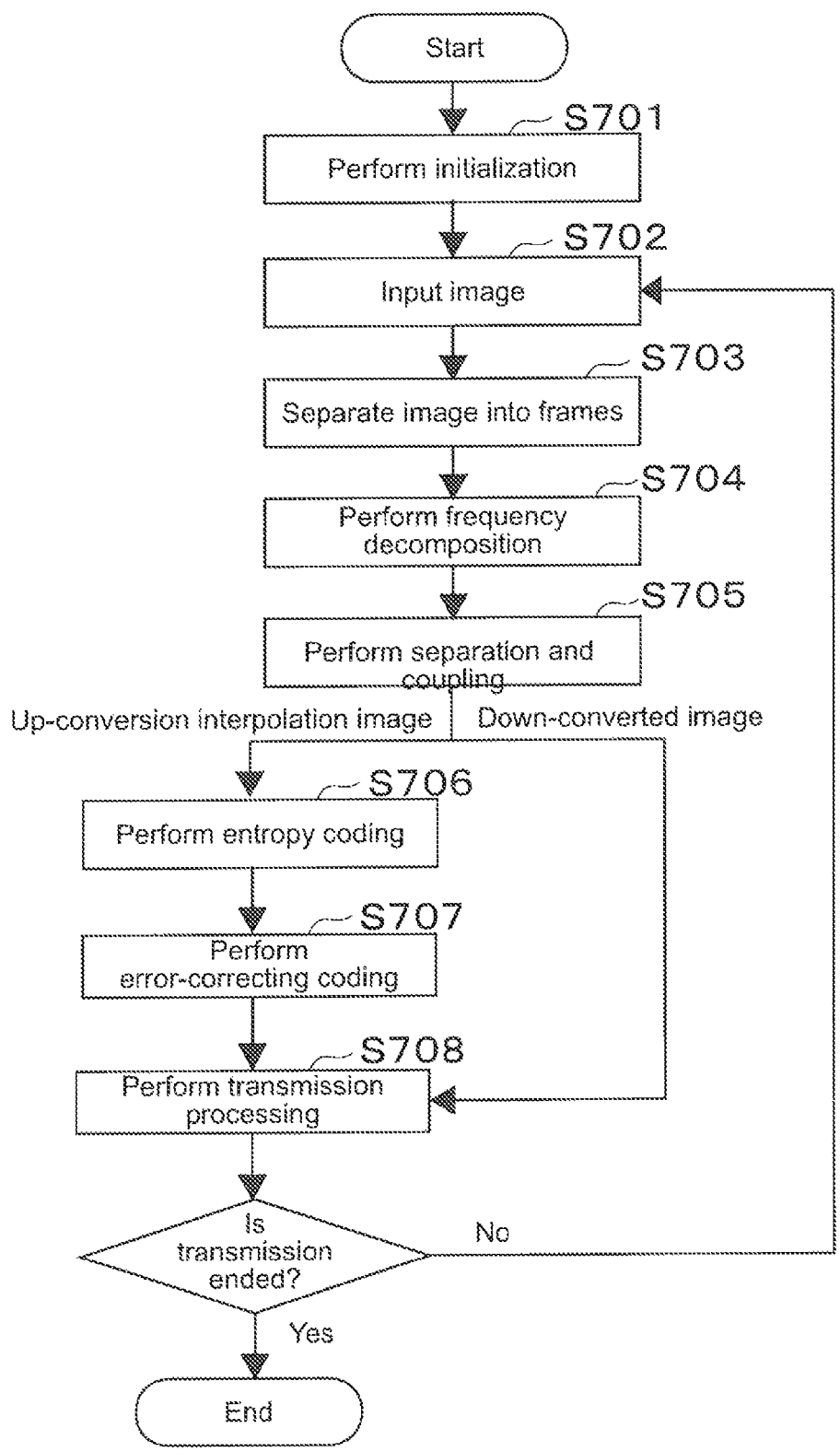
FIG. 17 is a flowchart showing a procedure of an operation of the encoder according to the fourth embodiment.

FIG. 17 is a flowchart showing a procedure of an operation of the encoder 400.

Firstly, initialization of the encoder 400 that includes initialization of a register, a memory, and the like in the encoder 40.0 is performed (Step S701). After that, an image constituted of a plurality of frames imaged at different perspectives in order to constitute a stereoscopic image is input to the encoder 400 (Step S702).

The image input to the encoder 400 is separated, in the frame separation unit 401, into images for each perspective, that is, frame-by-frame images and supplied to the frequency decomposition unit 411 (Step S703). The frame-by-frame images are separated, in the frequency decomposition unit 411, into low-frequency components and high-frequency components (Step S704), and the low-frequency components and the high-frequency components are supplied to the separation and coupling unit 412. The separation and coupling unit 412 couples the low-frequency components of the respective frames to one another to generate a 3D-monitor down-converted image and supplies the 3D-monitor down-converted image to the branch unit 402. The separation and coupling unit 412 also supplies the high-frequency components of the respective frames as up-conversion interpolation images to the entropy coding unit 406 (Step S705).

The 3D-monitor down-converted image is supplied to the first transmission unit 405 through the branch unit 402 and then transmitted through the Link-A by the first transmission unit 405 (Step S708). Further, at that time, it is necessary to shuffle lines constituting the images captured with the respective cameras in the conversion unit 413 according to specifications of a lenticular lens of a 3D monitor. In the case where sufficient lines do not exist, lines obtained by image interpolation and image prediction using adjacent lines make up for the shortage of lines. After that, the 3D-monitor down-converted image is provided with an auxiliary image by the auxiliary-image addition unit 403 and supplied to the 3D monitor and the like of the camera through the display processing unit 410 to be displayed thereon.

Meanwhile, the frame-by-frame up-conversion interpolation images separated by the separation and coupling unit 412 are entropy-coded by the entropy coding unit 406 (Step S706), provided with error-correcting codes by the error-correcting coding unit 407 (Step S707), and transmitted by the second transmission unit 408 by using the Link-B (Step S708).

Figure 18:
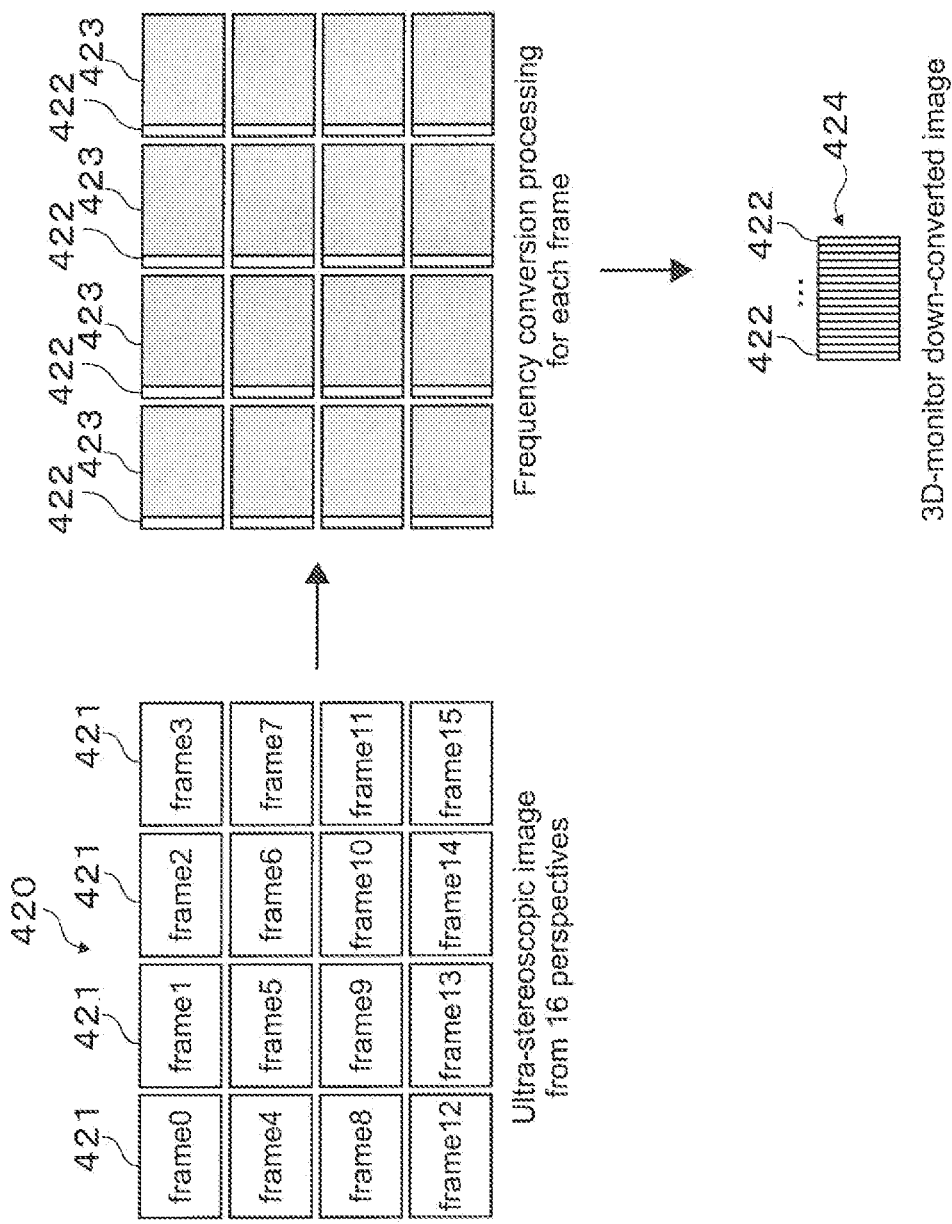
FIG. 18 is a conceptual diagram of encoding processing according to the fourth embodiment.

FIG. 18 is a conceptual diagram of processing so far by the encoder 400. FIG. 18 shows a case where an ultra-stereoscopic image 420 from 16 perspectives captured with 16 cameras is transmitted. The frame separation unit 401 separates the ultra-stereoscopic image 420 from 16 perspectives into frames 421 (frame 0 to frame 15) as images for each perspective. The frequency decomposition unit 411 further separates the separated frames 421 into low-frequency components 422 and high-frequency components 423. This example shows a case where frequency decomposition is performed only on frequencies in a horizontal direction in order to obtain an ultra-stereoscopic image having parallax only in the horizontal direction. In this case, to down-convert the low-frequency components of the images from 16 perspectives to a high-definition image size, the frequency decomposition unit 411 performs four steps of frequency decomposition to generate the low-frequency components 422 with a size of 1/16 of the original size. The 16 low-frequency components 422 thus generated are coupled to one another in the separation and coupling unit 412 to obtain a 3D-monitor down-converted image 424.

Meanwhile, referring back to FIG. 17, the high-frequency components 423 of the respective frames 421 are compression-coded, as up-conversion interpolation images of the respective frames, by the entropy coding unit 406 and the error-correcting coding unit 407 (Steps S706 and S707) and then transmitted by the second transmission unit 408, by using the Link-B (Step S708).

[Configuration of Decoder 450]

Next, description will be given on a configuration of a decoder 450 that decodes an image compression-coded by the encoder 400 described above.

Figure 19:
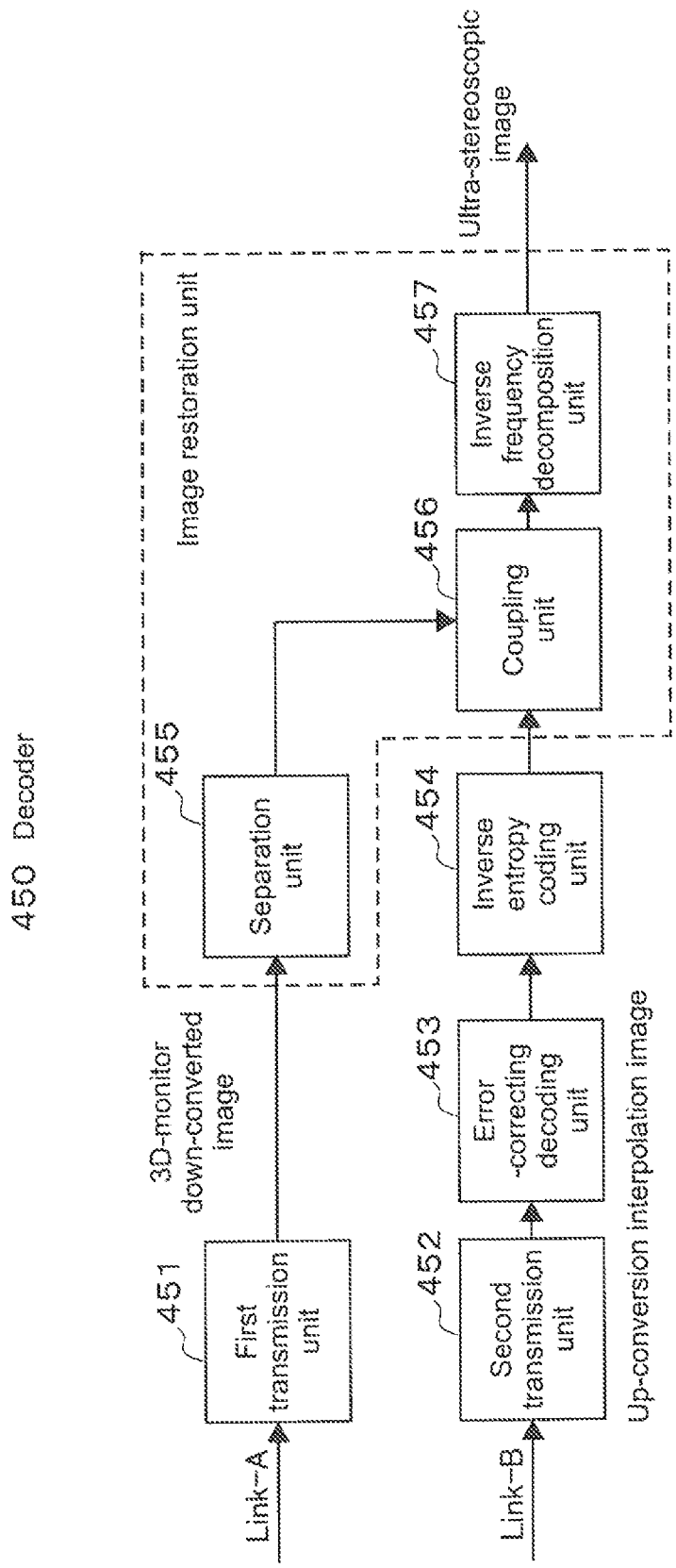
FIG. 19 is a block diagram showing a configuration of a decoder according to the fourth embodiment.

FIG. 19 is a block diagram showing a configuration of the decoder 450. The decoder 450 includes a first transmission unit 451 (image acquisition unit), a separation unit 455 (frame separation unit), a second transmission unit 452 (image acquisition unit), an error-correcting decoding unit 453, an inverse entropy coding unit 454 (decompression decoding unit), a coupling unit 456, and an inverse frequency decomposition unit 457. Here, the separation unit 455, the coupling unit 456, and the inverse frequency decomposition unit 457 constitute an image restoration unit.

The first transmission unit 451 receives the 3D-monitor down-converted image transmitted through the Link-A and supplies the 3D-monitor down-converted image to the separation unit 455.

The separation unit 455 separates the low-frequency components of the respective frames from the 3D-monitor down-converted image supplied from the first transmission unit 451 and supplies the low-frequency components to the coupling unit 456.

The second transmission unit 452 receives the frame-by-frame up-conversion interpolation images transmitted through the Link-B and supplies the frame-by-frame up-conversion interpolation images to the error-correcting decoding unit 453.

The error-correcting decoding unit 453 performs error-correcting decoding of the frame-by-frame up-conversion interpolation images supplied from the second transmission unit 452.

The inverse entropy coding unit 454 inverse-entropy-codes the frame-by-frame up-conversion interpolation images decoded by the error-correcting decoding unit 453 and supplies the resultant to the coupling unit 456.

The coupling unit 456 couples each of the low-frequency components of the respective frames, supplied from the separation unit 455, to a corresponding frame-by-frame up-conversion interpolation image supplied from the inverse entropy coding unit 454 for each of the perspectives, and supplies the resultant to the inverse frequency decomposition unit 457.

The inverse frequency decomposition unit 457 restores an ultra-stereoscopic image by inverse frequency decomposition based on the low-frequency components of the images and the up-conversion interpolation images that are coupled to each other by the coupling unit 456.

[Operation of Decoder 450]

Figure 20:
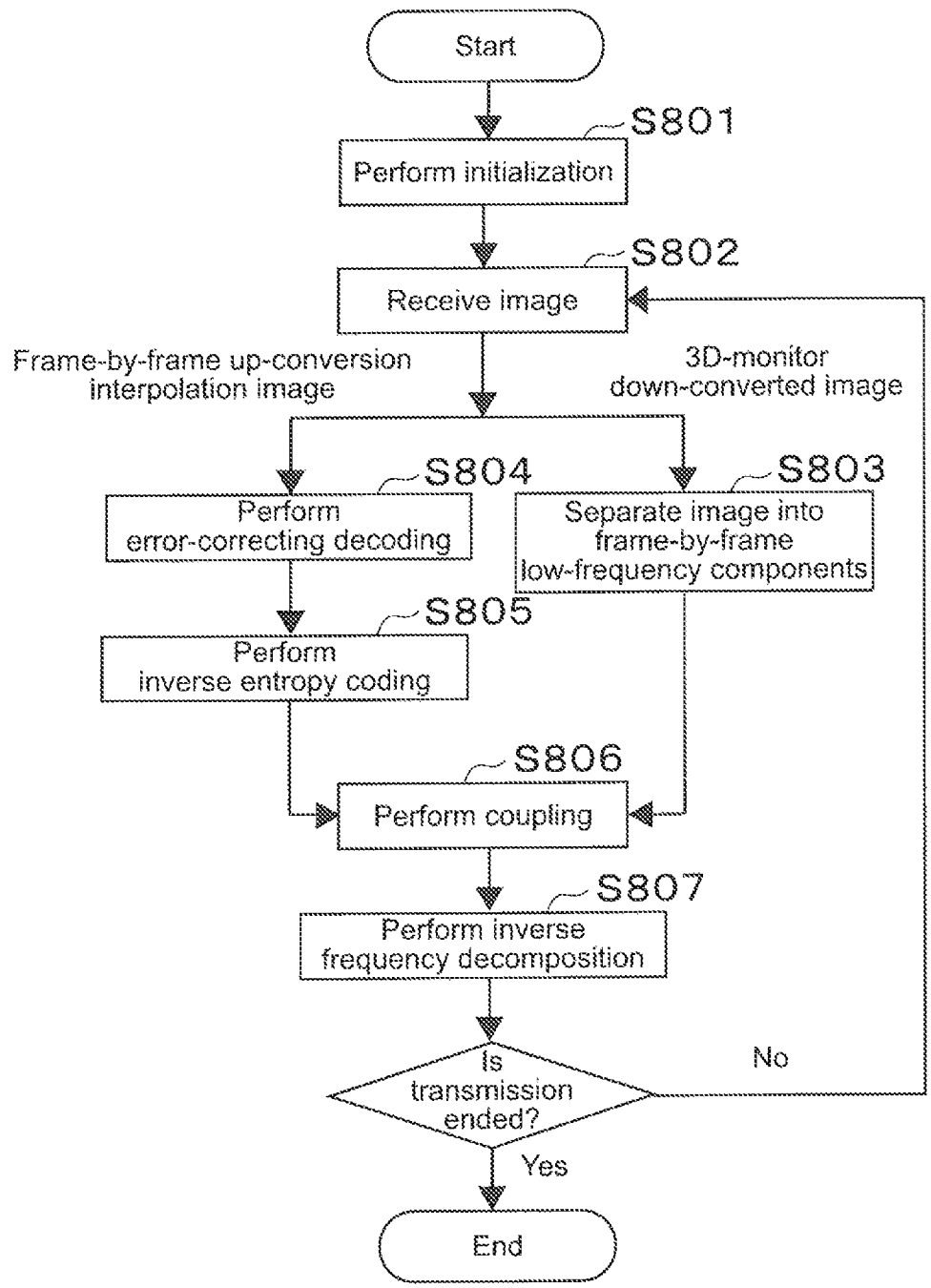
FIG. 20 is a flowchart showing a procedure of an operation of the decoder according to the fourth embodiment.

FIG. 20 is a flowchart showing a procedure of an operation of the decoder 450.

Firstly, initialization of the decoder 450 is performed (Step S801). After that, the 3D-monitor down-converted image and the frame-by-frame up-conversion interpolation images that are transmitted through the Link-A and the Link-B are received by the first transmission unit 451 and the second transmission unit 452, respectively (Step S802).

The 3D-monitor down-converted image received by the first transmission unit 451 is separated into the frame-by-frame low-frequency components in the separation unit 455 (Step S803) and supplied to the coupling unit 456.

Meanwhile, the frame-by-frame up-conversion interpolation images received by the second transmission unit 452 are decoded in the error-correcting decoding unit 453 (Step S804) and inverse-entropy-coded in the inverse entropy coding unit 454 (Step S805), and the resultant is supplied to the coupling unit 456.

In the coupling unit 456, the frame-by-frame low-frequency components supplied from the separation unit 455 and the frame-by-frame up-conversion interpolation images supplied from the error-correcting decoding unit 453 are coupled to each other (Step S806), and the resultant is supplied to the inverse frequency decomposition unit 457. Then, in the inverse frequency decomposition unit 457, an ultra-stereoscopic image is restored by inverse frequency decomposition based on the low-frequency components and the up-conversion interpolation images coupled to each other by the coupling unit 456 (Step S807).

As described above, according to the encoder 400 and the decoder 450 of this embodiment, for example, with use of an infrastructure such as a current 3D-image transmission system as it is, it is possible to successfully transmit an ultra-stereoscopic image. Further, it becomes also possible to display a monitoring image on a monitor or a viewfinder of a camera and the like.

Fifth Embodiment

5. Encoder and Decoder Suitable for Ultra-Wide-Angle Image

This embodiment relates to an encoder and a decoder that are capable of transmitting an image having an aspect ratio different from that of a screen for monitoring, such as an ultra-wide-angle image and a plurality of stitching images, with use of an infrastructure such as a current 3D-image transmission system capable of simultaneously transmitting two high-definition images through a two-channel digital signal transmission path.

[Configuration of Encoder 500]

Figure 21:
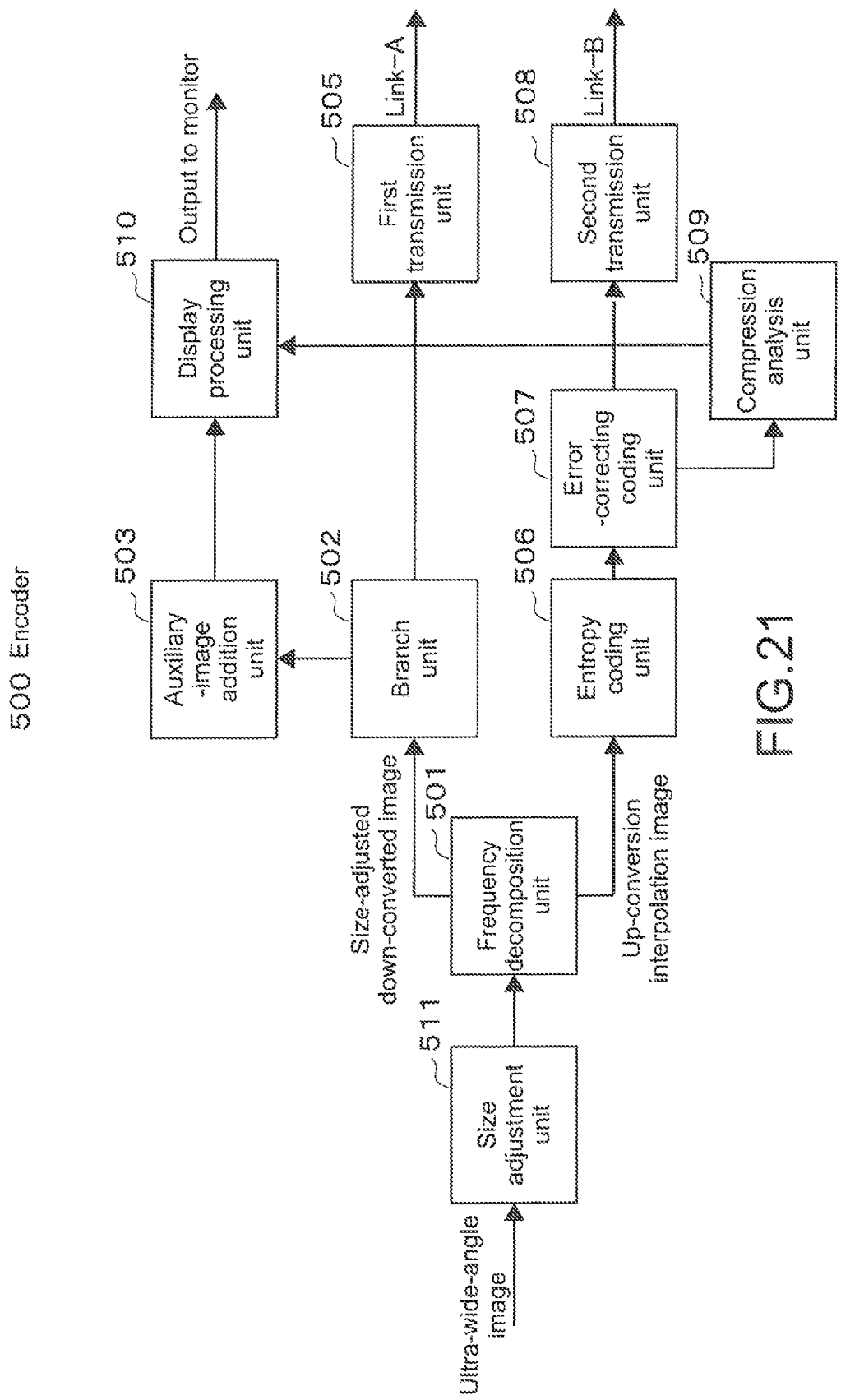
FIG. 21 is a block diagram showing a configuration of an encoder according to a fifth embodiment of the present disclosure.

FIG. 21 is a block diagram showing a configuration of an encoder 500 according to a fifth embodiment of the present disclosure.

As shown in FIG. 21, the encoder 500 includes a site adjustment unit 511, a frequency decomposition unit 501 (image decomposition unit), a branch unit 502, an auxiliary-image addition unit 503, a first transmission unit 505, an entropy coding unit 506, an error-correcting coding unit 507, a second transmission unit 508, a compression analysis unit 509, and a display processing unit 510.

Input to the encoder 500 is an image having an aspect ratio different from that of a screen for monitoring, such as an ultra-wide-angle image and a plurality of stitching images.

The size adjustment unit 511 separates and/or couples the input image so as to have an aspect ratio of a screen for monitoring, thus adjusting the size of the image.

The frequency decomposition unit 501 separates the image that has been subjected to size adjustment by the size adjustment unit 511 into a low-frequency component and a high-frequency component and supplies the low-frequency component and the high-frequency component to the branch unit 502 and the entropy coding unit 506.

Since the branch unit 502, the auxiliary-image addition unit 503, the first transmission unit 505, the entropy coding unit 506, the error-correcting coding unit 507, the second transmission unit 508, and the compression analysis unit 509 are the same as those of the encoder 100 in the first embodiment, description thereof will be omitted.

[Operation of Encoder 500]

Figure 22:
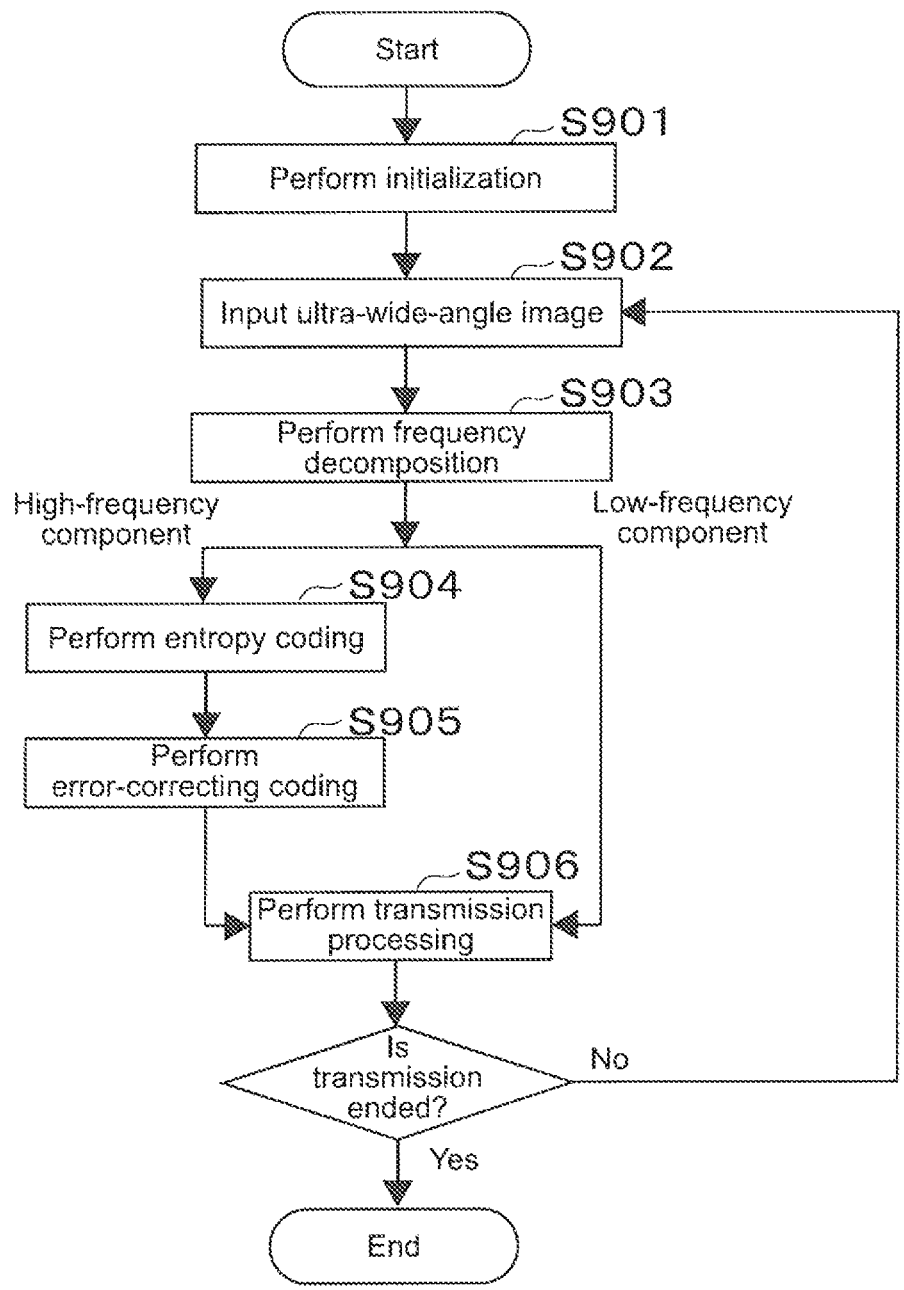
FIG. 22 is a flowchart showing a procedure of an operation of the encoder according to the fifth embodiment.

FIG. 22 is a flowchart showing a procedure of an operation of the encoder 500 according to the fifth embodiment.

Firstly, initialization of the encoder 500 is performed (Step S901). After that, an image having an aspect ratio different from that of a screen for monitoring, such as an ultra-wide-angle image and a plurality of stitching images, is input to the encoder 500 (Step S902). The image input to the encoder 500 is separated and/or coupled in the size adjustment unit 511 so as to have an aspect ratio of the screen for monitoring, so that the size is adjusted.

After that, the size-adjusted image is separated in the frequency decomposition unit 501 into a low-frequency component and a high-frequency component. The low-frequency component is supplied to the branch unit 502, and the high-frequency component is supplied to the entropy coding unit 506 (Step S903).

The low-frequency component is supplied from the branch unit 502 to the first transmission unit 505 and the auxiliary-image addition unit 503. Accordingly, the low-frequency component is transmitted by the first transmission unit 505 by using the Link-A (Step S906). Further, the low-frequency component provided with an auxiliary image by the auxiliary-image addition unit 503 is supplied to a monitor or a viewfinder of a camera and the like through the display processing unit 310 and then displayed thereon as a monitoring image.

Figure 23:
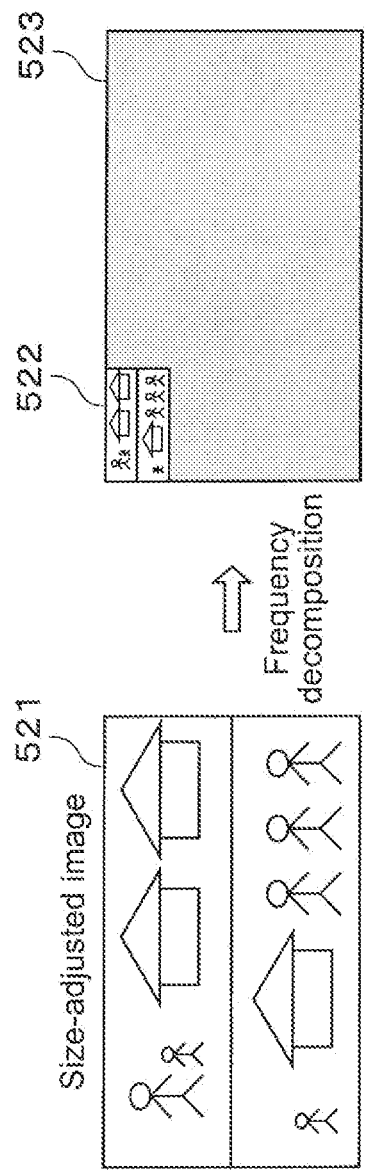
FIG. 23 is a conceptual diagram of encoding processing according to the fifth embodiment.

FIG. 23 is a conceptual diagram of processing of the encoder 500 in the case where the input ultra-wide-angle image has a horizontal resolution that is eight-fold higher than that of a high-definition image size and a vertical resolution that is two-fold higher than that of the high-definition image size. In this case, the size adjustment unit 511 horizontally separates the ultra-wide-angle image into two equal parts and then vertically couples the equal parts to each other to thereby obtain an image 521 having a resolution that is 16-fold higher than that of the high-definition image size. By performing two steps of frequency decomposition on the image 521, the frequency decomposition unit 501 generates a low-frequency component 522 having a high-definition image size.

Meanwhile, the high-frequency component separated by the frequency decomposition unit 501 (denoted by reference numeral 523 in FIG. 23) is entropy-coded in the entropy coding unit 506 (Step S904), and then provided with an error-correcting code by the error-correcting coding unit 507 (Step S905). The high-frequency component provided with the error-correcting code is transmitted by the second transmission unit 508 by using the Link-B (Step S906).

[Configuration of Decoder 550]

Next, description will be given on a configuration of a decoder 550 that decodes an image compression-coded by the encoder 500 described above.

Figure 24:
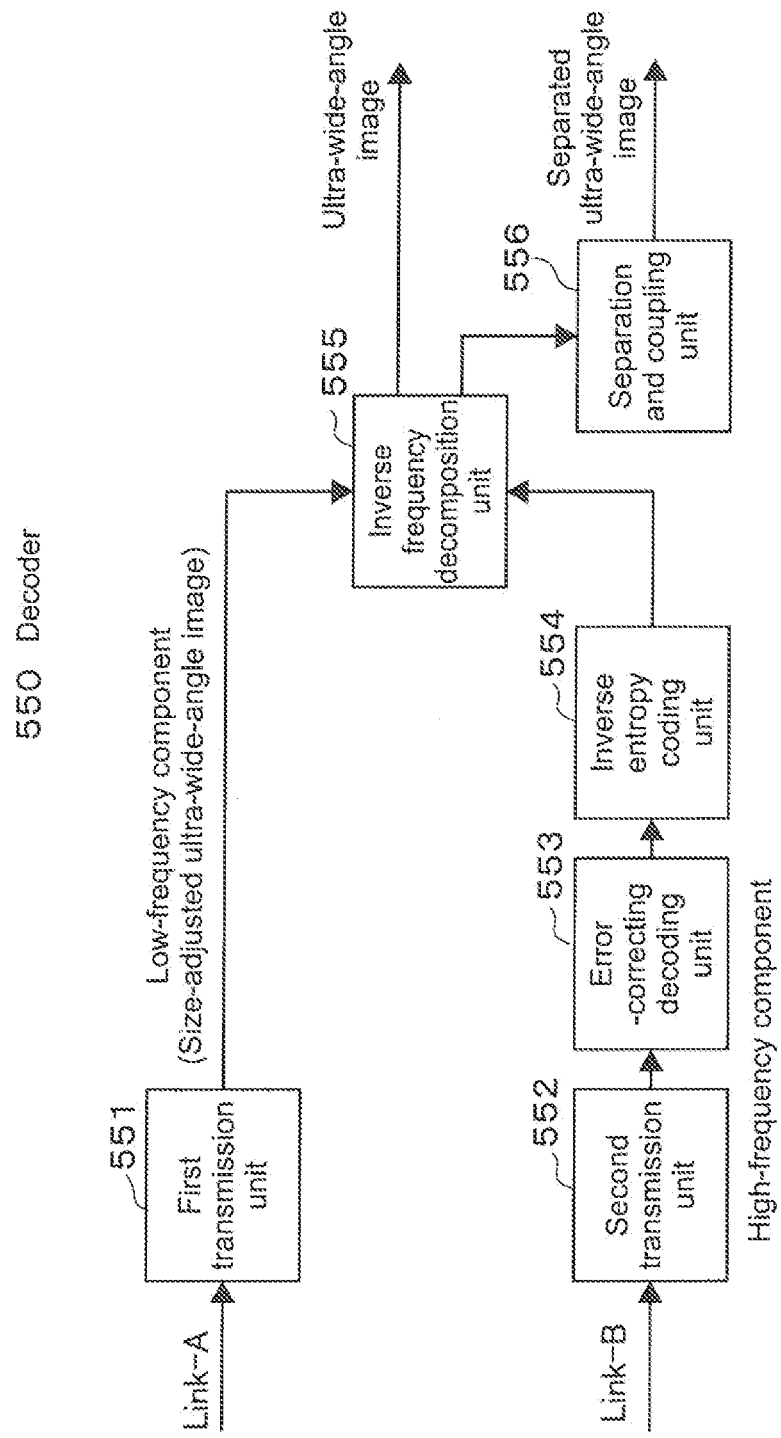
FIG. 24 is a block diagram showing a configuration of a decoder according to the fifth embodiment.

FIG. 24 is a block diagram showing the configuration of the decoder 550. The decoder 550 includes a first transmission unit 551 (image acquisition unit), a second transmission unit 552 (image acquisition unit), an error-correcting decoding unit 553, an inverse entropy coding unit 554, an inverse frequency decomposition unit 555, and a separation and coupling unit 556.

The first transmission unit 551 receives the low-frequency component of the ultra-wide-angle image transmitted through the Link-A and supplies the low-frequency component to the inverse frequency decomposition unit 555.

The second transmission unit 552 receives the high-frequency component of the ultra-wide-angle image transmitted through the Link-B and supplies the high-frequency component to the error-correcting decoding unit 553.

The error-correcting decoding unit 553 performs error-correcting decoding on the high-frequency component of the ultra-wide-angle image supplied from the second transmission unit 552.

The inverse entropy coding unit 554 inverse-entropy-codes the high-frequency component of the ultra-wide-angle image decoded in the error-correcting decoding unit 553.

The inverse frequency decomposition unit 555 couples the low-frequency component of the ultra-wide-angle image supplied from the first transmission unit 551 and the high-frequency component of the ultra-wide-angle image supplied from the inverse entropy coding unit 554 to each other by inverse frequency decomposition to restore the size-adjusted ultra-wide-angle image (denoted by reference numeral 521 in FIG. 23).

The separation and coupling unit 556 separates the restored ultra-wide-angle image such that the ultra-wide-angle image restored by the inverse frequency decomposition unit 555 is accommodated in the screen of the monitor.

[Operation of Decoder 550]

Figure 25:
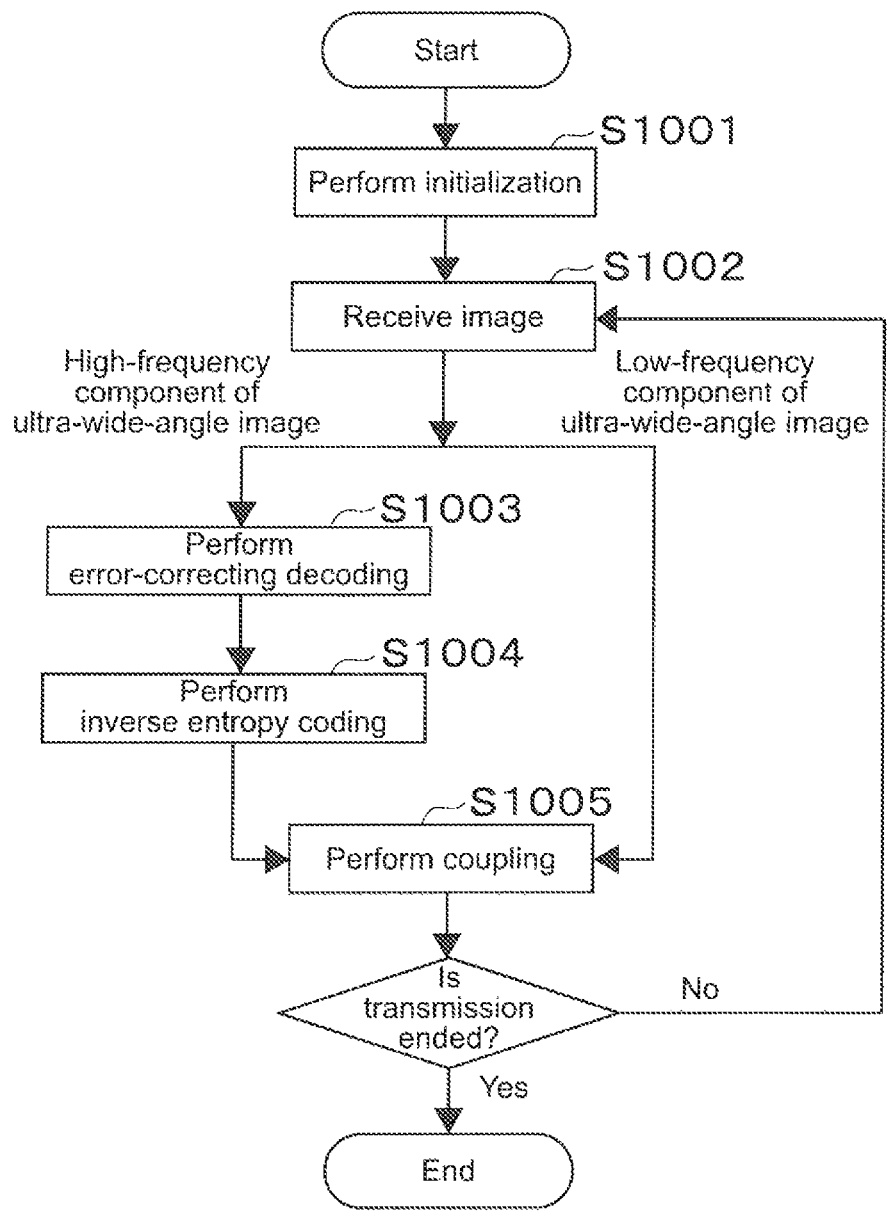
FIG. 25 is a flowchart showing a procedure of an operation of the decoder according to the fifth embodiment.

FIG. 25 is a flowchart showing a procedure of an operation of the decoder 550.

Firstly, initialization of the decoder 550 is performed (Step S1001). After that, the low-frequency component and the high-frequency component of the image having an aspect ratio different from that of the screen for monitoring, such as an ultra-wide-angle image and a plurality of stitching images, which have been transmitted through the Link-A and the Link-B, are received by the first transmission unit 551 and the second transmission unit 552, respectively (Step S1002).

The low-frequency component of the image received by the first transmission unit 551 is supplied to the inverse frequency decomposition unit 555. Meanwhile, the high-frequency component of the image received by the second transmission unit 552 is decoded by the error-correcting decoding unit 553 (Step S1003), inverse-entropy-coded in the inverse entropy coding unit 554 (Step S1004), and then supplied to the inverse frequency decomposition unit 555. Then, the low-frequency component of the image supplied from the first transmission unit 551 and the high-frequency component supplied from the inverse entropy coding unit 554 are coupled to each other by inverse frequency decomposition in the inverse frequency decomposition unit 555, with the result that the image before the size adjustment is performed is restored.

As described above, according to the encoder 500 and the decoder 550 of this embodiment, for example, with use of an infrastructure such as a current 3D-image transmission system as it is, it is possible to transmit an image having an aspect ratio different from that of a screen for monitoring, such as an ultra-wide-angle image and a plurality of stitching images. Further, it becomes also possible to display a monitoring image on a monitor or a viewfinder of a camera.

Sixth Embodiment

6. Encoder System and Decoder System in Hybrid Mode

This embodiment relates to an encoder system and a decoder system in a hybrid mode that are capable of mixing a two-channel transmission image with a plurality of images compression-coded by various types of encoders to transmit the mixed image, and performing decoding processing thereon on a decoder side in accordance with an encoding method for each image.

To mix a two-channel transmission image with a plurality of images compression-coded by various types of encoders to transmit the mixed image is as follows, for example.

Figure 26:
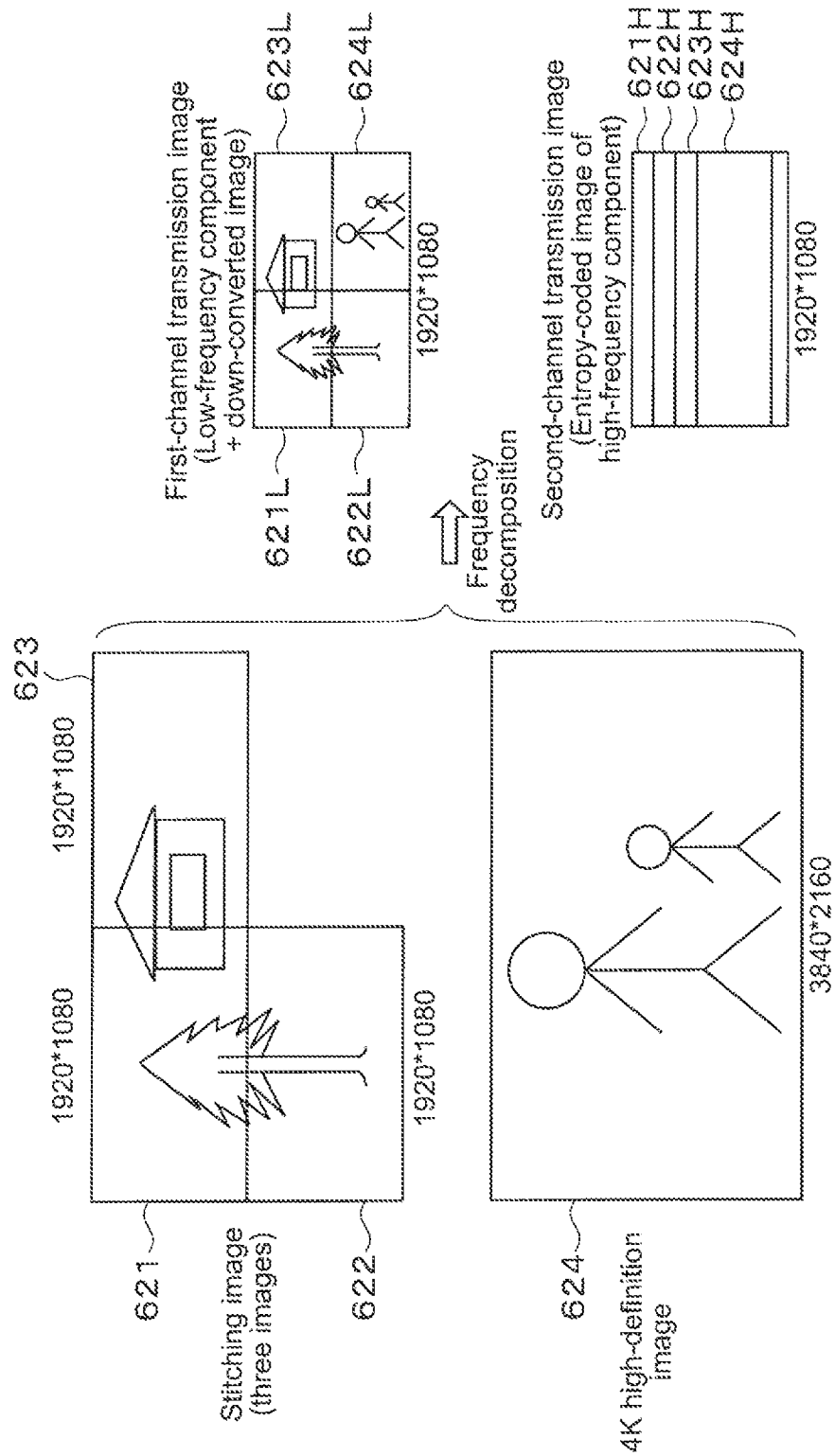
FIG. 26 is a conceptual diagram of a case where three stitching images having a high-definition image size and an ultra-high-resolution image having a 4K high-definition image size are encoded according to a sixth embodiment.

FIG. 26 is a conceptual diagram of a case where three stitching images 621, 622, and 623 having a high-definition image size and an ultra-high-resolution image 624 having a 4K high-definition image size are encoded into a two-channel transmission image.

Here, it is assumed that the three stitching images 621, 622, and 623 having a high-definition image size are separated into low-frequency components 621L, 622L, and 623L and entropy-coded images 621H, 622H, and 623H of high-frequency components, respectively. Meanwhile, the ultra-high-resolution image 624 having a 4K high-definition image size is assumed to be separated into a down-converted image 624L and an entropy-coded image 624H of a high-frequency component.

The low-frequency components 621L, 622L, and 623L of the three stitching images and the down-converted image 624L are allocated to four sections that forms a space of a transmission image transmitted through the Link-A (hereinafter, referred to as "first-channel transmission image") and then transmitted. Further, the three entropy-coded images 621H, 622H, and 623H and the entropy-coded image 624H are allocated to four sections of a space of a transmission image transmitted through the Link-B (hereinafter, referred to as "second-channel transmission image") and then transmitted.

Figure 28:
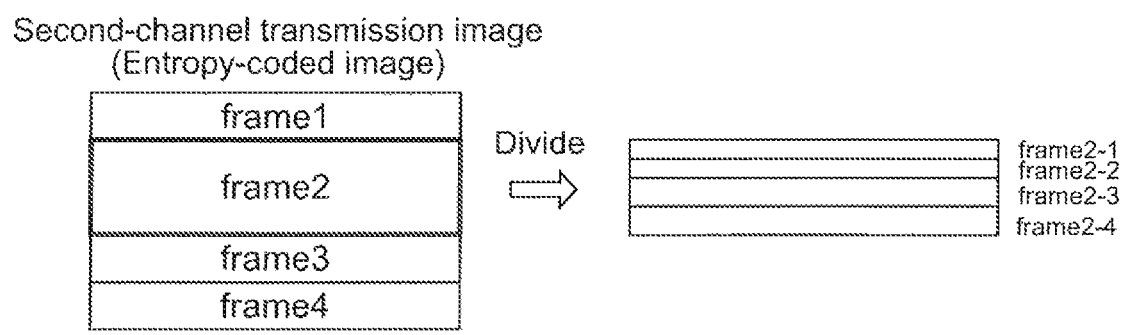
FIG. 28 is a diagram showing an example of a data structure of a second transmission image.

Further, as shown in FIG. 27 and FIG. 28, each of the sections within the spaces of the first-channel transmission image and the second-channel transmission image may be constituted of a plurality of smaller sections that forms the section.

Incidentally, in the case where a plurality of images compression-coded by various types of encoders are mixed with a two-channel transmission image to be transmitted, at least the following information is necessary at a time of decoding.

1. Information on allocation of image to sections of first-channel transmission image (first allocation information)
2. Information on allocation of image to sections of second-channel transmission image (second allocation information)
3. Association information on correspondence relationship between sections of first-channel transmission image and sections of second-channel transmission image In this regard, it is necessary to provide a mechanism in which those information items described above are added as header information items to the first-channel transmission image and the second-channel transmission image, the header information items are analyzed at a time of decoding, and decoding is performed based on a result of the analysis. Hereinafter, an encoder system and a decoder system that use the above-mentioned mechanism will be described as an encoder system and a decoder system in a hybrid mode.

[Configuration of Encoder System in Hybrid Mode]

Figure 29:
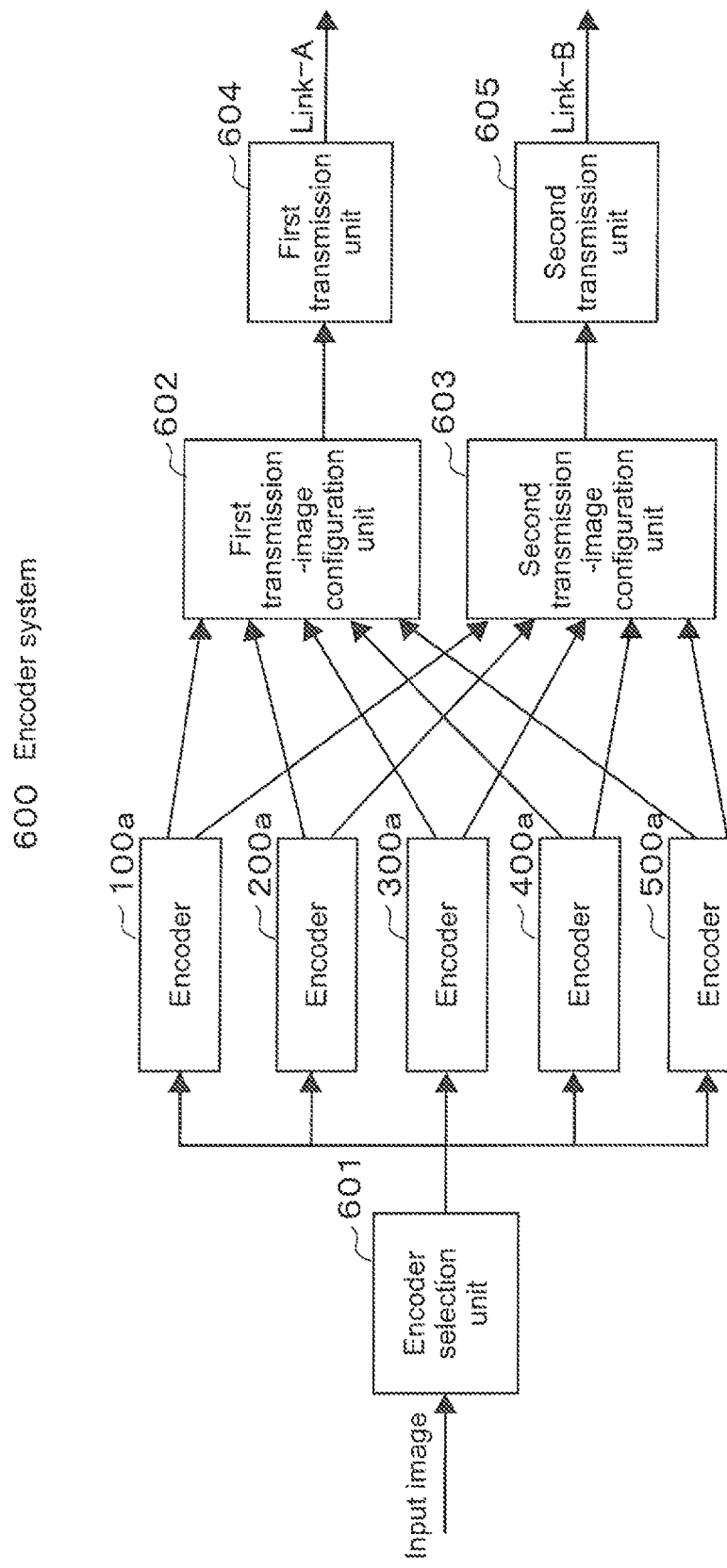
FIG. 29 is a block diagram showing a configuration of an encoder system in a hybrid mode according to the sixth embodiment.

FIG. 29 is a block diagram showing a configuration of an encoder system 600 in a hybrid mode.

The encoder system 600 includes an encoder selection unit 601, various types of encoders 100a, 200a, 300a, 400a, and 500a, a first transmission-image configuration unit 602, a second transmission-image configuration unit 603, a first transmission unit 604, and a second transmission unit 605.

The encoder selection unit 601 selects an encoder to perform processing on an input image. For example, a user may set, for the encoder selection unit 601, which input image is processed with which encoder.

The various types of encoders 100a, 200a, 300a, 400a, and 500a are, for example, encoders excluding at least the first transmission unit and the second transmission unit from the configuration of the encoders 100, 200, 300, 400, and 500 according to the first to fifth embodiments.

The first transmission-image configuration unit 602 allocates, out of processing results of the plurality of encoders selected by the encoder selection unit 601, processing results to be allocated to a first-channel transmission image (for example, low-frequency component and down-converted image of ultra-high-resolution image, normal speed frame of ultra-fast image, down-converted image of ultra-stereoscopic image, and low-frequency components of ultra-wide-angle image and stitching image) to a plurality of sections of the first-channel transmission image. The first transmission-image configuration unit 602 generates first header information including first allocation information and association information, adds the first header information to the first-channel transmission image, and supplies the resultant to the first transmission unit 604.

The second transmission-image configuration unit 603 allocates, out of processing results of the plurality of encoders selected by the encoder selection unit 601, processing results to be allocated to a second-channel transmission image (for example, entropy-coded image of high-frequency component of ultra-high-resolution image, entropy-coded image of up-conversion interpolation image of ultra-high-resolution image, entropy-coded image of inter-frame interpolation image of ultra-fast image, entropy-coded image of up-conversion interpolation image of ultra-stereoscopic image, and entropy-coded images of high-frequency components of ultra-wide-angle image and stitching image) to a plurality of sections of the second-channel transmission image. The second transmission-image configuration unit 603 generates second header information including second allocation information and association information, adds the second header information to the second-channel transmission image, and supplies the resultant to the second transmission unit 605.

It should be noted that the association information may be included in any one of the first header information and the second header information. Further, it may be possible to add the details of the first header information and second header information to obtain one header information item and add this header information item to any one of the first-channel transmission image and the second-channel transmission image. In other words, the first allocation information, the second allocation information, and the association information may be transmitted by any mechanism as long as they are transmitted to a selected decoder.

The first transmission unit 604 transmits the first-channel transmission image generated by the first transmission-image configuration unit 602 through the Link-A.

The second transmission unit 605 transmits the second-channel transmission image generated by the second transmission-image configuration unit 603 through the Link-E.

Next, as shown in FIG. 26, an operation Of the encoder system 600 in the case where the three stitching images 621, 622, and 623 having a high-definition image size and the ultra-high-resolution image 624 having a 4K high-definition image size are input images will be described.

For example, based on information set in advance by a user, the encoder selection unit 601 first selects an encoder 500a as an encoder to process the three stitching images 621, 622, and 623 having a high-definition image size and then selects an encoder 200a as an encoder to process the ultra-high-resolution image 624 having a 4K high-definition image size.

By the encoder 500a, the low-frequency components 621L, 622L, and 623L and the entropy-coded images 621H, 622H, and 623H of high-frequency components are generated based on the three stitching images 621, 622, and 623.

Meanwhile, by the encoder 200a, the down-converted image 624L and the entropy-coded image 624H of a high-frequency component are generated based on the ultra-high-resolution image 624 having a 4K high-definition image size.

The first transmission-image configuration unit 602 allocates the three low-frequency components 621L, 622L, and 623L generated by the encoder 500a and the down-converted image 624L generated by the encoder 200a to the four sections of the first-channel transmission image to thereby generate first allocation information.

Meanwhile, the second transmission-image configuration unit 603 allocates the entropy-coded images 621H, 622H, and 623H of the high-frequency components generated by the encoder 500a and the entropy-coded image 624H of the high-frequency component generated by the encoder 200a to the four sections of the second-channel transmission image to thereby generate second allocation information.

The first transmission-image configuration unit 602 and the second transmission-image configuration unit 603 exchange their allocation information, generate association information on the basis of the their allocation information, and create first header information and second header information.

The first transmission-image configuration unit 602 adds the first header information including the first allocation information and the association information to the first-channel transmission image and supplies the resultant to the first transmission unit 604. After that, the first-channel transmission image provided with the first header information is transmitted by the first transmission unit 604 through the Link-A.

Meanwhile, the second transmission-image configuration unit 603 similarly adds the second header information including the second allocation information and the association information to the second-channel transmission image and supplies the resultant to the second transmission unit 605. After that, the second-channel transmission image provided with the second header information is transmitted by the second transmission unit 605 through the Link-B.

[Configuration of Decoder System in Hybrid Mode]

Figure 30:
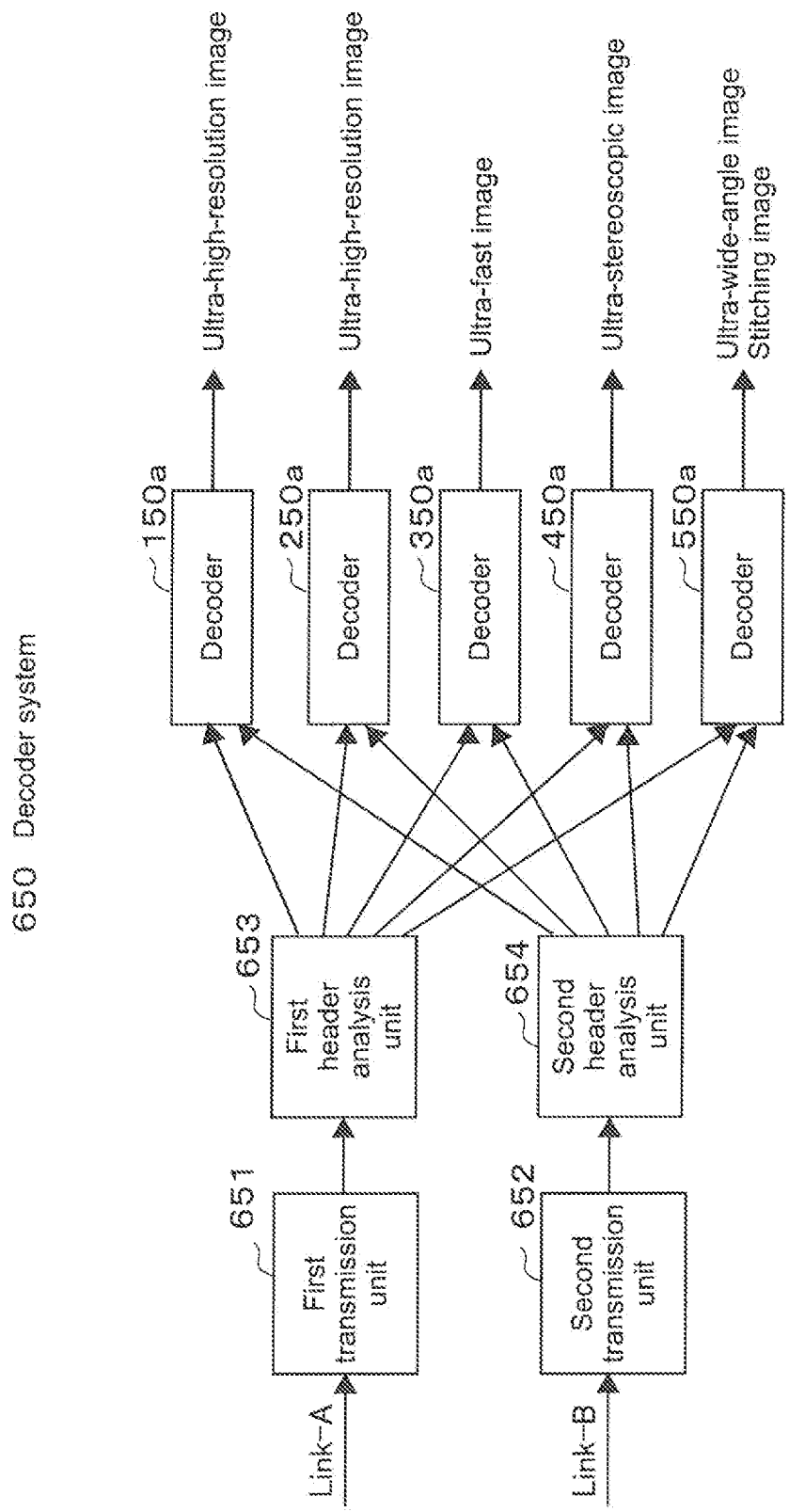
FIG. 30 is a block diagram showing a configuration of a decoder system in the hybrid mode according to the sixth embodiment.

FIG. 30 is a block diagram showing a configuration of a decoder system 650 in a hybrid mode.

The decoder system 650 includes a first transmission unit 651 (image acquisition unit), a second transmission unit 652 (image acquisition unit), a first header analysis unit 653, a second header analysis unit 654, various types of decoders 150a, 250a, 350a, 450a, and 550a.

The first transmission unit 651 receives the first-channel transmission image transmitted through the Link-A and supplies the first-channel transmission image to the first header analysis unit 653.

The second transmission unit 652 receives the second-channel transmission image transmitted through the Link-B and supplies the second-channel transmission image to the second header analysis unit 654.

Based on the first allocation information included in the first header information added to the first-channel transmission image supplied from the first transmission unit 651, the first header analysis unit 653 determines a decoder suitable for decoding of an image for each section of the first-channel transmission image and supplies the images of respective sections to the decoders.

Based on the second allocation information included in the second header information added to the second-channel transmission image supplied from the second transmission unit 652, the second header analysis unit 654 determines a decoder suitable for decoding of an image for each section of the second-channel transmission image and supplies the images of respective sections to the decoders.

Further, based on the association information items included in both the first header information and the second header information, the first header analysis unit 653 and the second header analysis unit 654 determine images to be synchronous with each other and to be transmitted to a common decoder in the images of the sections of the first-channel transmission image and the images of the sections of the second-channel transmission image. Accordingly, in each decoder, two images to be processed in combination with each other are correctly acquired.

The various types of decoder 150a, 250a, 350a, 450a, and 550a are, for example, decoders excluding at least the first transmission unit and the second transmission unit from the configuration of the decoders 150, 250, 350, 450, and 550 according to the first to fifth embodiments.

Next, an operation of the decoder system 650 in the case where the first-channel transmission image and the second-channel transmission image shown in FIG. 26 are received will be described.

The first header analysis'unit 653 determines that, based on the first allocation information included in the first header information added to the first-channel transmission image, the low-frequency components 621L, 622L, and 623L of the three stitching images 621, 622, and 623 and the down-converted image 624L of the ultra-high-resolution image 624 are allocated to the respective sections of the first-channel transmission image.

Meanwhile, the second header analysis unit 654 determines that, based on the second allocation information included in the second header information added to the second-channel transmission image, the entropy-coded images 621H, 622H, and 623H of the high-frequency components of the three stitching images 621, 622, and 623 and the entropy-coded image 624H of the high-frequency component of the ultra-high-resolution image 624 are allocated to the respective sections of the second-channel transmission image.

Further, based on the association information items included in both the first header information and the second header information, the first header analysis unit 653 and the second header analysis unit 654 determine images to be synchronous with each other and to be supplied to a common decoder in the images of the sections of the first-channel transmission image and the images of the sections of the second-channel transmission image.

Based on results of the determination described above, the first header analysis unit 653 and the second header analysis unit 654 selectively supply the images of the respective sections of the first-channel transmission image and second-channel transmission image to the decoders 150a, 250a, 350a, 450a, and 550a as follows.

1. The low-frequency component 621L of the stitching image 621 is supplied from the first header analysis unit 653 to the decoder 550a, and the entropy-coded image 621H of the high-frequency component of the stitching image 621 is supplied from the second header analysis unit 654 to the decoder 550a. Accordingly, the stitching image 621 is decoded in the decoder 550a.

2. Next, the low-frequency component 622L of the stitching image 622 is supplied from the first header analysis unit 653 to the decoder 550a, and the entropy-coded image 622H of the high-frequency component of the stitching image 622 is supplied from the second header analysis unit 654 to the decoder 550a. Accordingly, the stitching image 622 is decoded in the decoder 550a.

3. Next, the low-frequency component 623L of the stitching image 623 is supplied from the first header analysis unit 653 to the decoder 550a, and the entropy-coded image 623H of the high-frequency component of the stitching image 623 is supplied from the second header analysis unit 654 to the decoder 550a. Accordingly, the stitching image 623 is decoded in the decoder 550a.

4. The down-converted image 624L of the ultra-high-resolution image 624 is supplied from the first header analysis unit 653 to the decoder 250a, and the entropy-coded image 624H of the high-frequency component of the ultra-high-resolution image 624 is supplied from the second header analysis unit 654 to the decoder 250a. Accordingly, the ultra-high-resolution image 624 is decoded in the decoder 250a.

As described above, according to this embodiment, it is possible to mix a two-channel transmission image with a plurality of images compression-coded by various types of encoders to transmit the mixed image and perform decoding processing thereon on a decoder side in accordance with an encoding method for each image.

It should be noted that when a space of a transmission image is divided into a plurality of rectangular areas, there may occur a delay corresponding to about one frame at a maximum. There are countermeasures to reduce the delay. For example, image information on each section is sequentially arranged per pixel. However, in the case where pixels are alternately arranged, since an image with a plurality of images being mixed is perceived when a monitor is viewed, processing of sorting pixels is necessary when the image is displayed on the monitor.

[Camera System]

Figure 31:
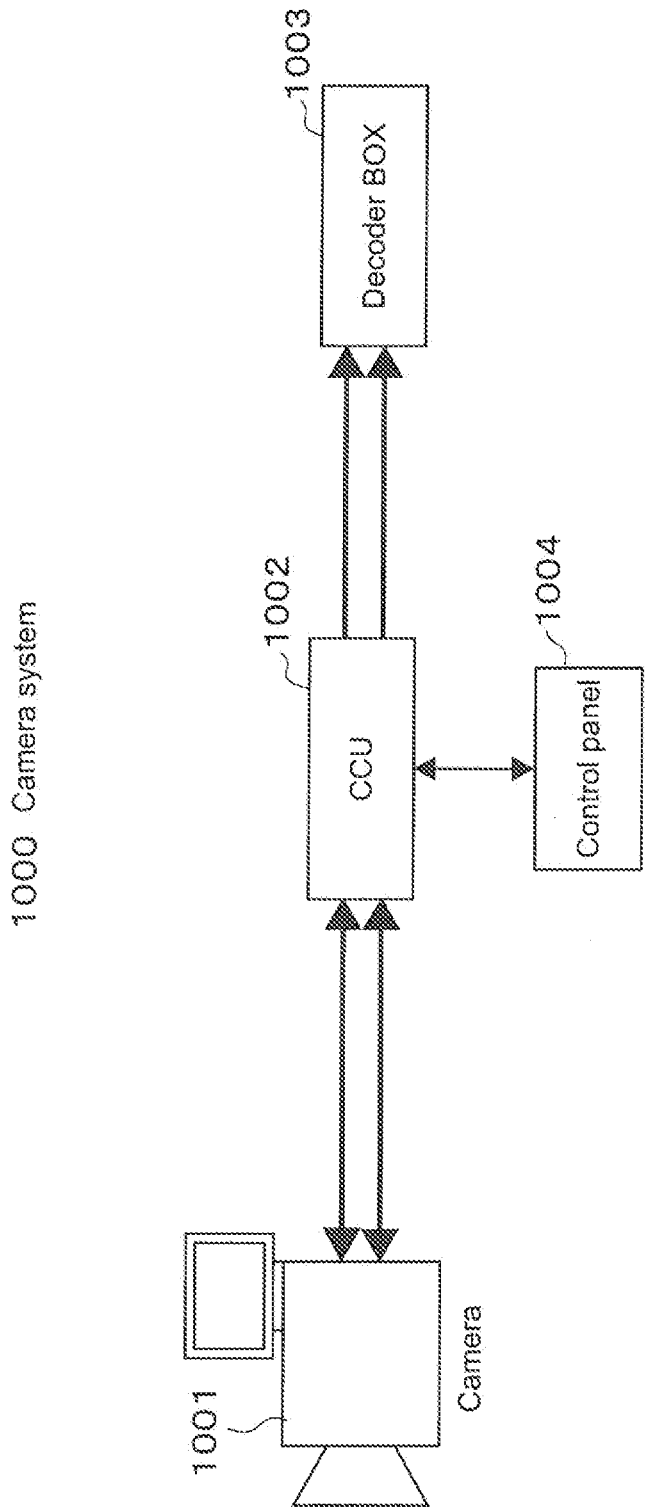
FIG. 31 is a block diagram showing a configuration of a camera system according to an embodiment of the present disclosure.

FIG. 31 is a block diagram showing a configuration of a camera system 1060 using the encoders and decoders described in the above embodiments.

The camera system 1000 includes a camera 1001, a CCU (Camera Control Unit) 1002, a decoder BOX 1003, and the like. The camera 1001 and the CCU 1002 are connected so as to bi-directionally communicate with each other through a two-channel transmission path that has been adopted in a current 3D-image transmission system. The CCU 1002 and the decoder BOX 1003 are also similarly connected to each other through the two-channel transmission path.

The camera 1001 incorporates an encoder. The camera 1001 can be, for example, an ultra-high-resolution camera, an ultra-fast camera, a plurality of cameras from different perspectives to obtain an ultra-stereoscopic image, an ultra-wide-angle camera, or the like.

The CCU 1002 is connected with a control panel 1004 capable of receiving an operation input from a user. The CCU 1002 receives an instruction that is input to the control panel 1004 from the user, generates a command corresponding to the instruction, and transmits the command to the camera 1001 so that the CCU 1002 can control the camera 1001.

The decoder BOX 1003 is a device that incorporates a decoder.

Examples of the two-channel transmission path include i.LINK (registered trademark), optical fiber transmission, and 3G-SDI (3G-Single Document Interface), but the two-channel transmission path is not limited thereto. Further, the two-channel transmission path may be an asynchronous transmission means such as a storage.

Modified Example 1

Transmission Adapter

Hereinabove, the encoders and decoders according to the embodiments of the present disclosure have been described. However, the present disclosure is applicable to a transmission adapter that imports an image output from an encoder and converts the image into data in a different transmission form to output the data to another device.

Figure 32:
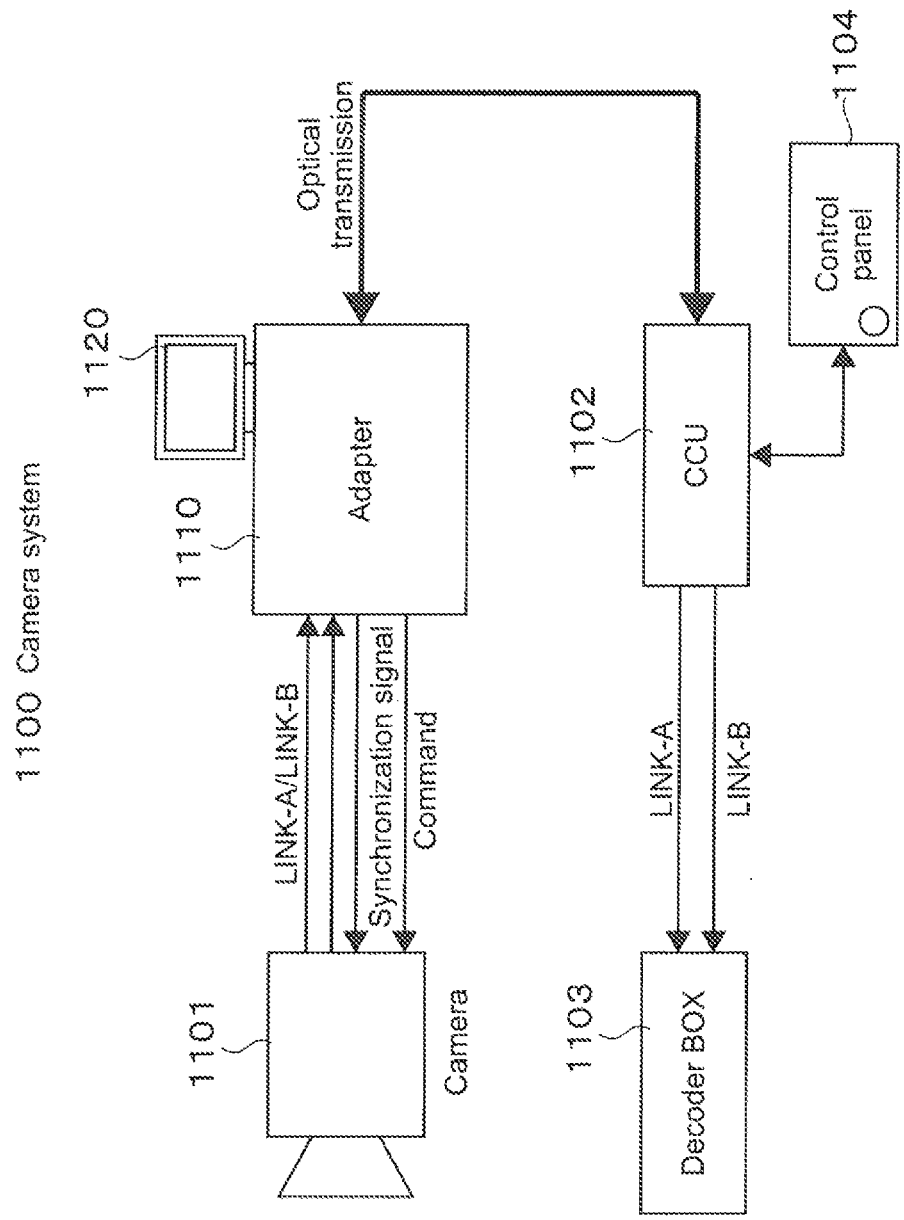
FIG. 32 is a block diagram showing a configuration of a camera system using a transmission adapter according to Modified example 1 of the present disclosure.

FIG. 32 is a block diagram showing a configuration of a camera system 1100 using a transmission adapter.

The camera system 1100 includes a camera 1101, a transmission adapter 1110, a CCU 1102, a decoder BOX 1103, and the like. The camera 1101 and the transmission adapter 1110 are connected to each other through the Link-A and the Link-B. The transmission adapter 1110 and the CCU 1102 are connected to each other through a bi-directional optical fiber transmission path. The CCU 1102 and the decoder BOX 1103 are connected to each other through the Link-A and the Link-B.

The CCU 1102 receives an instruction that is input to the control panel 1104 from a user, generates a command corresponding to the instruction, and transmits the command to the camera 1101 through the transmission adapter 1110 so that the CCU 1102 can control the camera 1101. The transmission adapter 1110 includes a display unit 1120, and an image transmitted through the Link-A, such as a low-frequency component of a Wavelet-transformed image or a down-converted image, can be viewed through the display unit 1120.

Figure 33:
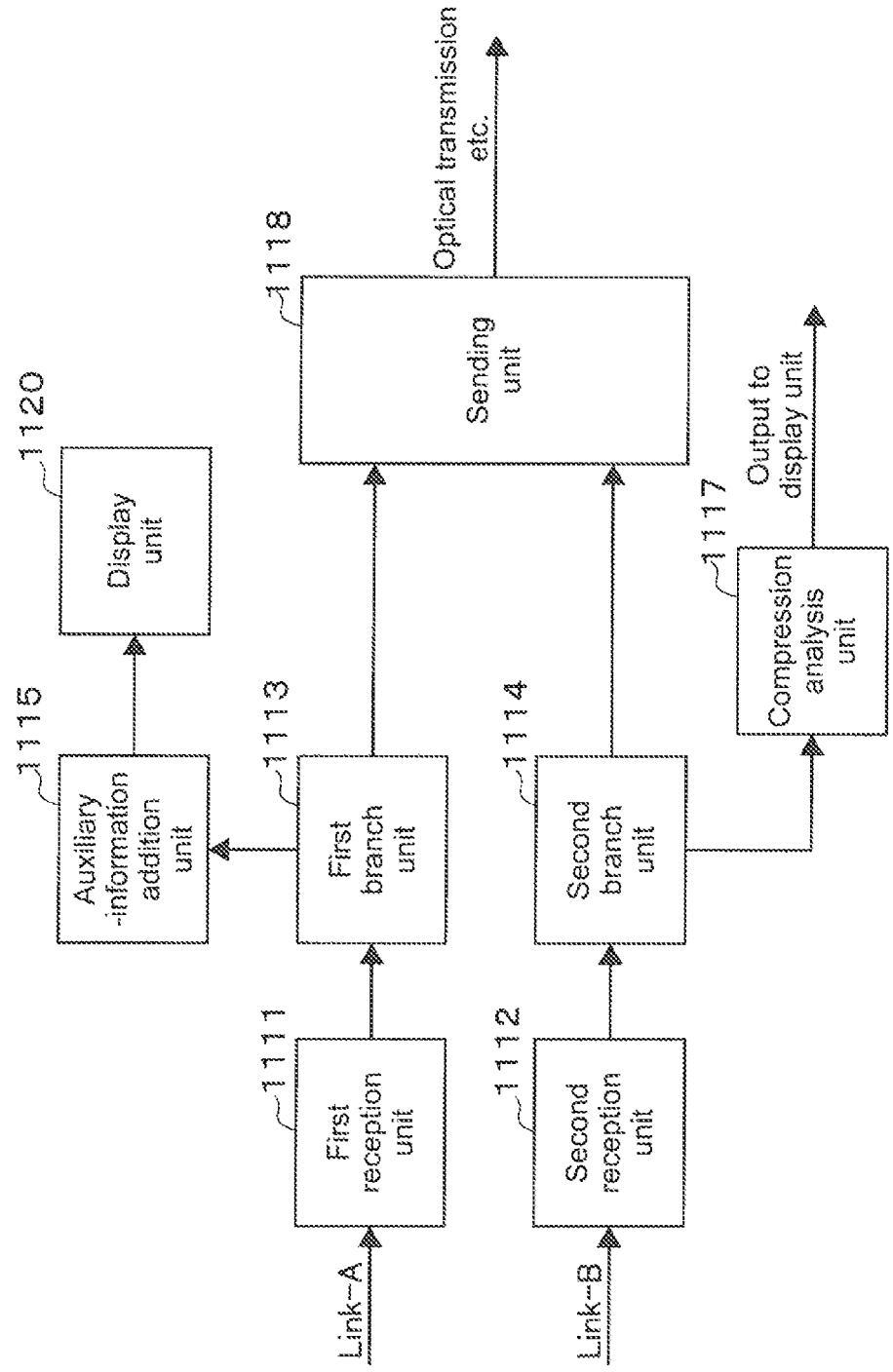
FIG. 33 is a block diagram showing a configuration of the transmission adapter according to Modified example 1.

FIG. 33 is a block diagram showing a configuration of the transmission adapter 1110 of Modified example 1.

The transmission adapter 1110 includes a first reception unit 1111, a second reception unit 1112, a first branch unit 1113, a second branch unit 1114, an auxiliary-information addition unit 1115, a display processing unit 1116, a compression analysis unit 1117, and a sending unit 1118.

The first reception unit 1111 receives the image transmitted through the Link-A from the encoder within the camera 1101 and supplies the image to the first branch unit 1113.

The second reception unit 1112 receives the image transmitted through the Link-B from the encoder within the camera 1101 and supplies the image to the second branch unit 1114.

The first branch unit 1113 supplies the image supplied from the first reception unit 1111 to the auxiliary-information addition unit 1115 and the sending unit 1118.

The second branch unit 1114 supplies the image supplied from the second reception unit 1112 to the compression analysis unit 1117 and the sending unit 1118.

The auxiliary-information addition unit 1115 adds an auxiliary image for assisting a user in monitoring an image, such as a marker, a zebra pattern, or a character string, to the image supplied from the first branch unit 1113. The image provided with the auxiliary image is supplied to the display unit 1120 and then displayed thereon.

The compression analysis unit 1117 analyzes a size of the image supplied from the second branch unit 1114 and supplies a result of the analysis to the display unit 1120 to be displayed thereon.

The sending unit 1118 converts the transmission form of the image supplied from the first branch unit 1113 and the image supplied from the second branch unit 1114 to transmit the images to a device on the other end. For example, conversion from the i.LINK (registered trademark) to optical fiber transmission, conversion in the opposite direction thereof, and the like can be performed.

In the transmission adapter 1110, the image transmitted from the encoder within the camera 1101 through the Link-A is received in the first reception unit 1111, while the image transmitted through the Link-B is received in the second reception unit 1112. The image received in the first reception unit 1111 is output to the auxiliary-information addition unit 1115 by the first branch unit 1113, provided with an auxiliary image for assisting a user, and displayed on the display unit 1120, while the image received in the first reception unit 1111 is also supplied to the sending unit 1118.

Further, the image received in the second reception unit 1112 is output to the compression analysis unit 1117 by the second branch unit 1114. In the compression analysis unit 1117, a size of the image is analyzed and a result of the analysis is displayed on the display unit 1120 and also supplied to the sending unit 1118. Then, in the sending unit 1118, the image supplied from the first branch unit 1113 and the image supplied from the second branch unit 1114 are coupled to each other, converted into a code in a different transmission form, and transmitted to the CCU 1102.

Modified Example 2

Next, description will be given on a multi-camera connection method suitable for transmission of images captured with use of a plurality of cameras in order to generate an ultra-stereoscopic image and the like. Examples of the multi-camera connection method include a cascade connection.

Figure 34:
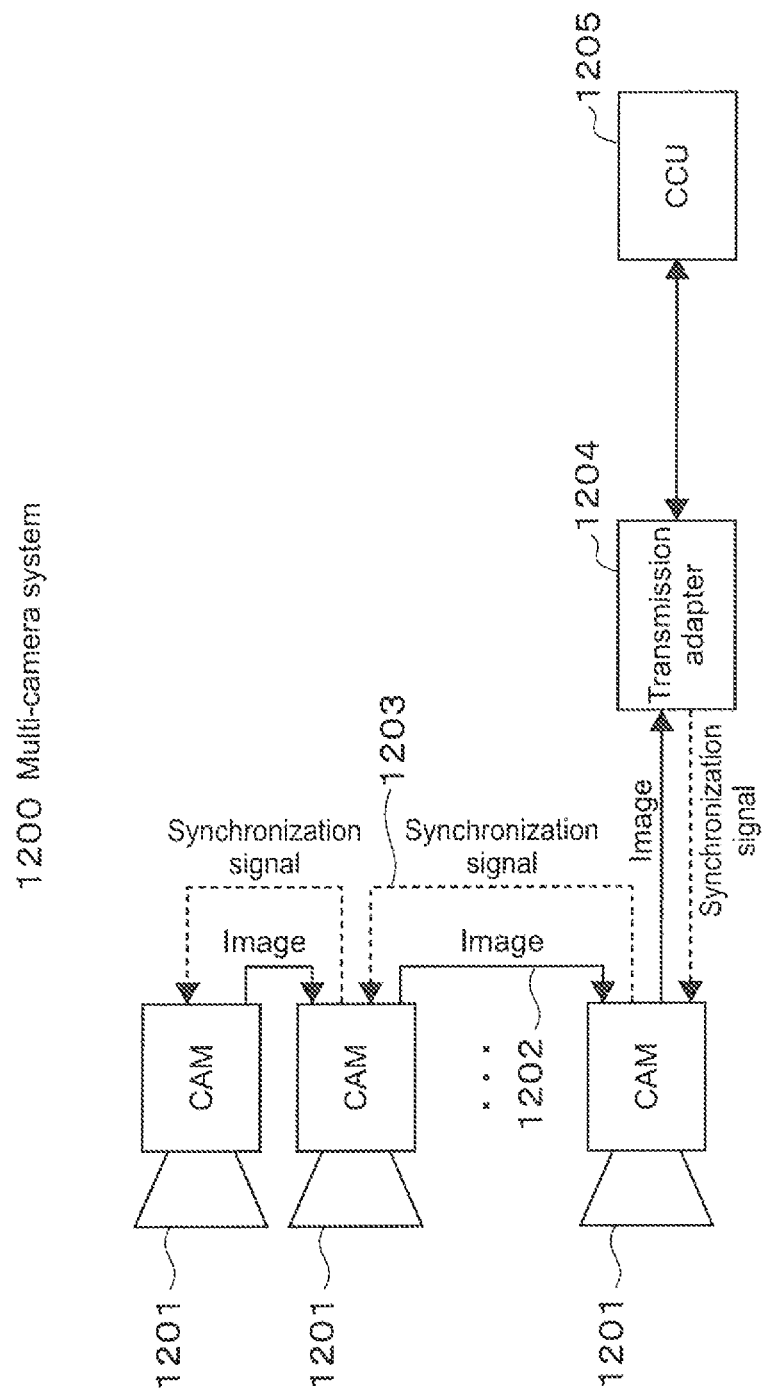
FIG. 34 is a block diagram showing a configuration of a multi-camera system connected in cascade according to Modified example 1.

FIG. 34 is a block diagram showing a configuration of a Multi-camera system 1200 by the cascade connection.

In the multi-camera system 1200, a plurality of cameras 1201 are connected to one another in series through one image transmission line 1202 and one synchronization signal line 1203. Each of the cameras 1201 incorporates an encoder. An output of an encoder of the most downstream camera 1201 is connected to a transmission adapter 1204, and the transmission adapter 1204 is connected to a CCU 1205 through a transmission path such as an optical transmission path.

The image transmission line 1202 is used by time sharing in the encoder of each camera 1201. In other words, a first transmission unit and a second transmission unit of the encoder incorporated into each camera use the image transmission line 1202 to transmit an image at a timing previously assigned thereto based on a synchronization signal.

With this configuration, the multi-camera system 1200 in which the plurality of cameras 1201 and the transmission adapter 1204 are connected in series by one image transmission line 1202 and one synchronization signal line 1203 can be obtained.

It should be noted that with this configuration, at a time of imaging, it is desirable to perform processing of advancing or delaying an imaging timing while taking into consideration a difference in delay amount of synchronization signal between the cameras 1201. Alternatively, it may also be possible to perform synchronization correction in the decoder while taking into consideration delay amounts of synchronization signals in the cameras.

Hereinabove, the encoders and decoders for transmitting images in various forms as two-channel high-definition images have been described in consideration of using an infrastructure such as a current 3D-image transmission system. However, the present disclosure is not limited to the use of the infrastructure of the current 3D-image transmission system. For example, there may be adopted a configuration in which the first transmission unit and/or the second transmission unit further divide(s) the transmission image so as to be transmitted through a plurality of channels. More specifically, the following modes are conceived.

1. A frequency band of 1.5 Gbps for transmitting a down-converted image is assigned to one link, and a frequency band of 4.5 Gbps for transmitting a compression-coded image is assigned to other three links.

2. A frequency band of 3.0 Gbps for transmitting a down-converted image is assigned to two links, and a frequency band of 3.0 Gbps for transmitting a compression-coded image is assigned to other two links.

3. A frequency band of 1.5 Gbps for transmitting a down-converted image is assigned to one link, and a frequency band of 7.5 Gbps for transmitting a compression-coded image is assigned to other five links.

In addition to the above, various use applications are conceived.

It should be noted that the present disclosure can take the following configurations.

(1) An encoder, including:
  an image decomposition unit configured to input an image and decompose the input image into a first component capable of being used as a monitoring image and a second component other than the first component, the input image being restored by coupling the first component and the second component to each other, the image decomposition unit including
    a down-conversion unit configured to generate, as the first component, an image having a size capable of being used as the monitoring image from the input image by down conversion, and
    a difference generation unit configured to generate, as the second component, a difference between the input image and an image obtained by enlarging in pixel the first component to a size of the input image;
  a first transmission unit configured to output the decomposed first component as a first-channel transmission image;
  a compression coding unit configured to compression-code the second component; and
  a second transmission unit configured to output the compression-coded second component as a second-channel transmission image.

(2) An encoder, including:
  an image decomposition unit configured to input an image constituted of a, plurality of frames sequentially captured at a frame rate higher than a monitoring frame rate and decompose the input image into a first component capable of being used as a monitoring image a second component other than the first component, the input image being restored by coupling the first component and the second component to each other, the image decomposition unit including
    a frame separation unit configured to separate a frame as a monitoring frame from the plurality of frames of the input image at the monitoring frame rate and generate the first component,
    a frequency decomposition unit configured to decompose each of the plurality of frames of the input image into a low-frequency component and a high-frequency component by frequency decomposition, and
    a difference generation unit configured to generate, as the second component, differences in the low-frequency component of each of the decomposed frames between the monitoring frame and at least one non-monitoring frame, the at least one non-monitoring frame being located between the monitoring frame and a next monitoring frame;
  a first transmission unit configured to output the decomposed first component as a first-channel transmission image;

a compression coding unit configured to compression-code the second component; and a second transmission unit configured to output the compression-coded second component as a second-channel transmission image.

(3) An encoder, including:

an image decomposition unit configured to input an image constituted of a plurality of frames captured at different perspectives to constitute a stereoscopic image and decompose the input image into a first component capable of being used as a monitoring image and a second component other than the first component, the input image being restored by coupling the first component and the second component to each other, the image decomposition unit including a frame separation unit configured to separate the input image into the plurality of frames, a frequency decomposition unit configured to decompose each of the separated frames into a low-frequency component and a high-frequency component by frequency decomposition and generate the high-frequency components as the second component, and a coupling unit configured to couple the decomposed low-frequency components of the plurality of frames to one another to generate the first component;

a first transmission unit configured to output the decomposed first component as a first-channel transmission image;

a compression coding unit configured to compression-code the second component; and a second transmission unit configured to output the compression-coded second component as a second-channel transmission image.

(4) An encoder, including:

a size adjustment unit configured to input an image having an aspect ratio different from that of a screen for monitoring and perform at least one of separation and coupling of the input image to have the aspect ratio of the screen for monitoring;

an image decomposition unit configured to decompose the image output by the size adjustment unit into a first component capable of being used as a monitoring image and a second component other than the first component, the image being restored by coupling the first component and the second component to each other;

a first transmission unit configured to output the decomposed first component as a first-channel transmission image;

a compression coding unit configured to compression-code the second component; and a second transmission unit configured to output the compression-coded second component as a second-channel transmission image.

(5) A transmission adapter, including:

a first reception unit configured to receive a first-channel transmission image transmitted by the encoder according to any one of Items (1) to (4);

a second reception unit configured to receive the second-channel transmission image transmitted by the encoder; and a sending unit configured to couple the first-channel transmission image received by the first reception unit and the second-channel transmission image received by the second reception unit to each other and convert a transmission form of the first-channel transmission image and the second-channel transmission image for transmission.

(6) An imaging apparatus, comprising the encoder according to any one of Items (1) to (4).

The present disclosure contains subject matter related to that disclosed in Japanese Priority Patent Application JP 2011-103579 filed in the Japan Patent Office on May 6, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An encoder including circuitry, comprising:

an image decomposition unit configured to input an ultra-high resolution image and decompose the input image using wavelet transform into a first component capable of being used as a monitoring image and a second component other than the first component by frequency decomposition, the input image being restored by coupling the first component and the second component to each other;

a first transmission unit of circuitry configured to output the decomposed first component as a first-channel transmission image;

a compression coding unit configured to compression-code the second component; and a second transmission unit of circuitry configured to output the compression-coded second component as a second-channel transmission image.

2. The encoder according to claim 1, further comprising:

an auxiliary-image addition unit configured to add an auxiliary image for monitoring to the first component; and an output unit configured to output the first component with the auxiliary image as a monitoring image.

3. The encoder according to claim 2, further comprising a compression analysis unit configured to analyze a size of the compression-coded second component and output a result of the analysis as visible information.

4. The encoder according to claim 1, wherein one of the first transmission unit and the second transmission unit divides the transmission image to be transmitted through a plurality of channels.

5. A decoder including circuitry capable of being used in combination with an encoder having circuitry including an image decomposition unit configured to input an ultra-high resolution image and decompose the input image using wavelet transform into a first component capable of being used as a monitoring image and a second component other than the first component by frequency decomposition, the input image being restored by coupling the first component and the second component to each other, a first transmission unit of circuitry configured to output the decomposed first component as a first-channel transmission image, a compression coding unit configured to compression-code the second component, and a second transmission unit of circuitry configured to output the compression-coded second component as a second-channel transmission image, the decoder comprising:

an image acquisition unit of circuitry configured to acquire the first component transmitted as the first-channel transmission image and the second component transmitted as the second-channel transmission image;

a decompression decoding unit configured to decompression-decode the acquired second component; and an image restoration unit configured to couple the acquired first component and the decompression-decoded second component to each other by inverse decomposition using wavelet transform to restore the ultra-high resolution image to an original state.

6. An encoder including circuitry, comprising:
an image decomposition unit configured to input an ultra-high resolution image and decompose the input image into a first component capable of being used as a monitoring image and a second component other than the first component, the input image being restored by coupling the first component and the second component to each other, the image decomposition unit including
a down-conversion unit configured to generate, as the first component, an image having a size capable of being used as the monitoring image from the input image by down conversion using a bicubic method, and
a difference generation unit configured to generate, as the second component, a difference between the input image and an image obtained by enlarging in pixel the first component to a size of the input image;
a first transmission unit of circuitry configured to output the decomposed first component as a first-channel transmission image;
a compression coding unit configured to compression-code the second component; and
a second transmission unit of circuitry configured to output the compression-coded second component as a second-channel transmission image.

7. A decoder including circuitry capable of being used in combination with an encoder having circuitry including
an image decomposition unit configured to input an ultra-high resolution image and decompose the input image into a first component capable of being used as a monitoring image and a second component other than the first component, the input image being restored by coupling the first component and the second component to each other, the image decomposition unit including
a down-conversion unit configured to generate, as the first component, an image having a size capable of being used as the monitoring image from the input image by down conversion using a bicubic method, and
a difference generation unit configured to generate, as the second component, a difference between the input image and an image obtained by enlarging in pixel the first component to a size of the input image,
a first transmission unit of circuitry configured to output the decomposed first component as a first-channel transmission image,
a compression coding unit configured to compression-code the second component, and
a second transmission unit of circuitry configured to output the compression-coded second component as a second-channel transmission image,
the decoder comprising:
an image acquisition unit configured to acquire the first component transmitted as the first-channel transmission image and the second component transmitted as the second-channel transmission image;
a decompression decoding unit configured to decompression-decode the acquired second component; and
an image restoration unit configured to couple the acquired first component and the decompression-decoded second component to each other to restore the ultra-high resolution image to an original state, the image restoration unit being configured to enlarge in pixel the first component and add an enlarged image thereof and the decompression-decode second component to each other to restore the ultra-high resolution image to the original state.

8. An encoder including circuitry, comprising:
an image decomposition unit configured to input an ultra-fast high definition image constituted of a plurality of frames sequentially captured at a frame rate higher than a monitoring frame rate and decompose the input image into a first component capable of being used as a monitoring image, a second component other than the first component, the input image being restored by coupling the first component and the second component to each other, the image decomposition unit including
a frame separation unit configured to separate a frame as a monitoring frame from the plurality of frames of the input image at the monitoring frame rate and generate the first component,
a frequency decomposition unit configured to decompose each of the plurality of frames of the input image into a low-frequency component and a high-frequency component by frequency decomposition using wavelet transform, and
a difference generation unit configured to generate, as the second component, differences in the low-frequency component of each of the decomposed frames between the monitoring frame and at least one non-monitoring frame, the at least one non-monitoring frame being located between the monitoring frame and a next monitoring frame;
a first transmission unit of circuitry configured to output the decomposed first component as a first-channel transmission image;
a compression coding unit configured to compression-code the second component; and
a second transmission unit of circuitry configured to output the compression-coded second component as a second-channel transmission image.

9. A decoder including circuitry capable of being used in combination with an encoder having circuitry including
an image decomposition unit configured to input an ultra-fast high definition image constituted of a plurality of frames sequentially captured at a frame rate higher than a monitoring frame rate and decompose the input image into a first component capable of being used as a monitoring image, a second component other than the first component, the input image being restored by coupling the first component and the second component to each other, the image decomposition unit including
a frame separation unit configured to separate a frame as a monitoring frame from the plurality of frames of the input image at the monitoring frame rate and generate the first component,
a frequency decomposition unit configured to decompose each of the plurality of frames of the input image into a low-frequency component and a high-frequency component by frequency decomposition using wavelet transform, and
a difference generation unit configured to generate, as the second component, differences in the low-frequency component of each of the decomposed frames between the monitoring frame and at least one non-monitoring frame, the at least one non-monitoring frame being located between the monitoring frame and a next monitoring frame,
a first transmission unit of circuitry configured to output the decomposed first component as a first-channel transmission image,
a compression coding unit configured to compression-code the second component, and a second transmission unit of circuitry configured to output the compression-coded second component as a second-channel transmission image, the decoder comprising:

an image acquisition unit configured to acquire the first component transmitted as the first-channel transmission image and the second component transmitted as the second-channel transmission image;

a decompression decoding unit configured to decompression-decode the acquired second component; and an image restoration unit configured to couple the acquired first component and the decompression-decoded second component to each other to restore by inverse decomposition the ultra-fast high definition image to an original state, the ultra-fast high definition image restoration unit including
- a frequency decomposition unit configured to decompose the acquired first component into a low-frequency component and a high-frequency component by frequency decomposition,
- a difference restoration unit configured to restore a low-frequency component of the at least one non-monitoring frame based on the decomposed low-frequency component and the decompression-decoded second component,
- an inverse frequency decomposition unit configured to restore the at least one non-monitoring frame by inverse frequency decomposition based on the restored low-frequency component and the high-frequency component included in the second component, and
- a frame coupling unit configured to couple the monitoring frame as the first component acquired by the image acquisition unit to the at least one non-monitoring frame restored by the inverse frequency decomposition unit.

10. An encoder including circuitry, comprising:

an image decomposition unit configured to input an ultra-stereoscopic image constituted of a plurality of frames captured at different perspectives to constitute a stereoscopic image and decompose the input image into a first component capable of being used as a monitoring image and a second component other than the first component, the input image being restored by coupling the first component and the second component to each other, the image decomposition unit including a frame separation unit configured to separate the input image into the plurality of frames for each perspective, a frequency decomposition unit configured to decompose using wavelet transform each of the separated frames into a low-frequency component and a high-frequency component by frequency decomposition based on parallax and generate the high-frequency components as the second component, and a coupling unit configured to couple the decomposed low-frequency components of the plurality of frames to one another to generate the first component;

a first transmission unit of circuitry configured to output the decomposed first component as a first-channel transmission image;

a compression coding unit configured to compression-code the second component; and a second transmission unit of circuitry configured to output the compression-coded second component as a second-channel transmission image.

11. A decoder including circuitry capable of being used in combination with an encoder having circuitry including an image decomposition unit configured to input an ultra-stereoscopic image constituted of a plurality of frames captured at different perspectives to constitute a stereoscopic image and decompose the input image into a first component capable of being used as a monitoring image and a second component other than the first component, the input image being restored by coupling the first component and the second component to each other, the image decomposition unit including a frame separation unit configured to separate the input image into the plurality of frames for each perspective, a frequency decomposition unit configured to decompose using wavelet transform each of the separated frames into a low-frequency component and a high-frequency component by frequency decomposition based on parallax and generate the high-frequency components as the second component, and a coupling unit configured to couple the decomposed low-frequency components of the plurality of frames to one another to generate the first component, a first transmission unit of circuitry configured to output the decomposed first component as a first-channel transmission image, a compression coding unit configured to compression-code the second component, and a second transmission unit of circuitry configured to output the compression-coded second component as a second-channel transmission image, the decoder comprising:

an image acquisition unit configured to acquire the first component transmitted as the first-channel transmission image and the second component transmitted as the second-channel transmission image;

a decompression decoding unit configured to decompression-decode the acquired second component; and an image restoration unit configured to couple the acquired first component and the decompression-decoded second component to each other to restore based on low-frequency components of the ultra-stereoscopic image to an original state, the image restoration unit including
- a frame separation unit configured to separate a low-frequency component of the acquired first component for each frame,
- a coupling unit configured to couple each of the low-frequency components of the first component separated for each frame and the decompression-decoded second component, and
- an inverse frequency decomposition unit configured to restore the stereoscopic image by inverse frequency decomposition based on the low-frequency components of the coupled first component and second component.

12. An encoder including circuitry, comprising:

a size adjustment unit configured to input an ultra-wide angle image having an aspect ratio different from that of a screen for monitoring and perform at least one of separation and coupling of the input image to have the aspect ratio of the screen for monitoring;

an image decomposition unit configured to decompose using wavelet transform the image output by the size adjustment unit into a first component capable of being used as a monitoring image and a second component other than the first component, the image being restored by coupling the first component and the second component to each other;

a first transmission unit of circuitry configured to output the decomposed first component as a first-channel transmission image;

a compression coding unit configured to compression-code the second component; and a second transmission unit of circuitry configured to output the compression-coded second component as a second-channel transmission image.

13. A decoder including circuitry capable of being used in combination with an encoder having circuitry including a size adjustment unit configured to input an ultra-wide angle image having an aspect ratio different from that of a screen for monitoring and perform at least one of separation and coupling of the input image to have the aspect ratio of the screen for monitoring, an image decomposition unit configured to decompose using wavelet transform the image output by the size adjustment unit into a first component capable of being used as a monitoring image and a second component other than the first component, the image being restored by coupling the first component and the second component to each other, a first transmission unit of circuitry configured to output the decomposed first component as a first-channel transmission image, a compression coding unit configured to compression-code the second component, and a second transmission unit of circuitry configured to output the compression-coded second component as a second-channel transmission image, the decoder comprising:

an image acquisition unit configured to acquire the first component transmitted as the first-channel transmission image and the second component transmitted as the second-channel transmission image;

a decompression decoding unit configured to decompression-decode the acquired second component; and an image restoration unit configured to couple a low-frequency component of the acquired first component and a high frequency component of the decompression-decoded second component to each other to restore the ultra-wide angle image to an original state.

14. An encoder system including circuitry, comprising:

a plurality of various types of encoders for ultra-high resolution images, ultra-fast high definition images, ultra-stereoscopic images and ultra-wide angle images each including an image decomposition unit configured to decompose an input image into a first component capable of being used as a monitoring image and a second component other than the first component, the input image being restored by coupling the first component and the second component to each other, and a compression coding unit configured to compression-code the second component, the plurality of encoders being each configured to output the decomposed first component and the compression-coded second component and each having a different image decomposition mode by the image decomposition unit;

an encoder selection unit configured to select the plurality of encoders to be used for encoding of the input image;

a first transmission-image configuration unit configured to allocate a plurality of first components output by the selected encoders to a plurality of sections that divide a space of a first-channel transmission image, and generate first header information including at least information on the allocation, to add the first header information to the first-channel transmission image;

a first transmission unit of circuitry configured to transmit the first-channel transmission image provided with the first header information;

a second transmission-image configuration unit configured to allocate a plurality of second components output by the selected encoders to a plurality of sections that divide a space of a second-channel transmission image, and generate second header information including at least information on the allocation, to add the second header information to the second-channel transmission image; and a second transmission unit of circuitry configured to transmit the second-channel transmission image provided with the second header information.

15. The encoder system according to claim 14, wherein at least one of the first transmission-image configuration unit and the second transmission-image configuration unit generates association information that associates each of the first components allocated to each of the plurality of sections of the first-channel transmission image with each of the second components allocated to each of the plurality of sections of the second-channel transmission image and adds the association information to at least one of the first header information and the second header information.

16. A decoder system including circuitry capable of being used in combination with an encoder system having circuitry including a plurality of various types of encoders for ultra-high resolution images, ultra-fast high definition images, ultra-stereoscopic images and ultra-wide angle images each including an image decomposition unit configured to decompose an input image into a first component capable of being used as a monitoring image and a second component other than the first component, the input image being restored by coupling the first component and the second component to each other, and a compression coding unit configured to compression-code the second component, the plurality of encoders being each configured to output the decomposed first component and the compression-coded second component and each having a different image decomposition mode by the image decomposition unit, an encoder selection unit configured to select the plurality of encoders to be used for encoding of the input image, a first transmission-image configuration unit configured to allocate a plurality of first components output by the selected encoders to a plurality of sections that divide a space of a first-channel transmission image, and generate first header information including at least information on the allocation, to add the first header information to the first-channel transmission image, a first transmission unit of circuitry configured to transmit the first-channel transmission image provided with the first header information, a second transmission-image configuration unit configured to allocate a plurality of second components output by the selected encoders to a plurality of sections that divide a space of a second-channel transmission image, and generate second header information including at least information on the allocation, to add the second header information to the second-channel transmission image, and a second transmission unit of circuitry configured to transmit the second-channel transmission image provided with the second header information, the decoder system comprising:

a plurality of various types of decoders for ultra-high resolution images, ultra-fast high definition images, ultra-stereoscopic images and ultra-wide angle images each corresponding to each of the plurality of encoders;

an image acquisition unit configured to acquire the first-channel transmission image and the second-channel transmission image that are transmitted by the encoder system;

a first header analysis unit configured to selectively supply, based on the first header information provided to the acquired first-channel transmission image, the plurality of first components allocated to the respective plurality of sections of the first-channel transmission image to the plurality of decoders; and a second header analysis unit configured to selectively supply, based on the second header information provided to the acquired second-channel transmission image, the plurality of second components allocated to the respective plurality of sections of the second-channel transmission image to the plurality of decoders.

17. A transmission adapter including circuitry, comprising:

a first reception unit configured to receive a first-channel transmission image transmitted by an encoder including
an image decomposition unit configured to input an image including one of an ultra-high resolution image, an ultra-fast high definition image, an ultra-stereoscopic image and an ultra-wide angle image and decompose the input image into a first component capable of being used as a monitoring image and a second component other than the first component, the input image being restored by coupling the first component and the second component to each other,
a first transmission unit of circuitry configured to output the decomposed first component as the first-channel transmission image,
a compression coding unit configured to compression-code the second component, and
a second transmission unit configured to output the compression-coded second component as a second-channel transmission image;

a second reception unit configured to receive the second-channel transmission image transmitted by the encoder; and a sending unit configured to couple the first-channel transmission image received by the first reception unit and the second-channel transmission image received by the second reception unit to each other and convert a transmission form of the first-channel transmission image and the second-channel transmission image for transmission.

18. An encoding method performed by circuitry, comprising the steps of:

decomposing using wavelet transform an input ultra-high resolution image into a first component capable of being used as a monitoring image and a second component other than the first component, the input image being restored by coupling the first component and the second component to each other, outputting the decomposed first component as a first-channel transmission image;

compression-coding the second component; and outputting the compression-coded second component as a second-channel transmission image.

19. A decoding method performed by circuitry, comprising the steps of:

acquiring a first component output as a first-channel transmission image and a second component output as a second-channel transmission image by an encoding method including
decomposing using wavelet transform an input ultra-high resolution image into a first component capable of being used as a monitoring image and a second component other than the first component, the input image being restored by coupling the first component and the second component to each other,
outputting the decomposed first component as the first-channel transmission image,
compression-coding the second component, and
outputting the compression-coded second component as the second-channel transmission image;

decompression-decoding the acquired second component; and coupling the acquired first component and the decompression-decoded second component to each other to restore the ultra-high resolution image to an original state.

20. An imaging apparatus including hardware, comprising an encoder including an image decomposition unit configured to input an image including an ultra-high resolution image, an ultra-fast high definition image, an ultra-stereoscopic image and an ultra-wide angle image and decompose the input image into a first component capable of being used as a monitoring image and a second component other than the first component by frequency decomposition, the input image being restored by coupling the first component and the second component to each other, a first transmission unit of hardware configured to output the decomposed first component as a first-channel transmission image, a compression coding unit configured to compression-code the second component, and a second transmission unit of hardware configured to output the compression-coded second component as a second-channel transmission image.

* * * * *